US012030776B2

(12) United States Patent
Hardman

(10) Patent No.: US 12,030,776 B2
(45) Date of Patent: *Jul. 9, 2024

(54) SYSTEMS AND METHODS FOR PARTICLE GENERATION

(71) Applicant: Monolith Materials, Inc., Lincoln, NE (US)

(72) Inventor: Ned J. Hardman, Lincoln, NE (US)

(73) Assignee: Monolith Materials, Inc., Lincoln, NE (US)

( * ) Notice: Subject to any disclaimer, the term of this patent is extended or adjusted under 35 U.S.C. 154(b) by 257 days.

This patent is subject to a terminal disclaimer.

(21) Appl. No.: 16/802,190

(22) Filed: Feb. 26, 2020

(65) Prior Publication Data

US 2021/0017025 A1 Jan. 21, 2021

Related U.S. Application Data

(63) Continuation of application No. PCT/US2018/048374, filed on Aug. 28, 2018.

(60) Provisional application No. 62/551,063, filed on Aug. 28, 2017.

(51) Int. Cl.
*C09C 1/48* (2006.01)
*C01B 32/05* (2017.01)
*C08K 3/04* (2006.01)

(52) U.S. Cl.
CPC ............... *C01B 32/05* (2017.08); *C08K 3/04* (2013.01); *C09C 1/48* (2013.01); *C01P 2004/51* (2013.01); *C01P 2004/61* (2013.01); *C01P 2006/12* (2013.01); *C01P 2006/82* (2013.01); *C01P 2006/90* (2013.01)

(58) Field of Classification Search
CPC ...................................................... C09C 1/48
See application file for complete search history.

(56) References Cited

U.S. PATENT DOCUMENTS

| | | |
|---|---|---|
| 709,868 A | 9/1902 | Bradley et al. |
| 1,339,225 A | 5/1920 | Rose |
| 1,536,612 A | 5/1925 | Lewis |
| 1,597,277 A | 8/1926 | Jakowsky |
| 1,931,800 A | 10/1933 | Jakosky et al. |
| 2,002,003 A | 5/1935 | Otto et al. |
| 2,039,312 A | 5/1936 | Goldman |
| 2,062,358 A | 12/1936 | Frolich |
| 2,393,106 A | 1/1946 | Bernard et al. |
| 2,557,143 A | 6/1951 | Royster |
| 2,572,851 A | 10/1951 | Daniel et al. |
| 2,603,669 A | 7/1952 | Chappell |
| 2,616,842 A | 11/1952 | Charles et al. |
| 2,785,964 A | 3/1957 | Pollock |
| 2,850,403 A | 9/1958 | Day |
| 2,851,403 A | 9/1958 | Hale |
| 2,897,071 A | 7/1959 | Gilbert |
| 2,897,869 A | 8/1959 | Polmanteer |
| 2,951,143 A | 8/1960 | Anderson et al. |
| 3,009,783 A | 11/1961 | Charles et al. |
| 3,073,769 A | 1/1963 | George et al. |
| 3,127,536 A | 3/1964 | McLane |
| 3,253,890 A | 5/1966 | De et al. |
| 3,288,696 A | 11/1966 | Orbach |
| 3,307,923 A | 3/1967 | Ruble |
| 3,308,164 A | 3/1967 | Shepard |
| 3,309,780 A | 3/1967 | Goins |
| 3,331,664 A | 7/1967 | Jordan |
| 3,342,554 A | 9/1967 | Jordan et al. |
| 3,344,051 A | 9/1967 | Latham, Jr. et al. |
| 3,408,164 A | 10/1968 | Johnson |
| 3,409,403 A | 11/1968 | Geir et al. |
| 3,420,632 A | 1/1969 | Ryan et al. |
| 3,431,074 A | 3/1969 | Jordan et al. |
| 3,453,488 A | 7/1969 | Cann et al. |
| 3,464,793 A | 9/1969 | Jordan et al. |
| 3,619,138 A | 11/1971 | Gunnell |
| 3,619,140 A | 11/1971 | Morgan et al. |
| 3,637,974 A | 1/1972 | Tajbl et al. |
| 3,673,375 A | 6/1972 | Camacho et al. |
| 3,725,103 A | 4/1973 | Jordan et al. |
| 3,852,399 A | 12/1974 | Rothbuhr et al. |
| 3,922,335 A | 11/1975 | Jordan et al. |
| 3,959,008 A | 5/1976 | Warner et al. |
| 3,981,654 A | 9/1976 | Rood et al. |
| 3,981,659 A | 9/1976 | Myers |
| 3,984,743 A | 10/1976 | Horie |
| 3,998,934 A | 12/1976 | Vanderveen |
| 4,019,896 A | 4/1977 | Appleby |
| 4,028,072 A | 6/1977 | Braun et al. |
| 4,035,336 A | 7/1977 | Jordan et al. |
| 4,057,396 A | 11/1977 | Matovich |

(Continued)

FOREIGN PATENT DOCUMENTS

| | | |
|---|---|---|
| AU | 2897071 A | 11/1972 |
| BG | 98848 A | 5/1995 |

(Continued)

OTHER PUBLICATIONS

AP-42, Fifth Edition, vol. 1, Chapter 6: Organic Chemical Process Industry, Section 6.1: Carbon Black (1983): 1-10.
Ayala, et al., Carbon Black Elastomer Interaction. Rubber Chemistry and Technology (1991): 19-39.
Bakken, et al., Thermal plasma process development in Norway. Pure and Applied Chemistry 70.6 (1998): 1223-1228.
Biscoe, et al., An X-ray study of carbon black. Journal of Applied physics, 1942; 13: 364-371.
Boehm, Some Aspects of Surface Chemistry of Carbon Blacks and Other Carbons. Carbon. 32.5. (1994): 759-769.
Breeze, Raising steam plant efficiency-Pushing the steam cycle boundaries.PEI Magazine 20.4 (2012) 12 pages.

(Continued)

*Primary Examiner* — Stuart L Hendrickson
(74) *Attorney, Agent, or Firm* — Wilson Sonsini Goodrich & Rosati

(57) ABSTRACT

Particles with suitable properties may be generated. The particles may include carbon particles.

19 Claims, 8 Drawing Sheets

(56) References Cited

U.S. PATENT DOCUMENTS

| | | |
|---|---|---|
| 4,075,160 A | 2/1978 | Mills et al. |
| 4,088,741 A | 5/1978 | Takewell |
| 4,101,639 A | 7/1978 | Surovikin et al. |
| 4,138,471 A | 2/1979 | Lamond et al. |
| 4,199,545 A | 4/1980 | Matovich |
| 4,282,199 A | 8/1981 | Lamond et al. |
| 4,289,949 A | 9/1981 | Raaness et al. |
| 4,292,291 A | 9/1981 | Rothbuhr et al. |
| 4,317,001 A | 2/1982 | Silver et al. |
| 4,372,937 A | 2/1983 | Johnson |
| 4,404,178 A | 9/1983 | Johnson et al. |
| 4,431,624 A | 2/1984 | Casperson |
| 4,452,771 A | 6/1984 | Hunt |
| 4,460,558 A | 7/1984 | Johnson |
| 4,472,172 A | 9/1984 | Sheer et al. |
| 4,543,470 A | 9/1985 | Santen et al. |
| 4,553,981 A | 11/1985 | Fuderer |
| 4,577,461 A | 3/1986 | Cann |
| 4,597,776 A | 7/1986 | Ullman et al. |
| 4,601,887 A | 7/1986 | Dorn et al. |
| 4,678,888 A | 7/1987 | Camacho et al. |
| 4,689,199 A | 8/1987 | Eckert et al. |
| 4,755,371 A | 7/1988 | Dickerson |
| 4,765,964 A | 8/1988 | Gravley et al. |
| 4,766,287 A | 8/1988 | Morrisroe et al. |
| 4,787,320 A | 11/1988 | Raaness et al. |
| 4,864,096 A | 9/1989 | Wolf et al. |
| 4,977,305 A | 12/1990 | Severance, Jr. |
| 5,039,312 A | 8/1991 | Hollis, Jr. et al. |
| 5,045,667 A | 9/1991 | Iceland et al. |
| 5,046,145 A | 9/1991 | Drouet |
| 5,105,123 A | 4/1992 | Ballou |
| 5,138,959 A | 8/1992 | Kulkarni |
| 5,147,998 A | 9/1992 | Tsantrizos et al. |
| 5,206,880 A | 4/1993 | Olsson |
| 5,222,448 A | 6/1993 | Morgenthaler et al. |
| 5,352,289 A | 10/1994 | Weaver et al. |
| 5,399,957 A | 3/1995 | Vierboom |
| 5,427,762 A | 6/1995 | Steinberg et al. |
| 5,476,826 A | 12/1995 | Greenwald et al. |
| 5,481,080 A | 1/1996 | Lynum et al. |
| 5,486,674 A | 1/1996 | Lynum et al. |
| 5,500,501 A | 3/1996 | Lynum et al. |
| 5,527,518 A | 6/1996 | Lynum et al. |
| 5,578,647 A | 11/1996 | Li et al. |
| 5,593,644 A | 1/1997 | Norman et al. |
| 5,602,298 A | 2/1997 | Levin |
| 5,604,424 A | 2/1997 | Shuttleworth |
| 5,611,947 A | 3/1997 | Vavruska |
| 5,673,285 A | 9/1997 | Wittle et al. |
| 5,717,293 A | 2/1998 | Sellers |
| 5,725,616 A | 3/1998 | Lynum et al. |
| 5,749,937 A | 5/1998 | Detering et al. |
| 5,935,293 A | 8/1999 | Detering et al. |
| 5,951,960 A | 9/1999 | Lynum et al. |
| 5,989,512 A | 11/1999 | Lynum et al. |
| 5,997,837 A | 12/1999 | Lynum et al. |
| 6,042,643 A | 3/2000 | Belmont et al. |
| 6,058,133 A | 5/2000 | Bowman et al. |
| 6,068,827 A | 5/2000 | Lynum et al. |
| 6,099,696 A | 8/2000 | Schwob et al. |
| 6,188,187 B1 | 2/2001 | Harlan |
| 6,197,274 B1 | 3/2001 | Mahmud et al. |
| 6,277,350 B1 | 8/2001 | Gerspacher |
| 6,358,375 B1 | 3/2002 | Schwob |
| 6,380,507 B1 | 4/2002 | Childs |
| 6,395,197 B1 | 5/2002 | Detering et al. |
| 6,403,697 B1 | 6/2002 | Mitsunaga et al. |
| 6,441,084 B1 | 8/2002 | Lee et al. |
| 6,442,950 B1 | 9/2002 | Tung |
| 6,444,727 B1 | 9/2002 | Yamada et al. |
| 6,471,937 B1 | 10/2002 | Anderson et al. |
| 6,602,920 B2 | 8/2003 | Hall et al. |
| 6,703,580 B2 | 3/2004 | Brunet et al. |
| 6,773,689 B1 | 8/2004 | Lynum et al. |
| 6,955,707 B2 | 10/2005 | Ezell et al. |
| 7,167,240 B2 | 1/2007 | Stagg |
| 7,294,314 B2 | 11/2007 | Graham |
| 7,312,415 B2 | 12/2007 | Ohmi et al. |
| 7,360,309 B2 | 4/2008 | Vaidyanathan et al. |
| 7,431,909 B1 | 10/2008 | Rumpf et al. |
| 7,452,514 B2 | 11/2008 | Fabry et al. |
| 7,462,343 B2 | 12/2008 | Lynum et al. |
| 7,563,525 B2 | 7/2009 | Ennis |
| 7,582,184 B2 | 9/2009 | Tomita et al. |
| 7,623,340 B1 | 11/2009 | Song et al. |
| 7,635,824 B2 | 12/2009 | Miki et al. |
| 7,655,209 B2 | 2/2010 | Rumpf et al. |
| 7,777,151 B2 | 8/2010 | Kuo |
| 7,847,009 B2 * | 12/2010 | Wong ............... B60C 1/0016 524/496 |
| 7,931,712 B2 | 4/2011 | Zubrin et al. |
| 7,968,191 B2 | 6/2011 | Hampden-Smith et al. |
| 8,147,765 B2 | 4/2012 | Muradov et al. |
| 8,221,689 B2 | 7/2012 | Boutot et al. |
| 8,257,452 B2 | 9/2012 | Menzel |
| 8,277,739 B2 | 10/2012 | Monsen et al. |
| 8,323,793 B2 | 12/2012 | Hamby et al. |
| 8,443,741 B2 | 5/2013 | Chapman et al. |
| 8,471,170 B2 | 6/2013 | Li et al. |
| 8,486,364 B2 | 7/2013 | Vanier et al. |
| 8,501,148 B2 | 8/2013 | Belmont et al. |
| 8,581,147 B2 | 11/2013 | Kooken et al. |
| 8,710,136 B2 | 4/2014 | Yurovskaya et al. |
| 8,771,386 B2 | 7/2014 | Licht et al. |
| 8,784,617 B2 | 7/2014 | Novoselov et al. |
| 8,850,826 B2 | 10/2014 | Ennis |
| 8,871,173 B2 | 10/2014 | Nester et al. |
| 8,911,596 B2 | 12/2014 | Vancina |
| 8,945,434 B2 | 2/2015 | Krause et al. |
| 9,095,835 B2 | 8/2015 | Skoptsov et al. |
| 9,229,396 B1 | 1/2016 | Wu et al. |
| 9,315,735 B2 | 4/2016 | Cole et al. |
| 9,388,300 B2 * | 7/2016 | Dikan ...................... C09C 1/50 |
| 9,445,488 B2 | 9/2016 | Foret |
| 9,574,086 B2 | 2/2017 | Johnson et al. |
| 9,679,750 B2 | 6/2017 | Choi et al. |
| 10,100,200 B2 | 10/2018 | Johnson et al. |
| 10,138,378 B2 | 11/2018 | Hoermman et al. |
| 10,370,539 B2 | 8/2019 | Johnson et al. |
| 10,808,097 B2 | 10/2020 | Hardman et al. |
| 2001/0029888 A1 | 10/2001 | Sundarrajan et al. |
| 2001/0039797 A1 | 11/2001 | Cheng |
| 2002/0000085 A1 | 1/2002 | Hall et al. |
| 2002/0021430 A1 | 2/2002 | Koshelev et al. |
| 2002/0050323 A1 | 5/2002 | Moisan et al. |
| 2002/0051903 A1 | 5/2002 | Masuko et al. |
| 2002/0141476 A1 | 10/2002 | Varela |
| 2002/0157559 A1 | 10/2002 | Brunet et al. |
| 2003/0103858 A1 | 6/2003 | Baran et al. |
| 2003/0136661 A1 | 7/2003 | Kong et al. |
| 2003/0152184 A1 | 8/2003 | Shehane et al. |
| 2004/0045808 A1 | 3/2004 | Fabry et al. |
| 2004/0047779 A1 | 3/2004 | Denison |
| 2004/0071626 A1 | 4/2004 | Smith et al. |
| 2004/0081609 A1 | 4/2004 | Green et al. |
| 2004/0081862 A1 | 4/2004 | Herman |
| 2004/0148860 A1 | 8/2004 | Fletcher |
| 2004/0168904 A1 | 9/2004 | Anazawa et al. |
| 2004/0211760 A1 | 10/2004 | Delzenne et al. |
| 2004/0213728 A1 | 10/2004 | Kopietz et al. |
| 2004/0216559 A1 | 11/2004 | Kim et al. |
| 2004/0247509 A1 | 12/2004 | Newby |
| 2005/0063892 A1 | 3/2005 | Tandon et al. |
| 2005/0063893 A1 | 3/2005 | Ayala et al. |
| 2005/0079119 A1 | 4/2005 | Kawakami et al. |
| 2005/0230240 A1 | 10/2005 | Dubrovsky et al. |
| 2006/0034748 A1 | 2/2006 | Lewis et al. |
| 2006/0037244 A1 | 2/2006 | Clawson |
| 2006/0068987 A1 | 3/2006 | Bollepalli et al. |
| 2006/0107789 A1 | 5/2006 | Deegan et al. |
| 2006/0155157 A1 | 7/2006 | Zarrinpashne et al. |
| 2006/0226538 A1 | 10/2006 | Kawata |
| 2006/0228290 A1 | 10/2006 | Green |

(56) References Cited

U.S. PATENT DOCUMENTS

| | | |
|---|---|---|
| 2006/0239890 A1 | 10/2006 | Chang et al. |
| 2007/0140004 A1 | 6/2007 | Marotta et al. |
| 2007/0183959 A1 | 8/2007 | Charlier et al. |
| 2007/0270511 A1 | 11/2007 | Melnichuk et al. |
| 2007/0293405 A1 | 12/2007 | Zhang et al. |
| 2008/0041829 A1 | 2/2008 | Blutke et al. |
| 2008/0121624 A1 | 5/2008 | Belashchenko et al. |
| 2008/0159947 A1 | 7/2008 | Yurovskaya et al. |
| 2008/0169183 A1 | 7/2008 | Hertel et al. |
| 2008/0182298 A1 | 7/2008 | Day |
| 2008/0226538 A1 | 9/2008 | Rumpf et al. |
| 2008/0233402 A1 | 9/2008 | Carlson et al. |
| 2008/0263954 A1 | 10/2008 | Hammel et al. |
| 2008/0279749 A1 | 11/2008 | Probst et al. |
| 2008/0292533 A1 | 11/2008 | Belmont et al. |
| 2009/0014423 A1 | 1/2009 | Li et al. |
| 2009/0035469 A1 | 2/2009 | Sue et al. |
| 2009/0090282 A1 | 4/2009 | Gold et al. |
| 2009/0142250 A1 | 6/2009 | Fabry et al. |
| 2009/0155157 A1 | 6/2009 | Stenger et al. |
| 2009/0173252 A1 | 7/2009 | Nakata et al. |
| 2009/0208751 A1 | 8/2009 | Green et al. |
| 2009/0230098 A1 | 9/2009 | Salsich et al. |
| 2010/0055017 A1 | 3/2010 | Vanier et al. |
| 2010/0147188 A1 | 6/2010 | Mamak et al. |
| 2010/0249353 A1 | 9/2010 | MacIntosh et al. |
| 2011/0036014 A1 | 2/2011 | Tsangaris et al. |
| 2011/0071692 A1 | 3/2011 | D'Amato et al. |
| 2011/0071962 A1 | 3/2011 | Lim |
| 2011/0076608 A1 | 3/2011 | Bergemann et al. |
| 2011/0089115 A1 | 4/2011 | Lu |
| 2011/0120137 A1 | 5/2011 | Ennis |
| 2011/0138766 A1 | 6/2011 | Elkady et al. |
| 2011/0150756 A1 | 6/2011 | Adams et al. |
| 2011/0155703 A1 | 6/2011 | Winn |
| 2011/0180513 A1 | 7/2011 | Luhrs et al. |
| 2011/0214425 A1 | 9/2011 | Lang et al. |
| 2011/0217229 A1 | 9/2011 | Inomata et al. |
| 2011/0236816 A1 | 9/2011 | Stanyschofsky et al. |
| 2011/0239542 A1 | 10/2011 | Liu et al. |
| 2012/0018402 A1 | 1/2012 | Carducci et al. |
| 2012/0025693 A1 | 2/2012 | Wang et al. |
| 2012/0177531 A1 | 7/2012 | Chuang et al. |
| 2012/0201266 A1 | 8/2012 | Boulos et al. |
| 2012/0232173 A1 | 9/2012 | Juranitch et al. |
| 2012/0292794 A1 | 11/2012 | Prabhu et al. |
| 2013/0039841 A1 | 2/2013 | Nester et al. |
| 2013/0062195 A1 | 3/2013 | Samaranayake et al. |
| 2013/0062196 A1 | 3/2013 | Sin |
| 2013/0092525 A1 | 4/2013 | Li et al. |
| 2013/0105739 A1 | 5/2013 | Bingue et al. |
| 2013/0194840 A1 | 8/2013 | Huselstein et al. |
| 2013/0292363 A1 | 11/2013 | Hwang et al. |
| 2013/0323614 A1 | 12/2013 | Chapman et al. |
| 2013/0340651 A1 | 12/2013 | Wampler et al. |
| 2014/0000488 A1 | 1/2014 | Sekiyama et al. |
| 2014/0057166 A1 | 2/2014 | Yokoyama et al. |
| 2014/0131324 A1 | 5/2014 | Shipulski et al. |
| 2014/0151601 A1 | 6/2014 | Hyde et al. |
| 2014/0166496 A1 | 6/2014 | Lin et al. |
| 2014/0190179 A1 | 7/2014 | Baker et al. |
| 2014/0224706 A1 | 8/2014 | Do et al. |
| 2014/0227165 A1 | 8/2014 | Hung et al. |
| 2014/0248442 A1 | 9/2014 | Luizi et al. |
| 2014/0290532 A1 | 10/2014 | Rodriguez et al. |
| 2014/0294716 A1 | 10/2014 | Susekov et al. |
| 2014/0339478 A1 | 11/2014 | Probst et al. |
| 2014/0345828 A1 | 11/2014 | Ehmann et al. |
| 2014/0357092 A1 | 12/2014 | Singh |
| 2014/0373752 A2 | 12/2014 | Hassinen et al. |
| 2015/0004516 A1 | 1/2015 | Kim et al. |
| 2015/0044105 A1 | 2/2015 | Novoselov |
| 2015/0044516 A1 | 2/2015 | Kyrlidis et al. |
| 2015/0056127 A1 | 2/2015 | Chavan et al. |
| 2015/0056516 A1 | 2/2015 | Hellring et al. |
| 2015/0064099 A1 | 3/2015 | Nester et al. |
| 2015/0087764 A1 | 3/2015 | Sanchez Garcia et al. |
| 2015/0180346 A1 | 6/2015 | Yuzurihara et al. |
| 2015/0210856 A1 | 7/2015 | Johnson et al. |
| 2015/0210857 A1 | 7/2015 | Johnson et al. |
| 2015/0210858 A1 | 7/2015 | Hoermann et al. |
| 2015/0211378 A1 | 7/2015 | Johnson et al. |
| 2015/0217940 A1 | 8/2015 | Si et al. |
| 2015/0218383 A1 | 8/2015 | Johnson et al. |
| 2015/0223314 A1 | 8/2015 | Hoermann et al. |
| 2015/0252168 A1 | 9/2015 | Schuck et al. |
| 2015/0259211 A9 | 9/2015 | Hung et al. |
| 2015/0307351 A1 | 10/2015 | Mabrouk et al. |
| 2016/0030856 A1 | 2/2016 | Kaplan et al. |
| 2016/0152469 A1 | 6/2016 | Chakravarti et al. |
| 2016/0243518 A1 | 8/2016 | Spitzl |
| 2016/0293959 A1 | 10/2016 | Blizanac et al. |
| 2016/0296905 A1 | 10/2016 | Kuhl |
| 2016/0319110 A1 | 11/2016 | Matheu et al. |
| 2017/0034898 A1 | 2/2017 | Moss et al. |
| 2017/0037253 A1 | 2/2017 | Hardman et al. |
| 2017/0058128 A1 | 3/2017 | Johnson et al. |
| 2017/0066923 A1 | 3/2017 | Hardman et al. |
| 2017/0073522 A1 | 3/2017 | Hardman et al. |
| 2017/0117538 A1 | 4/2017 | Bendimerad et al. |
| 2017/0349758 A1 | 12/2017 | Johnson et al. |
| 2018/0015438 A1 | 1/2018 | Taylor et al. |
| 2018/0016441 A1 | 1/2018 | Taylor et al. |
| 2018/0022925 A1 | 1/2018 | Hardman et al. |
| 2018/0340074 A1 | 11/2018 | Wittmann et al. |
| 2018/0366734 A1 | 12/2018 | Korchev et al. |
| 2019/0048200 A1 | 2/2019 | Johnson et al. |
| 2019/0100658 A1 | 4/2019 | Taylor et al. |
| 2019/0153234 A1 | 5/2019 | Hoermann et al. |
| 2019/0338139 A1 | 11/2019 | Hoermann et al. |
| 2020/0239697 A1 | 7/2020 | Wittmann et al. |
| 2020/0291237 A1 | 9/2020 | Hardman et al. |
| 2021/0017031 A1 | 1/2021 | Hardman et al. |
| 2021/0020947 A1 | 1/2021 | Hardman et al. |
| 2021/0071007 A1 | 3/2021 | Hardman et al. |
| 2021/0120658 A1 | 4/2021 | Moss et al. |
| 2021/0261417 A1 | 8/2021 | Cardinal et al. |
| 2022/0272826 A1 | 8/2022 | Hoermann et al. |
| 2023/0136364 A1 | 5/2023 | Johnson et al. |
| 2023/0154640 A1 | 5/2023 | Hardman et al. |
| 2023/0212401 A1 | 7/2023 | Hardman et al. |
| 2023/0257260 A1 | 8/2023 | Kacem et al. |
| 2023/0279234 A1 | 9/2023 | Hoermann et al. |
| 2023/0279235 A1 | 9/2023 | Taylor et al. |
| 2023/0357021 A1 | 11/2023 | Hanson et al. |

FOREIGN PATENT DOCUMENTS

| | | |
|---|---|---|
| CA | 830378 A | 12/1969 |
| CA | 964405 A | 3/1975 |
| CA | 2353752 A1 | 1/2003 |
| CA | 2621749 A1 | 8/2009 |
| CN | 85201622 U | 7/1986 |
| CN | 86104761 A | 2/1987 |
| CN | 85109166 A | 4/1987 |
| CN | 1059541 A | 3/1992 |
| CN | 1076206 A | 9/1993 |
| CN | 1077329 A | 10/1993 |
| CN | 1078727 A | 11/1993 |
| CN | 1082571 A | 2/1994 |
| CN | 1086527 A | 5/1994 |
| CN | 1196032 A | 10/1998 |
| CN | 1398780 A | 2/2003 |
| CN | 1458966 A | 11/2003 |
| CN | 1491740 A | 4/2004 |
| CN | 1644650 A | 7/2005 |
| CN | 1656632 A | 8/2005 |
| CN | 1825531 A | 8/2006 |
| CN | 1833313 A | 9/2006 |
| CN | 101092691 A | 12/2007 |
| CN | 101143296 A | 3/2008 |
| CN | 101193817 A | 6/2008 |
| CN | 101198442 A | 6/2008 |
| CN | 201087175 Y | 7/2008 |

(56) References Cited

FOREIGN PATENT DOCUMENTS

| | | |
|---|---|---|
| CN | 201143494 Y | 11/2008 |
| CN | 101368010 A | 2/2009 |
| CN | 101529606 A | 9/2009 |
| CN | 101534930 A | 9/2009 |
| CN | 101657283 A | 2/2010 |
| CN | 101734620 A | 6/2010 |
| CN | 101946080 A | 1/2011 |
| CN | 101958221 A | 1/2011 |
| CN | 102007186 A | 4/2011 |
| CN | 102060281 A | 5/2011 |
| CN | 102108216 A | 6/2011 |
| CN | 102186767 A | 9/2011 |
| CN | 102350506 A | 2/2012 |
| CN | 102612549 A | 7/2012 |
| CN | 102666686 A | 9/2012 |
| CN | 102702801 A | 10/2012 |
| CN | 202610344 U | 12/2012 |
| CN | 102869730 A | 1/2013 |
| CN | 102993788 A | 3/2013 |
| CN | 103108831 A | 5/2013 |
| CN | 103160149 A | 6/2013 |
| CN | 103391678 A | 11/2013 |
| CN | 203269847 U | 11/2013 |
| CN | 203415580 U | 1/2014 |
| CN | 204301483 U | 4/2015 |
| CN | 104798228 A | 7/2015 |
| CN | 105070518 A | 11/2015 |
| CN | 105073906 A | 11/2015 |
| CN | 105308775 A | 2/2016 |
| CN | 205472672 U | 8/2016 |
| CN | 107709474 A | 2/2018 |
| DE | 211457 A3 | 7/1984 |
| DE | 19807224 A1 | 8/1999 |
| EA | 200300389 A1 | 12/2003 |
| EP | 0315442 A2 | 5/1989 |
| EP | 0325689 A1 | 8/1989 |
| EP | 0616600 A1 | 9/1994 |
| EP | 0635044 B1 | 2/1996 |
| EP | 0635043 B1 | 6/1996 |
| EP | 0861300 A1 | 9/1998 |
| EP | 0982378 A1 | 3/2000 |
| EP | 1017622 A1 | 7/2000 |
| EP | 1088854 A2 | 4/2001 |
| EP | 1188801 A1 | 3/2002 |
| EP | 3099397 A1 | 12/2016 |
| EP | 3100597 A2 | 12/2016 |
| EP | 3253826 A1 | 12/2017 |
| EP | 3253827 A1 | 12/2017 |
| EP | 3253904 A1 | 12/2017 |
| EP | 3331821 A1 | 6/2018 |
| EP | 3347306 A1 | 7/2018 |
| EP | 3350855 A1 | 7/2018 |
| EP | 3448553 A1 | 3/2019 |
| EP | 3448936 A1 | 3/2019 |
| EP | 3592810 A1 | 1/2020 |
| EP | 3612600 A1 | 2/2020 |
| EP | 3676220 A1 | 7/2020 |
| EP | 3676335 A1 | 7/2020 |
| EP | 3676901 A1 | 7/2020 |
| EP | 3700980 A1 | 9/2020 |
| EP | 3774020 A1 | 2/2021 |
| EP | 4225698 A1 | 8/2023 |
| FR | 1249094 A | 12/1960 |
| FR | 2891434 A1 | 3/2007 |
| FR | 2937029 A1 | 4/2010 |
| FR | 3112767 B1 | 5/2023 |
| GB | 395893 A | 7/1933 |
| GB | 987498 A | 3/1965 |
| GB | 1068519 | 5/1967 |
| GB | 1291487 A | 10/1972 |
| GB | 1400266 A | 7/1975 |
| GB | 1492346 A | 11/1977 |
| GB | 2419883 A | 5/2006 |
| JP | S5021983 B1 | 7/1975 |
| JP | S5987800 A | 5/1984 |
| JP | H0011074 | 1/1989 |
| JP | H04228270 | 8/1992 |
| JP | H05226096 A | 9/1993 |
| JP | H06302527 A | 10/1994 |
| JP | H06322615 A | 11/1994 |
| JP | H07500695 A | 1/1995 |
| JP | H07307165 A | 11/1995 |
| JP | H08176463 A | 7/1996 |
| JP | H08319552 A | 12/1996 |
| JP | H09316645 A | 12/1997 |
| JP | H11123562 A | 5/1999 |
| JP | 2001164053 A | 6/2001 |
| JP | 2001253974 A | 9/2001 |
| JP | 2002121422 A | 4/2002 |
| JP | 2004300334 A | 10/2004 |
| JP | 3636623 B2 | 4/2005 |
| JP | 2005235709 A | 9/2005 |
| JP | 2005243410 A | 9/2005 |
| JP | 5226096 B2 | 7/2013 |
| KR | 19980703132 A | 10/1998 |
| KR | 20030046455 A | 6/2003 |
| KR | 20080105344 A | 12/2008 |
| KR | 20140022263 A | 2/2014 |
| KR | 20140075261 A | 6/2014 |
| KR | 20150121142 A | 10/2015 |
| KR | 20170031061 A | 3/2017 |
| RU | 2425795 C2 | 8/2011 |
| RU | 2488984 C2 | 7/2013 |
| TW | 200418933 A | 10/2004 |
| WO | WO-9004852 A1 | 5/1990 |
| WO | WO-9204415 A1 | 3/1992 |
| WO | WO-9312030 A1 | 6/1993 |
| WO | WO-9312031 A1 | 6/1993 |
| WO | WO-9312633 A1 | 6/1993 |
| WO | WO-9318094 A1 | 9/1993 |
| WO | WO-9320152 A1 | 10/1993 |
| WO | WO-9320153 A1 | 10/1993 |
| WO | WO-9323331 A1 | 11/1993 |
| WO | WO-9408747 A1 | 4/1994 |
| WO | WO-9618688 A1 | 6/1996 |
| WO | WO-9703133 A1 | 1/1997 |
| WO | WO-9813428 A1 | 4/1998 |
| WO | WO-0018682 A1 | 4/2000 |
| WO | WO-0224819 A1 | 3/2002 |
| WO | WO-03014018 A1 | 2/2003 |
| WO | WO-2004083119 A1 | 9/2004 |
| WO | WO-2005054378 A1 | 6/2005 |
| WO | WO-2007016418 A2 | 2/2007 |
| WO | WO-2009143576 A1 | 12/2009 |
| WO | WO-2010040840 A2 | 4/2010 |
| WO | WO-2010059225 A1 | 5/2010 |
| WO | WO-2012015313 A1 | 2/2012 |
| WO | WO-2012067546 A2 | 5/2012 |
| WO | WO-2012094743 A1 | 7/2012 |
| WO | WO-2012149170 A1 | 11/2012 |
| WO | WO-2013134093 A1 | 9/2013 |
| WO | WO-2013184074 A1 | 12/2013 |
| WO | WO-2013185219 A1 | 12/2013 |
| WO | WO-2014000108 A1 | 1/2014 |
| WO | WO-2014012169 A1 | 1/2014 |
| WO | WO-2014149455 A1 | 9/2014 |
| WO | WO-2015049008 A1 | 4/2015 |
| WO | WO-2015051893 A1 | 4/2015 |
| WO | WO-2015051898 A1 | 4/2015 |
| WO | WO-2015093947 A1 | 6/2015 |
| WO | WO-2015116797 A1 | 8/2015 |
| WO | WO-2015116798 A1 | 8/2015 |
| WO | WO-2015116800 A1 | 8/2015 |
| WO | WO-2015116807 A1 | 8/2015 |
| WO | WO-2015116811 A1 | 8/2015 |
| WO | WO-2015116943 A2 | 8/2015 |
| WO | WO-2016012367 A1 | 1/2016 |
| WO | WO-2016014641 A1 | 1/2016 |
| WO | WO-2016126598 A1 | 8/2016 |
| WO | WO-2016126599 A1 | 8/2016 |
| WO | WO-2016126600 A1 | 8/2016 |
| WO | WO-2017019683 A1 | 2/2017 |
| WO | WO-2017027385 A1 | 2/2017 |
| WO | WO-2017034980 A1 | 3/2017 |

(56) References Cited

FOREIGN PATENT DOCUMENTS

| WO | WO-2017044594 A1 | 3/2017 |
|---|---|---|
| WO | WO-2017048621 A1 | 3/2017 |
| WO | WO-2017190015 A1 | 11/2017 |
| WO | WO-2017190045 A1 | 11/2017 |
| WO | WO-2018165483 A1 | 9/2018 |
| WO | WO-2018195460 A1 | 10/2018 |
| WO | WO-2019046320 A1 | 3/2019 |
| WO | WO-2019046322 A1 | 3/2019 |
| WO | WO-2019046324 A1 | 3/2019 |
| WO | WO-2019084200 A1 | 5/2019 |
| WO | WO-2019195461 A1 | 10/2019 |
| WO | WO-2022076306 | 4/2022 |
| WO | WO-2023059520 | 4/2023 |
| WO | WO-2023137120 A1 | 7/2023 |
| WO | WO-2023235486 A1 | 12/2023 |

OTHER PUBLICATIONS

Cataldo, The impact of a fullerene-like concept in carbon black science. Carbon 40 (2002): 157-162.
Chiesa, et al., Using Hydrogen as Gas Turbine Fuel. ASME. J. Eng. Gas Turbines Power 127.1. (2005):73-80. doi:10.1115/1.1787513.
Cho, et al., Conversion of natural gas to hydrogen and carbon black by plasma and application of plasma black. Symposia-American Chemical Society, Div. Fuel Chem. 49.1. (2004): 181-183.
Co-pending U.S. Appl. No. 16/097,035, filed Oct. 26, 2018.
Co-pending U.S. Appl. No. 16/445,727, filed Jun. 19, 2019.
Co-pending U.S. Appl. No. 16/563,008, filed Sep. 6, 2019.
Co-pending U.S. Appl. No. 16/807,550, filed Mar. 3, 2020.
Donnet, et al., Carbon Black. New York: Marcel Dekker, (1993): 46, 47 and 54.
Donnet, et al., Observation of Plasma-Treated Carbon Black Surfaces by Scanning Tunnelling Microscopy. Carbon (1994) 32(2): 199-206.
EP16845031.0 Extended European Search Report dated Mar. 18, 2019.
EP16847102.7 Extended European Search Report dated Jul. 5, 2019.
EP17790549.4 Extended European Search Report dated Nov. 26, 2019.
EP17790570.0 Extended European Search Report dated Nov. 8, 2019.
Extended European Search Report for EP Application No. 15742910.1 dated Jul. 18, 2017.
Extended European Search Report for EP Application No. 15743214.7 dated Jan. 16, 2018.
Extended European Search Report for EP Application No. 16747055.8, dated Jun. 27, 2018.
Extended European Search Report for EP Application No. 16747056.6 dated Jun. 27, 2018.
Extended European Search Report for EP Application No. 16747057.4 dated Oct. 9, 2018.
Extended European Search Report for EP Application No. 16835697.0 dated Nov. 28, 2018.
Fabry, et al., Carbon black processing by thermal plasma. Analysis of the particle formation mechanism. Chemical Engineering Science 56.6 (2001): 2123-2132.
Fulcheri, et al., From methane to hydrogen, carbon black and water. International journal of hydrogen energy 20.3 (1995): 197-202.
Fulcheri, et al., Plasma processing: a step towards the production of new grades of carbon black. Carbon 40.2 (2002): 169-176.
Gago, et al., Growth mechanisms and structure of fullerene-like carbon-based thin films: superelastic materials for tribological applications. Trends in Fullerene Research, Published by Nova Science Publishers, Inc. (2007): 1-46.
Garberg, et al., A transmission electron microscope and electron diffraction study of carbon nanodisks. Carbon 46.12 (2008): 1535-1543.
Grivei, et al., A clean process for carbon nanoparticles and hydrogen production from plasma hydrocarbon cracking. Publishable Report, European Commission JOULE III Programme, Project No. JOE3-CT97-0057,circa (2000): 1-25.
Hernandez, et al. Comparison of carbon nanotubes and nanodisks as percolative fillers in electrically conductive composites. Scripta Materialia 58 (2008) 69-72.
Hoyer, et al., Microelectromechanical strain and pressure sensors based on electric field aligned carbon cone and carbon black particles in a silicone elastomer matrix. Journal of Applied Physics 112.9 (2012): 094324.
International Preliminary Report on Patentability for Application No. PCT/US2015/013482 dated Aug. 2, 2016.
International Preliminary Report on Patentability for Application No. PCT/US2015/013484 dated Aug. 2, 2016.
International Preliminary Report on Patentability for Application No. PCT/US2015/013487 dated Aug. 2, 2016.
International Preliminary Report on Patentability for Application No. PCT/US2015/013505 dated Aug. 2, 2016.
International Preliminary Report on Patentability for Application No. PCT/US2015/013510 dated Aug. 2, 2016.
International Preliminary Report on Patentability for Application No. PCT/US2017/030139 dated Oct. 30, 2018.
International Preliminary Report on Patentability for Application No. PCT/US2017/030179 dated Oct. 30, 2018.
International Search Report and Written Opinion for Application No. PCT/US2015/013482 dated Jun. 17, 2015.
International Search Report and Written Opinion for Application No. PCT/US2015/013484 dated Apr. 22, 2015.
International Search Report and Written Opinion for Application No. PCT/US2015/013487 dated Jun. 16, 2015.
International Search Report and Written Opinion for Application No. PCT/US2015/013505 dated May 11, 2015.
International Search Report and Written Opinion for Application No. PCT/US2015/013510 dated Apr. 22, 2015.
International Search Report and Written Opinion for Application No. PCT/US2015/013794 dated Jun. 19, 2015.
International Search Report and Written Opinion for Application No. PCT/US2016/015939 dated Jun. 3, 2016.
International Search Report and Written Opinion for Application No. PCT/US2016/015941 dated Apr. 21, 2016.
International Search Report and Written Opinion for Application No. PCT/US2016/015942 dated Apr. 11, 2016.
International search Report and Written Opinion for Application No. PCT/US2016/044039 dated Oct. 6, 2016.
International Search Report and Written Opinion for Application No. PCT/US2016/045793 dated Oct. 18, 2016.
International Search Report and Written Opinion for Application No. PCT/US2016/047769 dated Dec. 30, 2016.
International Search Report and Written Opinion for Application No. PCT/US2016/050728 dated Nov. 18, 2016.
International search Report and Written Opinion for Application No. PCT/US2016/051261 dated Nov. 18, 2016.
International Search Report and Written Opinion for Application No. PCT/US2017/030139 dated Jul. 19, 2017.
International Search Report and Written Opinion for Application No. PCT/US2017/030179 dated Jul. 27, 2017.
International Search Report and Written Opinion for Application No. PCT/US2018/021627 dated May 31, 2018.
International Search Report and Written Opinion for Application No. PCT/US2018/028619 dated Aug. 9, 2018.
International Search Report and Written Opinion for Application No. PCT/US2018/048374 dated Nov. 21, 2018.
International Search Report and Written Opinion for Application No. PCT/US2018/048378 dated Dec. 20, 2018.
International Search Report and Written Opinion for Application No. PCT/US2018/048381 dated Dec. 14, 2018.
International Search Report for Application No. PCT/US2015/13482 dated Jun. 17, 2015.
International Search Report for Application No. PCT/US2015/13487 dated Jun. 16, 2015.

(56) References Cited

OTHER PUBLICATIONS

Knaapila, et al., Directed assembly of carbon nanocones into wires with an epoxy coating in thin films by a combination of electric field alignment and subsequent pyrolysis. Carbon 49.10 (2011): 3171-3178.
Krishnan, et al., Graphitic cones and the nucleation of curved carbon surfaces. Nature 388.6641 (1997): 451-454.
Larouche, et al., Nitrogen Functionalization of Carbon Black in a Thermo-Convective Plasma Reactor. Plasma Chem Plasma Process (2011) 31: 635-647.
Medalia, et al., Tinting Strength of Carbon Black. Journal of Colloid and Interface Science 40.2. (1972).
Naess, et al., Carbon nanocones: wall structure and morphology. Science and Technology of advanced materials (2009): 7 pages.
Partial International Search Report for Application No. PCT/US2018/028619 dated Jun. 18, 2018.
PCT/US2018/021627 International Search Report and Written Opinion dated May 31, 2018.
PCT/US2018/028619 International Search Report and Written Opinion dated Aug. 9, 2018.
PCT/US2018/048374 International Search Report and Written Opinion dated Nov. 21, 2018.
PCT/US2018/057401 International Search Report and Written Opinion dated Feb. 15, 2019.
PCT/US2018/064538 International Search Report and Written Opinion dated Feb. 19, 2019.
PCT/US2019/025632 International Search Report and Written Opinion dated Jun. 24, 2019.
Polman, et al., Reduction of CO2 emissions by adding hydrogen to natural gas. IEA Green House Gas R&D programme (2003): 1-98.
Pristavita, et al. Carbon blacks produced by thermal plasma: the influence of the reactor geometry on the product morphology. Plasma Chemistry and Plasma Processing 30.2 (2010): 267-279.
Pristavita, et al., Carbon nanoparticle production by inductively coupled thermal plasmas: controlling the thermal history of particle nucleation. Plasma Chemistry and Plasma Processing 31.6 (2011): 851-866.
Pristavita, et al., Volatile Compounds Present in Carbon Blacks Produced by Thermal Plasmas. Plasma Chemistry and Plasma Processing 31.6 (2011): 839-850.
Reese, Resurgence in American manufacturing will be led by the rubber and tire industry. Rubber World. 255. (2017): 18-21 and 23.
Reynolds, Electrode Resistance: How Important is Surface Area. Oct. 10, 2016. p. 3 para[0001]; Figure 3; Retrieved from http://electrotishing.net/2016/10/10/electrode-resistance-how-important-is-surface-area/ on May 8, 2018.
Search Report for Application No. RU2016135213 dated Feb. 12, 2018.
Sun, et al., Preparation of carbon black via arc discharge plasma enhanced by thermal pyrolysis. Diamond & Related Materials (2015), doi: 10.1016/j.diamond.2015.11.004, 47 pages.
Supplementary Partial European Search Report for EP Application No. 15743214.7 dated Sep. 12, 2017.
Translation of Official Notification of RU Application No. 2016135213 dated Feb. 12, 2018.
Tsujikawa, et al., Analysis of a gas turbine and steam turbine combined cycle with liquefied hydrogen as fuel. International Journal of Hydrogen Energy 7.6 (1982): 499-505.
U.S. Appl. No. 14/591,541 Notice of Allowance dated Sep. 17, 2018.
U.S. Environmental Protection Agency, Guide to Industrial Assessments for Pollution Prevention and Energy Efficiency. EPA 625/R-99/003 (1999): 474 pages.
U.S. Appl. No. 14/591,528 Office Action dated Jan. 17, 2019.
U.S. Appl. No. 15/548,346 Office Action dated Oct. 22, 2019.
U.S. Appl. No. 15/548,348 Office Action dated Apr. 25, 2019.
U.S. Appl. No. 14/591,476 Notice of Allowance dated Mar. 20, 2019.
U.S. Appl. No. 14/591,476 Office Action dated Feb. 27, 2017.
U.S. Appl. No. 14/591,476 Office Action dated Jul. 11, 2016.
U.S. Appl. No. 14/591,476 Office Action dated Jun. 7, 2018.
U.S. Appl. No. 14/591,476 Office Action dated Mar. 16, 2016.
U.S. Appl. No. 14/591,476 Office Action dated Oct. 13, 2017.
U.S. Appl. No. 14/591,528 Office Action dated Jan. 16, 2018.
U.S. Appl. No. 14/591,528 Office Action dated Oct. 28, 2019.
U.S. Appl. No. 14/591,541 Notice of Allowance dated Jun. 7, 2018.
U.S. Appl. No. 14/591,541 Office Action dated Feb. 22, 2017.
U.S. Appl. No. 14/591,541 Office Action dated Jul. 14, 2016.
U.S. Appl. No. 14/591,541 Office Action dated Mar. 16, 2016.
U.S. Appl. No. 14/591,541 Office Action dated Oct. 13, 2017.
U.S. Appl. No. 14/601,761 Corrected Notice of Allowance dated Feb. 9, 2018.
U.S. Appl. No. 14/601,761 Ex Parte Quayle Action dated May 19, 2017.
U.S. Appl. No. 14/601,761 Notice of Allowance dated Feb. 9, 2018.
U.S. Appl. No. 14/601,761 Notice of Allowance dated Jan. 18, 2018.
U.S. Appl. No. 14/601,761 Notice of Allowance dated Jun. 19, 2018.
U.S. Appl. No. 14/601,761 Notice of Allowance dated Oct. 11, 2018.
U.S. Appl. No. 14/601,761 Notice of Allowance dated Sep. 17, 2018.
U.S. Appl. No. 14/601,761 Office Action dated Apr. 14, 2016.
U.S. Appl. No. 14/601,761 Office Action dated Oct. 19, 2016.
U.S. Appl. No. 14/601,793 Notice of Allowance dated Oct. 7, 2016.
U.S. Appl. No. 14/601,793 Office Action dated Apr. 13, 2016.
U.S. Appl. No. 14/601,793 Office Action dated Aug. 3, 2016.
U.S. Appl. No. 14/610,299 Notice of Allowance dated Feb. 20, 2020.
U.S. Appl. No. 14/610,299 Office Action dated May 2, 2017.
U.S. Appl. No. 14/610,299 Office Action dated Sep. 25, 2018.
U.S. Appl. No. 15/221,088 Office Action dated Apr. 20, 2018.
U.S. Appl. No. 15/221,088 Office Action dated Dec. 23, 2016.
U.S. Appl. No. 15/221,088 Office Action dated Dec. 4, 2019.
U.S. Appl. No. 15/221,088 Office Action dated Mar. 7, 2019.
U.S. Appl. No. 15/221,088 Office Action dated Sep. 19, 2017.
U.S. Appl. No. 15/229,608 Office Action dated Apr. 8, 2019.
U.S. Appl. No. 15/229,608 Office Action dated Oct. 25, 2019.
U.S. Appl. No. 15/241,771 Office Action dated Jul. 6, 2018.
U.S. Appl. No. 15/241,771 Office Action dated Mar. 13, 2019.
U.S. Appl. No. 15/241,771 Office Action dated Sep. 25, 2019.
U.S. Appl. No. 15/259,884 Office Action dated Feb. 25, 2020.
U.S. Appl. No. 15/259,884 Office Action dated Jan. 9, 2018.
U.S. Appl. No. 15/259,884 Office Action dated May 31, 2019.
U.S. Appl. No. 15/259,884 Office Action dated Oct. 11, 2018.
U.S. Appl. No. 15/262,539 Office Action dated Jun. 1, 2018.
U.S. Appl. No. 15/262,539 Office Action dated Jan. 4, 2019.
U.S. Appl. No. 15/262,539 Office Action dated Sep. 19, 2019.
U.S. Appl. No. 15/410,283 Office Action dated Jan. 16, 2020.
U.S. Appl. No. 15/410,283 Office Action dated Jun. 7, 2018.
U.S. Appl. No. 15/410,283 Office Action dated Mar. 12, 2019.
U.S. Appl. No. 15/548,348 Notice of Allowance dated Dec. 12, 2019.
U.S. Appl. No. 15/548,352 Office Action dated Jan. 31, 2020.
U.S. Appl. No. 15/548,352 Office Action dated May 9, 2019.
U.S. Appl. No. 15/548,352 Office Action dated Oct. 10, 2018.
U.S. Appl. No. 16/159,144 Office Action dated Mar. 26, 2020.
Verfondern, Nuclear Energy for Hydrogen Production. Schriften des Forschungzentrum Julich 58 (2007): 4 pages.
Wikipedia, Heating Element. Oct. 14, 2016. p. 1 para[0001]. Retrieved from https://en.wikipedia.org/w/index.php?title=Heating_element &oldid=744277540 on May 9, 2018.
Wikipedia, Joule Heating. Jan. 15, 2017. p. 1 para[0002]. Retrieved from https://en.wikipedia.org/w/index . Dhp?title=Joule_heating &oldid=760136650 on May 9, 2018.
ASTM International: Standard Test Method for Carbon Black—Morphological Characterization of Carbon Black Using Electron Microscopy, D3849-07 (2011); 7 Pages.
Carmer, et al., Formation of silicon carbide particles behind shock waves. Appl. Phys. Lett. 54 (15), Apr. 10, 1989. 1430-1432.
Co-pending U.S. Appl. No. 17/021,197, inventors Hardman; Ned J. et al., filed Sep. 15, 2020.

(56) References Cited

OTHER PUBLICATIONS

Co-pending U.S. Appl. No. 17/031,484, inventors Johnson; Peter L. et al., filed Sep. 24, 2020.
Co-pending U.S. Appl. No. 17/072,416, inventors Taylor; Roscoe W. et al., filed Oct. 16, 2020.
Co-pending U.S. Appl. No. 17/239,041, inventors Hardmanned; J. et al., filed Apr. 23, 2021.
Co-pending U.S. Appl. No. 17/245,296, inventors Johnsonpeter; L. et al., filed Apr. 30, 2021.
Co-pending U.S. Appl. No. 17/329,532, inventors Taylorroscoe; W. et al., filed May 25, 2021.
Co-pending U.S. Appl. No. 17/412,913, inventors Johnson; Peter L. et al., filed Aug. 26, 2021.
Co-pending U.S. Appl. No. 17/473,106, inventors Taylorroscoe; W. et al., filed Sep. 13, 2021.
Co-pending U.S. Appl. No. 17/487,982, inventors Hoermannalexander; F. et al., filed Sep. 28, 2021.
Co-pending U.S. Appl. No. 17/529,928, inventors Hardmanned; J. et al., filed Nov. 18, 2021.
Co-pending U.S. Appl. No. 17/565,864, inventors Taylorroscoe; W. et al., filed Dec. 30, 2021.
Co-pending U.S. Appl. No. 17/741,161, inventors Hoermann; Alexander F. et al., filed May 10, 2022.
Co-pending U.S. Appl. No. 17/862,242, inventors Hardman; Ned J. et al., filed Jul. 11, 2022.
Co-pending U.S. Application No. 202117498693, inventors Johnsonpeter; L. et al., filed on Oct. 11, 2021.
Database WPI, Week 200323, 2017 Clarivate Analytics. Thomson Scientific, London, GB; Database accession No. 2003-239603, XP002781693.
EP18764428.1 Extended European Search Report dated Jan. 11, 2021.
EP18788086.9 Extended European Search Report dated Jan. 11, 2021.
EP18850029.2 Extended European Search Report dated Apr. 29, 2021.
EP18850502.8 Extended European Search Report dated Feb. 25, 2021.
EP18851605.8 Extended European Search Report dated Feb. 25, 2021.
EP18869902.9 Extended European Search Report dated Mar. 19, 2021.
EP19780959.3 Extended European Search Report dated Dec. 21, 2021.
Frenklach, et al., Silicon carbide and the origin of interstellar carbon grains. Nature, vol. 339; May 18, 1989: 196-198.
Gomez-Pozuelo, et al., Hydrogen production by catalytic methane decomposition over rice husk derived silica. Fuel, Dec. 15, 2021; 306: 121697.
Invitation to Pay Additional Fees in PCT/US2018/028619 dated Jun. 18, 2018.
Invitation to Pay Additional Fees in PCT/US2018/048378 dated Oct. 26, 2018.
Invitation to Pay Additional Fees in PCT/US2018/048381 dated Oct. 9, 2018.
Invitation to Pay Additional Fees in PCT/US2018/057401 dated Dec. 19, 2018.
Long C. M., et al., "Carbon black vs. black carbon and other airborne materials containing elemental carbon: Physical and chemical distinctions", Environmental Pollution, 2013, 181, pp. 271-286. https://doi.org/10.1016/j.envpol.2013.06.009.
PCT/US2021/053371 International Search Report and Written Opinion dated Feb. 17, 2022.
Separation of Flow. (2005). Aerospace, Mechanical & Mechatronic Engg. Retrieved Jul. 16, 2020, from http://www-mdp.eng.cam.ac.uk/web/library/enginfo/aerothermal_dvd_only/aero/fprops/introvisc/node9.html.
U.S. Appl. No. 16/657,386 Notice of Allowance dated May 20, 2022.
U.S. Appl. No. 14/591,528 Office Action dated Sep. 11, 2020.
U.S. Appl. No. 14/610,299 Notice of Allowance dated Dec. 13, 2021.
U.S. Appl. No. 14/610,299 Notice of Allowance dated Nov. 16, 2021.
U.S. Appl. No. 14/610,299 Office Action dated Feb. 17, 2021.
U.S. Appl. No. 15/229,608 Office Action dated Apr. 4, 2022.
U.S. Appl. No. 15/229,608 Office Action dated Feb. 1, 2021.
U.S. Appl. No. 15/229,608 Office Action dated May 15, 2020.
U.S. Appl. No. 15/241,771 Office Action dated Dec. 30, 2021.
U.S. Appl. No. 15/241,771 Office Action dated Jul. 18, 2022.
U.S. Appl. No. 15/241,771 Office Action dated May 1, 2020.
U.S. Appl. No. 15/259,884 Office Action dated Jun. 18, 2021.
U.S. Appl. No. 15/259,884 Office Action dated Mar. 4, 2022.
U.S. Appl. No. 15/262,539 Notice of Allowance dated Jul. 23, 2020.
U.S. Appl. No. 15/262,539 Notice of Allowance dated Jun. 18, 2020.
U.S. Appl. No. 15/410,283 Office Action dated Jul. 31, 2020.
U.S. Appl. No. 15/548,346 Office Action dated Jul. 16, 2021.
U.S. Appl. No. 15/548,346 Office Action dated Mar. 18, 2022.
U.S. Appl. No. 15/548,346 Office Action dated May 4, 2020.
U.S. Appl. No. 15/548,352 Office Action dated Apr. 7, 2022.
U.S. Appl. No. 15/548,352 Office Action dated Aug. 11, 2020.
U.S. Appl. No. 15/548,352 Office Action dated Sep. 21, 2021.
U.S. Appl. No. 16/097,035 Notice of Allowance dated Jul. 7, 2022.
U.S. Appl. No. 16/097,035 Notice of Allowance dated Mar. 24, 2022.
U.S. Appl. No. 16/097,035 Office Action dated May 10, 2021.
U.S. Appl. No. 16/097,035 Office Action dated Oct. 30, 2020.
U.S. Appl. No. 16/097,039 Notice of Allowance dated Jun. 14, 2021.
U.S. Appl. No. 16/097,039 Office Action dated Nov. 18, 2020.
U.S. Appl. No. 16/180,635 Notice of Allowance dated Jul. 8, 2021.
U.S. Appl. No. 16/180,635 Notice of Allowance dated Jun. 29, 2021.
U.S. Appl. No. 16/180,635 Office Action dated Dec. 15, 2020.
U.S. Appl. No. 16/445,727 Office Action dated Apr. 15, 2022.
U.S. Appl. No. 16/445,727 Office Action dated Aug. 17, 2021.
U.S. Appl. No. 16/563,008 Office Action dated Jul. 25, 2022.
U.S. Appl. No. 16/657,386 Office Action dated Nov. 12, 2021.
U.S. Appl. No. 16/802,174 Office Action dated Feb. 16, 2022.
U.S. Appl. No. 16/855,276 Notice of Allowance dated May 11, 2022.
U.S. Appl. No. 16/855,276 Office Action dated Apr. 5, 2021.
U.S. Appl. No. 16/855,276 Office Action dated Oct. 25, 2021.
U.S. Appl. No. 16/892,199 Office Action dated Jun. 27, 2022.
What is Carbon Black, Orion Engineered Carbons, (Year: 2015).
ASTM International Designation: D6556-14. Standard Test Method for Carbon Black—Total and External Surface Area by Nitrogen Adsorption1, 2014. 5 Pages.
Co-pending U.S. Appl. No. 18/066,929, inventor Alexander; F. Hoermann, filed Dec. 15, 2022.
Co-pending U.S. Appl. No. 18/137,918, inventors John; Jared Moss et al., filed Apr. 21, 2023.
Co-pending U.S. Appl. No. 18/172,835, inventor Ned; J. Hardman, filed Feb. 22, 2023.
Co-pending U.S. Appl. No. 18/205,384, inventors Ned; J. Hardman et al., filed Jun. 2, 2023.
Co-pending U.S. Appl. No. 18/233,129, inventors Alexander; F. Hoermann et al., filed Aug. 11, 2023.
Co-pending U.S. Appl. No. 18/295,584, inventors Robert; J. Hanson et al., filed Apr. 4, 2023.
Lee, et al., Application of Thermal Plasma for Production of Hydrogen and Carbon Black from Direct Decomposition of Hydrocarbon, Appl. Chem. Eng., vol. 18, No. 1, Feb. 2007, pp. 84-89.
PCT/US2022/045451 International Search Report and Wrtitten Opinion dated Feb. 17, 2023.
PCT/US2023/010695 International Search Report and Written Opinion dated Jun. 22, 2023.
PCT/US2023/024148 International Search Report and Written Opinion dated Sep. 27, 2023.
U.S. Appl. No. 15/229,608 Office Action dated Jun. 29, 2023.
U.S. Appl. No. 15/229,608 Office Action dated Nov. 28, 2022.
U.S. Appl. No. 15/241,771 Office Action dated Dec. 16, 2022.

(56) References Cited

OTHER PUBLICATIONS

U.S. Appl. No. 15/241,771 Office Action dated Jan. 18, 2023.
U.S. Appl. No. 15/241,771 Office Action dated Sep. 1, 2023.
U.S. Appl. No. 15/548,346 Office Action dated Jun. 5, 2023.
U.S. Appl. No. 15/548,346 Office Action dated Oct. 3, 2022.
U.S. Appl. No. 16/445,727 Notice of Allowance dated Feb. 2, 2023.
U.S. Appl. No. 16/445,727 Notice of Allowance dated Oct. 26, 2022.
U.S. Appl. No. 16/563,008 Office Action dated Mar. 16, 2023.
U.S. Appl. No. 16/657,386 Notice of Allowance dated Mar. 10, 2023.
U.S. Appl. No. 16/657,386 Office Action dated Sep. 16, 2022.
U.S. Appl. No. 16/802,174 Office Action dated Aug. 31, 2022.
U.S. Appl. No. 16/802,174 Office Action dated Oct. 4, 2023.
U.S. Appl. No. 16/802,212 Office Action dated Jul. 17, 2023.
U.S. Appl. No. 16/802,212 Office Action dated Sep. 16, 2022.
U.S. Appl. No. 16/892,199 Notice of Allowance dated Jan. 23, 2023.
U.S. Appl. No. 16/892,199 Notice of Allowance dated Jan. 31, 2023.
U.S. Appl. No. 17/062,075 Office Action dated Jun. 14, 2023.
U.S. Appl. No. 17/498,693 Office Action dated Apr. 3, 2023.
U.S. Appl. No. 17/565,864 Office Action dated Aug. 15, 2023.
U.S. Appl. No. 17/669,183 Office Action dated Aug. 23, 2023.
U.S. Appl. No. 17/817,482 Office Action dated Mar. 29, 2023.
U.S. Appl. No. 17/819,075 Office Action dated Oct. 5, 2023.
U.S. Appl. No. 17/938,591 Office Action dated Sep. 25, 2023.
U.S. Appl. No. 18/046,723 Notice of Allowance dated Apr. 12, 2023.
U.S. Appl. No. 18/046,723 Notice of Allowance dated Aug. 7, 2023.
Co-pending U.S. Application No. 202318381881, inventors Hardman; Ned J. et al., filed on Oct. 19, 2023.
Co-pending U.S. Application No. 202318384704, inventors Johnson; Peter L. et al., filed on Oct. 27, 2023.
U.S. Appl. No. 15/241,771 Notice of Allowance dated Nov. 20, 2023.
U.S. Appl. No. 16/563,008 Notice of Allowance dated Nov. 6, 2023.
U.S. Appl. No. 18/137,918 Office Action dated Nov. 17, 2023.
Co-pending U.S. Appl. No. 18/433,023, inventors Johnson; Peter L. et al., filed Feb. 5, 2024.
U.S. Appl. No. 15/229,608 Office Action dated Jan. 23, 2024.
U.S. Appl. No. 15/548,346 Notice of Allowance dated Jan. 18, 2024.
U.S. Appl. No. 15/548,346 Notice of Allowance dated Jan. 30, 2024.
U.S. Appl. No. 16/802,174 Office Action dated Feb. 12, 2024.
U.S. Appl. No. 17/498,693 Office Action dated Jan. 9, 2024.
U.S. Appl. No. 17/565,864 Notice of Allowance dated Feb. 1, 2024.
U.S. Appl. No. 17/669,183 Office Action dated Jan. 5, 2024.
U.S. Appl. No. 17/817,482 Office Action dated Dec. 7, 2023.
U.S. Appl. No. 17/938,591 Notice of Allowance dated Feb. 9, 2024.
Zhang, H. et al., Rotating gliding arc assisted methane decomposition in nitrogen for hydrogen production, Intern. J. Hydrogen Energy, 2014, 39, pp. 12620-12635 (Jul. 11, 2014).
Co-pending U.S. Appl. No. 18/581,888, inventor Johnson; Peter Louis, filed Feb. 20, 2024.

* cited by examiner

SYSTEMS AND METHODS FOR PARTICLE GENERATION

CROSS-REFERENCE

This application is a continuation of International Application No. PCT/US2018/048374, filed Aug. 28, 2018, which claims the benefit of U.S. Provisional Application No. 62/551,063, filed Aug. 28, 2017, which are entirely incorporated herein by reference.

BACKGROUND

Particles are used in many household and industrial applications. The particles may be produced by various chemical processes. Performance and energy supply associated with such chemical processes has evolved over time.

SUMMARY

The present disclosure provides, for example, a carbon particle with a surface area/electron microscope surface area (STSA/EMSA) ratio greater than or equal to about 1.3. The STSA/EMSA ratio may be greater than or equal to about 1.4. The carbon particle may have a lattice constant ($L_c$) greater than about 3.0 nm and a statistical thickness surface area/nitrogen surface area (STSA/N2SA) ratio from about 1.01 to about 1.4. The STSA/N2SA ratio may be from about 1.01 to about 1.35. A Z average particle size of the carbon particle as measured by dynamic light scattering (DLS) may be at least about 30% greater than a value predicted based on the equation $D_a = (2540 + 71 \langle DBP \rangle)/S$, where $D_a$ is maximum aggregate diameter in nanometers, S is STSA in $m^2/g$, and $\langle DBP \rangle$ is equal to the volume of dibutylphthalate in ml/100 g in accordance with standard test procedure ASTM D2414. The carbon particle may have a nitrogen surface area (N2SA) that is between about 30 $m^2/g$ and 400 $m^2/g$. The N2SA may be between about 40 $m^2/g$ and 80 $m^2/g$. The N2SA may be between about 80 $m^2/g$ and 150 $m^2/g$. Total extractable PAHs of the carbon particle may be less than about 1 ppm. The carbon particle may have a tote greater than about 99.8%. The carbon particle may have a total sulfur content of less than about 50 ppm. The carbon particle may have an oxygen content of less than or equal to about 0.4% oxygen by weight. The carbon particle may have a hydrogen content of less than about 0.4% hydrogen by weight. The carbon particle may have a carbon content of greater than or equal to about 99% carbon by weight. The carbon particle may have a moisture content of less than or equal to about 0.3% by weight. The carbon particle may have an affinity to adsorb water from an 80% relative humidity atmosphere of less than about 0.5 ml (milliliter) of water per square meter of surface area of the carbon particle. The affinity to adsorb water from an 80% relative humidity atmosphere may be less than about 0.05 ml of water per square meter of surface area of the carbon particle. The carbon particle may have a water spreading pressure (WSP) between about 0 and about 8 $mJ/m^2$. The WSP may be less than about 5 $mJ/m^2$. The carbon particle may have a total surface acid group content of less than or equal to about 0.5 $\mu mol/m^2$. The carbon particle may have a boron concentration that is between about 0.05% and 7% on a solids weight basis. The carbon particle may be made in a once-through process. The carbon particle may be prepared from a hydrocarbon. The hydrocarbon may be natural gas. A plurality of the carbon particles may be provided. A percent free space of at least about 5% of the plurality of the carbon particles may be about 90% or greater based on number count. Structure of the plurality of the carbon particles may be greater than about 100 ml/100 grams. The plurality of the carbon particles may have a total ash content of less than or equal to about 1%. The total ash content may be less than about 0.02%. Less than or equal to about 90% of the ash content may be metal impurities of Fe, Ni and/or Co. The plurality of the carbon particles may comprise less than about 5 ppm Fe, less than about 200 ppb Cr, less than about 200 ppb Ni, less than about 10 ppb Co, less than about 10 ppb Zn, less than about 10 ppb Sn, or any combination thereof. The plurality of the carbon particles may comprise substantially no particles larger than about (i) 20 microns, (ii) 30 microns or (iii) 40 microns. A volume resistivity of the plurality of the carbon particles may be less than about 0.3 ohm-centimeter (ohm-cm) at 2 megapascals (MPa). An energy storage device may comprise the carbon particle. The energy storage device may be a battery. The battery may be a lithium-ion, lithium sulfur, nickel metal hydride (NiMH), lead acid or nickel cadmium (NiCd) battery. The lithium-ion battery may be a primary or secondary battery. A polymer may comprise the carbon particle. A coating may comprise the carbon particle. An ink may comprise the carbon particle. A tire may comprise a rubber that comprises the carbon particle. A paint may comprise the carbon particle. An elastomer composite may comprise the carbon particle.

These and additional embodiments are further described below.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

DETAILED DESCRIPTION

Figure 1:
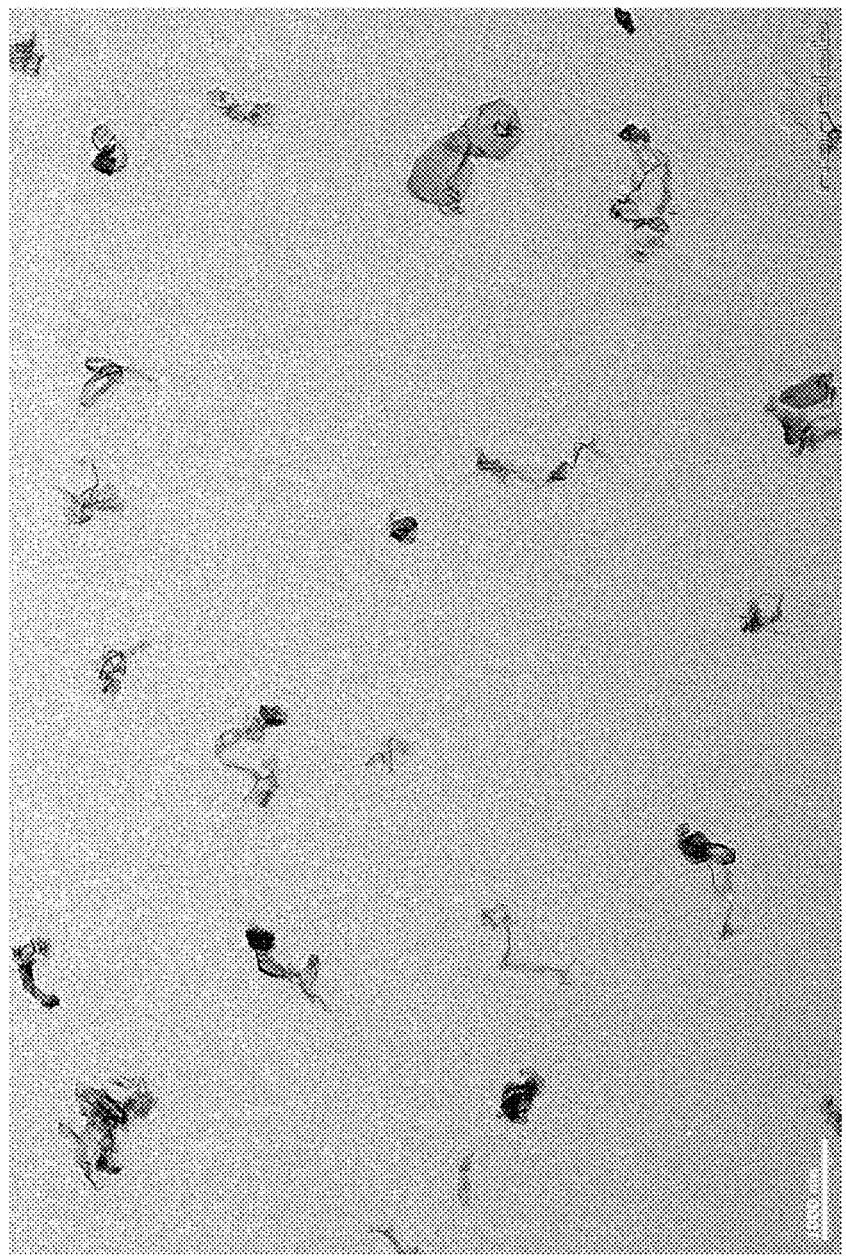
FIG. 1 shows a transmission electron microscope (TEM) image of examples of a particle made in accordance with a process of the present disclosure.

The particulars shown herein are by way of example and for purposes of illustrative discussion of the various embodiments of the present invention only and are presented in the cause of providing what is believed to be the most useful and readily understood description of the principles and conceptual aspects of the invention. In this regard, no attempt is made to show details of the invention in more detail than is necessary for a fundamental understanding of the invention, the description making apparent to those skilled in the art how the several forms of the invention may be embodied in practice.

The present invention will now be described by reference to more detailed embodiments. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise. All publications, patent applications, patents, and other references mentioned herein are expressly incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

Additional advantages of the invention will be set forth in part in the description which follows, and in part will be obvious from the description, or may be learned by practice of the invention. It is to be understood that both the foregoing general description and the following detailed description are exemplary and explanatory only and are not restrictive of the invention, as claimed. It shall be understood that different aspects of the invention can be appreciated individually, collectively, or in combination with each other.

The present disclosure provides systems and methods for affecting chemical changes. Such systems and methods may be used to implement process(es) described herein. The systems and methods described herein may use electrical energy to affect chemical changes. Affecting such chemical changes may include making particles using the systems and methods of the present disclosure. Provided herein are particles and processes for their synthesis. The particles may be carbon particles. The chemical changes described herein may be (e.g., primarily, substantially, entirely or at least in part) affected using energy not associated or closely connected with raw materials used to convert hydrocarbon-containing materials into carbon particles. The carbon particles may be prepared from a hydrocarbon. For example, the carbon particles may be prepared through the use of natural gas precursor hydrocarbon (e.g., the hydrocarbon may be natural gas). The systems and methods herein may be used to produce improved particles (e.g., improved carbon particles). While such particles may be described herein primarily in terms of or in the context of carbon particles, the particles of the present disclosure may include other types of particles.

A carbon particle of the present disclosure may be a primary particle (also "carbon primary particle" herein). A carbon particle of the present disclosure may be an aggregate (also "carbon particle aggregate" and "particle aggregate" herein). The aggregate may comprise two or more (e.g., a plurality of) primary particles. The term carbon particle may refer to a primary particle, an aggregate, or both (e.g., the primary particle and the aggregate are both particles). The term particle, as used herein, may refer to a carbon particle, unless used in the context of large particle contamination. One or more aggregates may form an agglomerate (also "carbon particle agglomerate" and "particle agglomerate" herein). The agglomerate may comprise aggregates held/kept together by van der Waals forces. The term carbon particle may be used interchangeably with the term agglomerate, or may be used to refer to an agglomerate, in some contexts. Any description of carbon particles herein may equally apply to carbon particle aggregates at least in some configurations, and vice versa (e.g., in relation to degassing).

Carbon particles of the present disclosure may comprise fine particles. A fine particle may be a particle that has at least one dimension that is less than 100 nanometers (nm). A fine particle may be a particle (e.g., an aggregate) that is smaller than about 5 micrometers (microns) average size when measured in the largest dimension via scanning or transmission electron microscopy. A fine particle may be a particle for which the volume equivalent sphere possesses a diameter (also "equivalent sphere diameter" and "volume equivalent sphere diameter" herein) from (e.g., about) 1 micron to (e.g., about) 5 microns (e.g., displacement of liquid is equivalent to a 1 micron to 5 micron sphere per particle). A fine particle may be a particle for which the size as determined by DLS (e.g., hydrodynamic diameter) may be from (e.g., about) 2 micron to (e.g., about) 10 microns. The carbon particles may comprise spherical and/or ellipsoidal fine carbon particles. Spherical or ellipsoidal particles may mean singular particles and may also mean a plurality of particles that are stuck together in a fashion analogous to that of a bunch of grapes or aciniform. Carbon black may be an example of this type of fine carbon particle. The carbon particles may comprise few layer graphenes (FLG), which may comprise particles that possess two or more layers of graphene and have a shape that is best described as flat or substantially flat. The carbon particles may be substantially in disk form. A carbon particle may include a carbon nanoparticle. A carbon nanoparticle may include, for example, any particle which is 90% or greater carbon, has a surface area greater than (e.g., about) 5 square meters per gram ($m^2/g$), 10 $m^2/g$ or 15 $m^2/g$, and for which the volume equivalent sphere possesses a diameter of less than (e.g., about) 1 micron (e.g., displacement of liquid is equivalent to a 1 micron sphere or less per particle). A carbon nanoparticle may include, for example, any particle which is 90% or greater carbon, has a surface area greater than (e.g., about) 5 square meters per gram ($m^2/g$), 10 $m^2/g$ or 15 $m^2/g$, and for which the size as determined by DLS (e.g., hydrodynamic diameter) may be less than (e.g., about) 2 micron. This may comprise many different shapes including needles, tubes, plates, disks, bowls, cones, aggregated disks, few layer graphene (FLG), ellipsoidal, aggregated ellipsoidal, spheres, and aggregated spheres (e.g., carbon black), as non-limiting examples. The carbon nanoparticles may also comprise a plurality of these particle shapes. The carbon nanoparticles may comprise one or more of these particle shapes separately (e.g., a first discrete primary particle may have a first (primary) particle shape while a second discrete primary particle may have a second (primary) particle shape that is different from the first (primary) particle shape) and/or within one discrete primary particle or aggregate (e.g., for example, a given discrete primary particle may have a combination of such particle shapes). For example, the carbon nanoparticles may comprise a plurality of these particle shapes separately as well as within one discrete particle (e.g., primary particle or aggregate). At least 90% of the particles in any given sample of carbon nanoparticles on a number basis may fall within the confines of this definition of carbon nanoparticles.

The carbon particles described herein may be advantageously used, for example, in paints, in coatings, in inks, in elastomer composites for tires (e.g., as a filler in polymers), in various materials/applications (e.g., as conductive fillers in various materials/applications such as, for example, elastomers, polymers, coatings, inks, greases, adhesives, tapes, electromagnetic interference gaskets and seals, sealants, etc.), and/or in energy storage devices (e.g., as conductive additives or agents in energy storage devices such as, for example, batteries (e.g., lithium-ion batteries (also "Li-ion batteries" herein), etc.)). The carbon particles may comprise carbonaceous pigment/colorant.

Carbon particles and processes of the present disclosure may be used to overcome various shortcomings (e.g., impurities, size dimensions, resource intensity, etc.) of, for example, existing carbon black species (e.g., taken from the following types of amorphous, carbonaceous, nanoparticle domain subtypes: furnace black, acetylene black and thermal black), graphenes, single-wall(ed) nanotubes (SWNTs), multi-wall(ed) nanotubes (MWNTs), vapor grown carbon fibers (VGCFs), and/or their respective synthesis processes (e.g., as described in greater detail elsewhere herein). Any description (e.g., comparison) herein of (e.g., such) other carbon particles (e.g., other carbon nanoparticles, other carbon blacks, other carbon blacks that are used in a given application, etc.) or other conductive additives may equally apply to existing carbon particles (e.g., existing carbon black) and/or typical carbon particles (e.g., typical carbon blacks and/or graphene/nanotubes) at least in some configurations, and vice versa. The carbon particles described herein may be inherently higher purity than any carbon black that can be purchased and also more pure than purified carbon nanotubes and/or graphene without the added risk of a purification process, as described elsewhere herein. The carbon nanoparticles described herein may be more crystalline than typical carbon blacks and/or graphene/nanotubes.

Carbon particles of the present disclosure may have given (e.g., desirable/advantageous) attributes or properties (or any combinations thereof). The carbon particle(s) of the present disclosure may have a combination of properties described herein. In some examples, the carbon particle(s) may have one or more (e.g., all) of the properties described herein as made (e.g., in a one-step process). For example, elemental analysis and/or at least a subset of (e.g., all) other properties described herein may be for carbon particle(s) as made (also "as produced" herein).

Carbon particles of the present disclosure may have purity, surface area (e.g., N2SA), structure, conductivity and/or other properties suitable for given application(s) (e.g., for battery applications). The production processes described herein may allow for the production of a variety of surface areas and structures. The present disclosure may provide (e.g., due to high purity input natural gas) extreme high purity product. The present disclosure may provide (e.g., due to high purity input natural gas) product that is of comparable quality and purity to the acetylene black process. An even more pure product may be made at scale through the careful consideration of all materials of construction (e.g., an even more pure product may be achieved at scale through the use of natural gas as described herein in combination with careful manipulation of materials of construction), such as, for example, replacing given parts made from or comprising carbon steel with parts made from or comprising stainless steel, lining ceramic parts with high abrasion ceramic, lining specific areas with carbonaceous material(s) (e.g., hardened epoxy, graphite and/or other such non-porous materials that do not contribute to impurities in the product), replacing hardened stainless steel with tungsten carbide and/or other suitable material, etc. The product may have substantially no (e.g., no) metal contamination (e.g., Fe, Cu, Zn, etc.), and/or substantially no (e.g., no) large particle (e.g., grit) contamination (e.g., <30 micron). The carbon particles of the present disclosure may have very low moisture content (e.g., <0.2% by weight). Advantages over existing (e.g., competitive) technologies may include, but are not limited to, feedstock and/or installed base purity cleanliness issues and/or high use of water quench of furnace black, final product impurity levels (e.g., of nanotubes) that are higher than desired (e.g., >1% by weight ash with a major constituent being metal impurities of Fe, Ni and/or Co), additional ability to reduce PAH levels to parts per million scale, or any combination thereof. The carbon particles described herein may have, for example, suitable surface area and structure at a suitable particle size (e.g., a suitable primary particle size, as described elsewhere herein) and increased crystallinity compared to other carbon particles (e.g., other carbon nanoparticles). The aforementioned properties and characteristics may be provided in concert, or as various combinations or subsets thereof.

The carbon particle(s) may have a given purity. A high purity may correspond to low contamination and/or impurities. The contamination may include, for example, ash, grit (or any subset thereof), or any combination thereof (e.g., large particle contamination). Grit may comprise or be particles with an equivalent sphere diameter larger than (e.g., about) 5 micron. Grit may comprise or be carbonaceous and/or non-carbonaceous particles with an equivalent sphere diameter larger than (e.g., about) 5 micron. Grit may comprise or include carbon material (coke), metal, metalloid and/or metal/metalloid compound material (e.g., metal/metalloid oxides, hydroxides, sulfides, selenides, etc. such as, for example, metal oxide remains), ionic material (e.g., salts of monoatomic ions, polyatomic ions, etc.), or any combination thereof. The coke (e.g., coke particles) may comprise primarily (e.g., substantially all) carbon. Upon/after heating, non-vaporized materials (e.g., metal oxide material) may remain and provide ash (e.g., measured by ASTM D1506, as described elsewhere herein). The ash may comprise materials that have not decomposed and/or vaporized upon/after heating in an oxygen environment at 550° C., as prescribed by ASTM D1506-99. The ash may comprise or include metal, metalloid and/or metal/metalloid compound material, and/or ionic material. Alternatively, or in addition, purity may be used herein to refer to and/or to also include other types of contamination or impurities. For example, high purity may in some cases refer to or include low sulfur, low oxygen, low transition metals and/or low levels of other types of contamination or impurities. Carbon particles (e.g., a plurality of carbon particles, such as, for example, a plurality of carbon nanoparticles) may be used herein to refer to only the carbon particles, and/or to the carbon particles (e.g., carbon nanoparticles) along with any impurities (e.g., "carbon particles" may include any objects that are substantially non-carbon).

The carbon particles may possess very minimal large particles (e.g., grit). In some examples, the carbon particles may possess very minimal large particles (e.g., grit) greater than, for example, 20 microns in size. In some examples, substantially no (e.g., no) or minimal particles larger than 20-40 microns may be present. In some examples, substantially no (e.g., no) or minimal large particle (e.g., grit) contamination may be present (e.g., only particles less than 30 microns may be present, or minimal particles 30 microns or larger may be present). In some examples, the carbon particles may comprise, for example, less than about 5 ppm (e.g., by weight) of large particles with such sizes (e.g., less than about 5 ppm of particles 30 microns or larger, less than about 5 ppm by weight of particles larger than about 20 microns, less than about 5 ppm by weight of particles larger than about 30 microns, or less than about 5 ppm by weight of particles larger than about 40 microns). The ASTM D1514 water wash grit test (e.g., with 325 mesh grit) may be used to give indication of grit/large particle levels. The amount of grit (or any subset thereof) (e.g., 500 mesh, 400 mesh, 325 mesh and/or 120 mesh) may be, for example, less than or equal to about 5%, 2%, 1%, 0.5%, 0.2%, 0.1%, 900 parts per million (ppm), 800 ppm, 700 ppm, 600 ppm, 500 ppm, 450 ppm, 400 ppm, 350 ppm, 300 ppm, 250 ppm, 200 ppm, 150 ppm, 100 ppm, 75 ppm, 50 ppm, 25 ppm, 10 ppm, 5 ppm or 1 ppm (e.g., by weight). Alternatively, or in addition, the amount of grit (or any subset thereof) (e.g., 500 mesh, 400 mesh, 325 mesh and/or 120 mesh) may be, for example, greater than or equal to about 0 ppm, 1 ppm, 5 ppm, 10 ppm, 25 ppm, 50 ppm, 75 ppm, 100 ppm, 150 ppm, 200 ppm, 250 ppm, 300 ppm, 350 ppm, 400 ppm, 450 ppm, 500 ppm, 600 ppm, 700 ppm, 800 ppm, 900 ppm, 0.1%, 0.2%, 0.5% or 1% (e.g., by weight). Any description of the amount or level of grit (or any subset thereof) herein expressed in terms of mesh sizes (e.g., 325 mesh and/or 120 mesh) may equally apply to other mesh sizes (e.g., corresponding to smaller particle size, such as, for example, 400 and/or 500 mesh) and/or to nominal particle sizes (e.g., less than or equal to about 125 microns, 105 microns, 90 microns, 75 microns, 63 microns, 53 microns, 50 microns, 45 microns, 44 microns, 40 microns, 37 microns, 35 microns, 30 microns, 25 microns, 20 microns, 15 microns or 10 microns) at least in some configurations. The grit (or any subset thereof) may comprise substantially no (e.g., no) or minimal amount(s) of particles above (larger than) a given size or within a given size range (e.g., which may be as described elsewhere herein). The amount of grit (or any subset thereof) particles greater (larger) than or equal to about 10 microns, 15 microns, 20 microns, 25 microns, 30 microns, 35 microns, 37 microns, 40 microns, 44 microns, 45 microns, 50 microns, 53 microns, 63 microns, 75 microns, 90 microns, 105 microns or 125 microns (e.g., larger (greater) than about 20-40 microns) may be, for example, less than or equal to about 5%, 2%, 1%, 0.5%, 0.2%, 0.1%, 900 ppm, 800 ppm, 700 ppm, 600 ppm, 500 ppm, 450 ppm, 400 ppm, 350 ppm, 300 ppm, 250 ppm, 200 ppm, 150 ppm, 100 ppm, 75 ppm, 50 ppm, 25 ppm, 10 ppm, 5 ppm or 1 ppm (e.g., by weight). Alternatively, or in addition, the amount of grit (or any subset thereof) particles greater (larger) than or equal to about 10 microns, 15 microns, 20 microns, 25 microns, 30 microns, 35 microns, 37 microns, 40 microns, 44 microns, 45 microns, 50 microns, 53 microns, 63 microns, 75 microns, 90 microns, 105 microns or 125 microns (e.g., larger (greater) than about 20-40 microns) may be, for example, greater than or equal to about 0 ppm, 1 ppm, 5 ppm, 10 ppm, 25 ppm, 50 ppm, 75 ppm, 100 ppm, 150 ppm, 200 ppm, 250 ppm, 300 ppm, 350 ppm, 400 ppm, 450 ppm, 500 ppm, 600 ppm, 700 ppm, 800 ppm, 900 ppm, 0.1%, 0.2%, 0.5% or 1% (e.g., by weight). The grit (or any subset thereof) may comprise, for example, only particles less (smaller) than or equal to about 125 µm, 105 µm, 90 µm, 75 µm, 63 µm, 53 µm, 50 µm, 45 µm, 44 µm, 40 µm, 37 µm, 35 µm, 30 µm, 25 µm, 20 µm, 15 µm or 10 µm.

The carbon particles may possess low ash as measured by ASTM D1506 (e.g., ASTM D1506-99). In some examples, the amount of ash may be less than or equal to about 1% by weight. Extremely low ash carbon particles that may be referred to as ultra-pure may possess, for example, less than 0.02% ash (e.g., total ash less than 0.02%). The amount of ash may be, for example, less than or equal to about 5%, 2%, 1.5%, 1%, 0.5%, 0.2%, 0.1%, 900 ppm, 800 ppm, 700 ppm, 600 ppm, 500 ppm, 450 ppm, 400 ppm, 350 ppm, 300 ppm, 250 ppm, 200 ppm, 175 ppm, 150 ppm, 140 ppm, 130 ppm, 120 ppm, 110 ppm, 100 ppm, 90 ppm, 80 ppm, 70 ppm, 60 ppm, 50 ppm, 40 ppm, 30 ppm, 20 ppm, 10 ppm, 5 ppm or 1 ppm (e.g., by weight). Alternatively, or in addition, the amount of ash may be, for example, greater than or equal to about 0 ppm, 1 ppm, 5 ppm, 10 ppm, 20 ppm, 30 ppm, 40 ppm, 50 ppm, 60 ppm, 70 ppm, 80 ppm, 90 ppm, 100 ppm, 110 ppm, 120 ppm, 130 ppm, 140 ppm, 150 ppm, 175 ppm, 200 ppm, 250 ppm, 300 ppm, 350 ppm, 400 ppm, 450 ppm, 500 ppm, 600 ppm, 700 ppm, 800 ppm, 900 ppm, 0.1%, 0.2%, 0.5% or 1% (e.g., by weight). The ash may include metal and/or metalloid elements. In some examples, the carbon particles may have such ash contents (e.g., total ash contents) in combination with one or more levels of transition metal(s) (e.g., Fe, Cu, Zn, Cr, Ni, Co, Mo, Nb and/or V), Sn and/or other metals and/or metalloids described herein. In some examples, the carbon particles may have such ash contents and the ash may comprise a given overall level of metal and/or metalloid elements. For example, less than or equal to a given percentage of the ash (e.g., by weight) may comprise or be impurities of one or more (e.g., a subset or all) of the metals and/or metalloids described herein. The ash may comprise or be, for example, less than or equal to about 100%, 99%, 95%, 90%, 85%, 80%, 75%, 70%, 65%, 60%, 55%, 50%, 45%, 40%, 35%, 30%, 25%, 20%, 15%, 10%, 5%, 1%, 0.5%, 0.1%, 0.05%, 0.01% or 0.005% impurities (e.g., by weight) of one or more (e.g., a subset or all) of the metals and/or metalloids described here. In some examples, such metal impurities may refer to, for example, metal impurities of Fe, Ni and/or Co. In some examples, such metal impurities may refer to, for example, metal impurities of transition metal(s) (e.g., Fe, Cu, Zn, Cr, Ni, Co, Mo, Nb and/or V), Sn and/or other metals. In some examples, the carbon particles may comprise less than or equal to about 1% or 0.02% ash (e.g., by weight) with less than or equal to about 90% of the ash (e.g., by weight) comprising or being metal impurities of Fe, Ni and/or Co.

The carbon particles may have a given level or limit of metal and/or metalloid contamination. In some examples, the carbon particles of the present disclosure may have substantially no (e.g., no) metal and/or metalloid contamination (e.g., Fe, Cu, Zn, etc.). In some examples, of the impurities in the carbon particles, less than 5 ppm may be present for Fe, and less than 200 ppb may be present for each of Cr and Ni, whereas Co, Zn, and Sn may each be below 10 ppb. The amount of transition metal(s) (e.g., Fe, Cu, Zn, Cr, Ni, Co, Mo, Nb and/or V), Sn and/or other metals and/or metalloids, alone or in combination, may be, for example, less than or equal to about 100 ppm, 90 ppm, 80 ppm, 70 ppm, 60 ppm, 50 ppm, 40 ppm, 30 ppm, 20 ppm, 10 ppm, 9 ppm, 8 ppm, 7 ppm, 6 ppm, 5 ppm, 4.5 ppm, 4 ppm, 3.5 ppm, 3 ppm, 2.5 ppm, 2 ppm, 1.5 ppm, 1 ppm, 900 ppb, 800 ppb, 700 ppb, 600 ppb, 500 ppb, 450 ppb, 400 ppb, 350 ppb, 300 ppb, 290 ppb, 280 ppb, 270 ppb, 260 ppb, 250 ppb, 240 ppb, 230 ppb, 220 ppb, 210 ppb, 200 ppb, 190 ppb, 180 ppb, 170 ppb, 160 ppb, 150 ppb, 140 ppb, 130 ppb, 120 ppb, 110 ppb, 100 ppb, 90 ppb, 80 ppb, 70 ppb, 60 ppb, 50 ppb, 45 ppb, 40 ppb, 35 ppb, 30 ppb, 25 ppb, 20 ppb, 15 ppb, 10 ppb, 5 ppb, 1 ppb, 0.5 ppb or 0.1 ppb (e.g., by weight). Alternatively, or in addition, the amount of transition metal(s) (e.g., Fe, Cu, Zn, Cr, Ni, Co, Mo, Nb and/or V), Sn and/or other metals and/or metalloids, alone or in combination, may be, for example, greater than or equal to about 0 ppb, 0.1 ppb, 0.5 ppb, 1 ppb, 5 ppb, 10 ppb, 15 ppb, 20 ppb, 25 ppb, 30 ppb, 35 ppb, 40 ppb, 45 ppb, 50 ppb, 60 ppb, 70 ppb, 80 ppb, 90 ppb, 100 ppb, 110 ppb, 120 ppb, 130 ppb, 140 ppb, 150 ppb, 160 ppb, 170 ppb, 180 ppb, 190 ppb, 200 ppb, 210 ppb, 220 ppb, 230 ppb, 240 ppb, 250 ppb, 260 ppb, 270 ppb, 280 ppb, 290 ppb, 300 ppb, 350 ppb, 400 ppb, 450 ppb, 500 ppb, 600 ppb, 700 ppb, 800 ppb, 900 ppb, 1 ppm, 1.5 ppm, 2 ppm, 2.5 ppm, 3 ppm, 3.5 ppm, 4 ppm, 4.5 ppm, 5 ppm, 6 ppm, 7 ppm, 8 ppm, 9 ppm, 10 ppm, 20 ppm, 30 ppm, 40 ppm, 50 ppm, 60 ppm, 70 ppm, 80 ppm or 90 ppm. The aforementioned metal and/or metalloid elements may be present in the ash. Any description of metal impurities or levels herein may equally apply to metalloid impurities or levels at least in some configurations, and vice versa.

Polycyclic aromatic hydrocarbons (PAHs) may oxidize or otherwise react and may (e.g., also) be kept to a minimum. PAH content may in some cases be expressed in terms of transmittance of toluene extract (TOTE). Extract may be quantified, for example, using ASTM D1618 (e.g., ASTM D1618-99). PAH content may in some cases be expressed in terms total extractable polycyclic aromatic hydrocarbons as measured by the "Determination of PAH Content of Carbon Black CFR 178.3297" procedure available from the Food and Drug Administration (FDA) (also known as the "22 PAH" procedure). In some examples, the transmittance of toluene extract (TOTE) test ASTM D1618 may be greater than 99.8%. In some examples, measured through another technique, total extractable polycyclic aromatic hydrocarbons as measured by the "Determination of PAH Content of Carbon Black CFR 178.3297" procedure available from the FDA (the "22 PAH" procedure) may not exceed 1.0 ppm. In some examples, the total extractable PAHs (e.g., as measured by the "Determination of PAH Content of Carbon Black CFR 178.3297" (22 PAH) procedure) may be less than 1 ppm. The amount of PAHs (e.g., as measured by the "Determination of PAH Content of Carbon Black CFR 178.3297" (22 PAH) procedure) may be, for example, less than or equal to about 5%, 4%, 3%, 2%, 1%, 0.9%, 0.8%, 0.7%, 0.6%, 0.5%, 0.4%, 0.3%, 0.2%, 0.1%, 900 ppm, 800 ppm, 700 ppm, 600 ppm, 500 ppm, 400 ppm, 300 ppm, 200 ppm, 100 ppm, 75 ppm, 50 ppm, 25 ppm, 10 ppm, 5 ppm, 1 ppm, 0.5 ppm, 0.25 ppm, 0.1 ppm, 0.05 ppm, 0.01 ppm, 5 parts per billion (ppb) or 1 ppb (e.g., by mass). Alternatively, or in addition, the amount of PAHs (e.g., as measured by the "Determination of PAH Content of Carbon Black CFR 178.3297" (22 PAH) procedure) may be, for example, greater than or equal to about 0 ppm, 1 ppb, 5 ppb, 0.01 ppm, 0.05 ppm 0.1 ppm, 0.25 ppm, 0.5 ppm, 1 ppm, 5 ppm, 10 ppm, 25 ppm, 50 ppm, 75 ppm, 100 ppm, 200 ppm, 300 ppm, 400 ppm, 500 ppm, 600 ppm, 700 ppm, 800 ppm, 900 ppm, 0.1%, 0.2%, 0.3%, 0.4%, 0.5%, 0.6%, 0.7%, 0.8%, 0.9%, 1%, 2%, 3% or 4% (e.g., by mass). The tote (also "TOTE" herein) may be, for example, greater than or equal to about 50%, 75%, 80%, 85%, 86%, 87%, 88%, 89%, 90%, 91%, 91.5%, 92%, 92.5%, 93%, 93.5%, 94%, 94.5%, 95%, 95.5%, 96%, 96.5%, 97%, 97.5%, 98%, 98.5%, 99%, 99.1%, 99.2%, 99.3%, 99.4%, 99.5%, 99.5%, 99.7%, 99.8%, 99.9% or 100%. Alternatively, or in addition, the tote may be, for example, less than or equal to about 100%, 99.9%, 99.8%, 99.7%, 99.5%, 99.5%, 99.4%, 99.3%, 99.2%, 99.1%, 99%, 98.5%, 98%, 97.5%, 97%, 96.5%, 96%, 95.5%, 95%, 94.5%, 94%, 93.5%, 93%, 92.5%, 92%, 91.5%, 91%, 90%, 89%, 88%, 87%, 86%, 85%, 80% or 75%.

The carbon particle(s) may have given surface functionality. For example, the carbon particle(s) may have a given (surface) hydrophilic content, a given hydrogen content, and/or other surface characteristics.

The carbon particle(s) may have a given (surface) hydrophilic content. Hydrophilic character may be derived, for example, from gas adsorption analysis (e.g., gas adsorption followed by data integration to determine water spreading pressure). The surface (e.g., hydrophilic) content may be expressed, for example, in terms of affinity to adsorb water, in terms of water spreading pressure (WSP) and/or through other metrics (e.g., Boehm titration). WSP may be determined by measuring the mass increase in a controlled atmosphere where the relative humidity (RH) is increased slowly over time from 0 to 80% relative humidity and WSP ($\pi^e$) is determined in accordance with the equation $\pi^e = RT/A \int_0^{P_0} H_2O$ (moles/g) d ln P, where R is the gas constant, T is the temperature, A is the $N_2$ surface area (SA) (ASTM D6556) of the sample, $H_2O$ is the amount of water adsorbed to the carbon surface at the various RHs, P is the partial pressure of water in the atmosphere and $P_0$ is the saturation pressure. The equilibrium adsorption may be measured at various discrete RHs and then the area under the curve may be measured to yield the WSP value. Samples may be measured at 25° C. using a 3Flex system from Micromeritics. The region being integrated may be from 0 to saturation pressure. The d may have its normal indication of integrating at whatever incremental unit is after the d, i.e., integrating at changing natural log of pressure. See, for example, U.S. Pat. No. 8,501,148 ("COATING COMPOSITION INCORPORATING A LOW STRUCTURE CARBON BLACK AND DEVICES FORMED THEREWITH"), which is entirely incorporated herein by reference. In some examples, the hydrophilic content of the surface of the carbon particle, for example, as described by affinity to adsorb water from an 80% relative humidity atmosphere, may be less than 0.05 to 0.5 ml (milliliter) of water for every $m^2$ (square meter) of surface area. In some examples, the WSP of the carbon particles made in the processes described herein may be between about 0 and about 8 $mJ/m^2$. This is lower than the typical range of furnace made carbon black of about 5 to about 20 $mJ/m^2$. In some examples, the WSP of the carbon particles made in the processes described herein may be less than about 5 $mJ/m^2$. The affinity to adsorb water from an 80% relative humidity atmosphere may be, for example, less than or equal to about 1 $ml/m^2$, 0.9 $ml/m^2$, 0.8 $ml/m^2$, 0.7 $ml/m^2$, 0.6 $ml/m^2$, 0.5 $ml/m^2$, 0.45 $ml/m^2$, 0.4 $ml/m^2$, 0.35 $ml/m^2$, 0.3 $ml/m^2$, 0.25 $ml/m^2$, 0.2 $ml/m^2$, 0.15 $ml/m^2$, 0.1 $ml/m^2$, 0.05 $ml/m^2$, 0.01 $ml/m^2$ or 0.005 $ml/m^2$. Alternatively, or in addition, the affinity to adsorb water from an 80% relative humidity atmosphere may be, for example, greater than or equal to about 0.005 $ml/m^2$, 0.01 $ml/m^2$, 0.05 $ml/m^2$, 0.1 $ml/m^2$, 0.15 $ml/m^2$, 0.2 $ml/m^2$, 0.25 $ml/m^2$, 0.3 $ml/m^2$, 0.35 $ml/m^2$, 0.4 $ml/m^2$, 0.45 $ml/m^2$, 0.5 $ml/m^2$, 0.6 $ml/m^2$, 0.7 $ml/m^2$, 0.8 $ml/m^2$, 0.9 $ml/m^2$ or 1 $ml/m^2$. The WSP may be, for example, less than or equal to about 40 $mJ/m^2$, 35 $mJ/m^2$, 30 $mJ/m^2$, 29 $mJ/m^2$, 28 $mJ/m^2$, 27 $mJ/m^2$, 26 $mJ/m^2$, 25 $mJ/m^2$, 24 $mJ/m^2$, 23 $mJ/m^2$, 22 $mJ/m^2$, 21 $mJ/m^2$, 20 $mJ/m^2$, 19 $mJ/m^2$, 18 $mJ/m^2$, 17 $mJ/m^2$, 16 $mJ/m^2$, 15 $mJ/m^2$, 14 $mJ/m^2$, 13 $mJ/m^2$, 12 $mJ/m^2$, 11 $mJ/m^2$, 10 $mJ/m^2$, 9 $mJ/m^2$, 8 $mJ/m^2$, 7 $mJ/m^2$, 6 $mJ/m^2$, 5 $mJ/m^2$, 4.5 $mJ/m^2$, 4 $mJ/m^2$, 3.5 $mJ/m^2$, 3 $mJ/m^2$, 2.5 $mJ/m^2$, 2 $mJ/m^2$, 1.5 $mJ/m^2$, 1 $mJ/m^2$, 0.5 $mJ/m^2$ or 0.25 $mJ/m^2$. Alternatively, or in addition, the WSP may be, for example, greater than or equal to about 0 $mJ/m^2$, 0.25 $mJ/m^2$, 0.5 $mJ/m^2$, 1 $mJ/m^2$, 1.5 $mJ/m^2$, 2 $mJ/m^2$, 2.5 $mJ/m^2$, 3 $mJ/m^2$, 3.5 $mJ/m^2$, 4 $mJ/m^2$, 4.5 $mJ/m^2$, 5 $mJ/m^2$, 6 $mJ/m^2$, 7 $mJ/m^2$, 8 $mJ/m^2$, 9 $mJ/m^2$, 10 $mJ/m^2$, 11 $mJ/m^2$, 12 $mJ/m^2$, 13 $mJ/m^2$, 14 $mJ/m^2$, 15 $mJ/m^2$, 16 $mJ/m^2$, 17 $mJ/m^2$, 18 $mJ/m^2$, 19 $mJ/m^2$, 20 $mJ/m^2$, 21 $mJ/m^2$, 22 $mJ/m^2$, 23 $mJ/m^2$, 24 $mJ/m^2$, 25 $mJ/m^2$, 26 $mJ/m^2$, 27 $mJ/m^2$, 28 $mJ/m^2$, 29 $mJ/m^2$, 30 $mJ/m^2$, 35 $mJ/m^2$ or 40 $mJ/m^2$.

Another method to obtain information as to the functionality at the surface may be to perform titrations as documented by Boehm. See, for example, Boehm, H P "Some Aspects of Surface Chemistry of Carbon Blacks and Other Carbons," Carbon, 1994, page 759, which is entirely incorporated herein by reference. WSP may be a good parameter to measure general hydrophilicity of carbon particles; however WSP may not provide the ratio of functional groups at the surface as can in some cases be measured through thermal phase desorption (TPD), through X-ray photoelectron spectroscopy (XPS), or via titration methods (e.g., Boehm titration).

The carbon particle(s) may have a given surface acid group content. The content of acidic groups may be determined using, for example, Boehm titration for functional groups. The Boehm titration may be accomplished through exposure of the surface of the carbon particles to basic solution. The basic solution may then be acidified and back titrated with strongly basic solution. In some examples, total surface acid group content may be less than or equal to about 0.5 $\mu mol/m^2$. Surface acid group content (e.g., total, strong acid and/or weak acid content) may be, for example, less than or equal to about 5 $\mu mol/m^2$, 4 $\mu mol/m^2$, 3 $\mu mol/m^2$, 2 $\mu mol/m^2$, 1.5 $\mu mol/m^2$, 1.4 $\mu mol/m^2$, 1.3 $\mu mol/m^2$, 1.2 $\mu mol/m^2$, 1.189 $\mu mol/m^2$, 1.1 $\mu mol/m^2$, 1 $\mu mol/m^2$, 0.095 $\mu mol/m^2$, 0.9 $\mu mol/m^2$, 0.863 $\mu mol/m^2$, 0.8 $\mu mol/m^2$, 0.767 $\mu mol/m^2$, 0.7 $\mu mol/m^2$, 0.6 $\mu mol/m^2$, 0.5 $\mu mol/m^2$, 0.424 $\mu mol/m^2$, 0.4 $\mu mol/m^2$, 0.375 $\mu mol/m^2$, 0.3 $\mu mol/m^2$, 0.2 $\mu mol/m^2$, 0.1 $\mu mol/m^2$, 0.05 $\mu mol/m^2$ or 0.01 $\mu mol/m^2$. Alternatively, or in addition, the surface acid group content (e.g., total, strong acid and/or weak acid content) may be, for example, greater than or equal to about 0 $\mu mol/m^2$, 0.01 $\mu mol/m^2$, 0.05 $\mu mol/m^2$, 0.1 $\mu mol/m^2$, 0.2 $\mu mol/m^2$, 0.3 $\mu mol/m^2$, 0.375 $\mu mol/m^2$, 0.4 $\mu mol/m^2$, 0.424 $\mu mol/m^2$, 0.5 $\mu mol/m^2$, 0.6 $\mu mol/m^2$, 0.7 $\mu mol/m^2$, 0.767 $\mu mol/m^2$, 0.8 $\mu mol/m^2$, 0.863 $\mu mol/m^2$, 0.9 $\mu mol/m^2$, 0.095 $\mu mol/m^2$, 1 $\mu mol/m^2$, 1.1 $\mu mol/m^2$, 1.189 $\mu mol/m^2$, 1.2 $\mu mol/m^2$, 1.3 $\mu mol/m^2$, 1.4 $\mu mol/m^2$, 1.5 $\mu mol/m^2$, 2 $\mu mol/m^2$, 3 $\mu mol/m^2$ or 4 $\mu mol/m^2$. The acidic groups may be weak acidic groups (e.g., phenol, quinone, etc.). Strong acidic groups may or may not be present (e.g., substantially no strong acidic groups may be present).

The moisture content may be measured, for example, in accordance with ASTM D1509. In some examples, moisture content as measured by ASTM D1509 may not exceed 0.3% (e.g., for a candidate CA for Li-ion batteries). In some examples, the moisture content may be less than or equal to about 0.3% by weight, or less than about 0.2% by weight. The moisture content (e.g., by weight) may be, for example, less than or equal to about 5%, 4.5%, 4%, 3.5%, 3%, 2.8%, 2.6%, 2.4%, 2.2%, 2%, 1.95%, 1.9%, 1.85%, 1.8%, 1.75%, 1.7%, 1.65%, 1.6%, 1.55%, 1.5%, 1.45%, 1.4%, 1.35%, 1.3%, 1.25%, 1.2%, 1.15%, 1.1%, 1%, 0.95%, 0.9%, 0.87%, 0.85%, 0.8%, 0.75%, 0.7%, 0.68%, 0.65%, 0.6%, 0.58%, 0.56%, 0.54%, 0.52%, 0.5%, 0.48%, 0.46%, 0.44%, 0.42%, 0.4%, 0.38%, 0.36%, 0.34%, 0.32%, 0.3%, 0.29%, 0.28%, 0.26%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.05%, 0.01% or 0.005%. Alternatively, or in addition, the moisture content (e.g., by weight) may be, for example, greater than or equal to about 0%, 0.005%, 0.01%, 0.05%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.26%, 0.28%, 0.29%, 0.3%, 0.32%, 0.34%, 0.36%, 0.38%, 0.4%, 0.42%, 0.44%, 0.46%, 0.48%, 0.5%, 0.52%, 0.54%, 0.56%, 0.58%, 0.6%, 0.65%, 0.68%, 0.7%, 0.75%, 0.8%, 0.85%, 0.87%, 0.9%, 0.95%, 1%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.2%, 2.4%, 2.6%, 2.8%, 3%, 3.5%, 4% or 4.5%.

Elemental analysis may be measured, for example, via devices manufactured by Leco (e.g., the 744 and 844 series products), and results may be given as percentage of the total sample (e.g., mass percent). For example, sulfur may be measured through the utilization of process technique made available by Leco.

The carbon particles may have a given sulfur content. In some examples, the sulfur amount may not exceed 50 ppm (e.g., the total sulfur content may be less than 50 ppm). The sulfur content (e.g., by weight) may be, for example, less than or equal to about 5%, 4%, 3.5%, 3%, 2.9%, 2.8%, 2.7%, 2.6%, 2.5%, 2.4%, 2.3%, 2.2%, 2.1%, 2%, 1.95%, 1.9%, 1.85%, 1.8%, 1.75%, 1.7%, 1.65%, 1.6%, 1.57%, 1.55%, 1.5%, 1.45%, 1.4%, 1.35%, 1.3%, 1.25%, 1.2%, 1.15%, 1.1%, 1.05%, 1%, 0.95%, 0.9%, 0.85%, 0.8%, 0.75%, 0.7%, 0.65%, 0.6%, 0.55%, 0.5%, 0.45%, 0.4%, 0.39%, 0.38%, 0.37%, 0.36%, 0.35%, 0.34%, 0.33%, 0.32%, 0.31%, 0.3%, 0.29%, 0.28%, 0.27%, 0.26%, 0.25%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.09%, 0.08%, 0.07%, 0.06%, 0.05%, 0.04%, 0.03%, 0.02%, 0.01%, 50 ppm, 45 ppm, 40 ppm, 35 ppm, 30 ppm, 25 ppm, 20 ppm, 15 ppm, 10 ppm, 5 ppm, 1 ppm, 0.5 ppm or 0.1 ppm. Alternatively, or in addition, the sulfur content (e.g., by weight) may be, for example, greater than or equal to about 0 ppm, 0.1 ppm, 0.5 ppm, 1 ppm, 5 ppm, 10 ppm, 15 ppm, 20 ppm, 25 ppm, 30 ppm, 35 ppm, 40 ppm, 45 ppm, 50 ppm, 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.57%, 1.6%, 1.65%, 1.7%, 1.75%, 1.8%, 1.85%, 1.9%, 1.95%, 2%, 2.1%, 2.2%, 2.3%, 2.4%, 2.5%, 2.6%, 2.7%, 2.8%, 2.9%, 3%, 3.5% or 4%.

The carbon particles may have a given oxygen content. In some examples, the oxygen content may be less than about 0.2% by weight oxygen, or about 0.4% oxygen or less by weight. The oxygen content (e.g., by weight) may be, for example, less than or equal to about 25%, 20%, 15%, 10%, 8%, 6%, 5%, 4.5%, 4%, 3.5%, 3%, 2.8%, 2.6%, 2.4%, 2.2%, 2%, 1.95%, 1.9%, 1.85%, 1.8%, 1.75%, 1.7%, 1.65%, 1.6%, 1.55%, 1.5%, 1.45%, 1.4%, 1.35%, 1.3%, 1.25%, 1.2%, 1.15%, 1.1%, 1%, 0.95%, 0.9%, 0.87%, 0.85%, 0.8%, 0.75%, 0.7%, 0.68%, 0.65%, 0.6%, 0.58%, 0.56%, 0.54%, 0.52%, 0.5%, 0.48%, 0.46%, 0.44%, 0.42%, 0.4%, 0.38%, 0.36%, 0.34%, 0.32%, 0.3%, 0.29%, 0.28%, 0.26%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.05%, 0.01% or 0.005%. Alternatively, or in addition, the oxygen content (e.g., by weight) may be, for example, greater than or equal to about 0%, 0.005%, 0.01%, 0.05%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.26%, 0.28%, 0.29%, 0.3%, 0.32%, 0.34%, 0.36%, 0.38%, 0.4%, 0.42%, 0.44%, 0.46%, 0.48%, 0.5%, 0.52%, 0.54%, 0.56%, 0.58%, 0.6%, 0.65%, 0.68%, 0.7%, 0.75%, 0.8%, 0.85%, 0.87%, 0.9%, 0.95%, 1%, 1.1%, 1.15%, 1.2%, 1.25%, 1.3%, 1.35%, 1.4%, 1.45%, 1.5%, 1.55%, 1.6%, 1.65%, 1.7%, 1.75%, 1.8%, 1.85%, 1.9%, 1.95%, 2%, 2.2%, 2.4%, 2.6%, 2.8%, 3%, 3.5%, 4%, 4.5%, 5%, 6%, 8%, 10%, 15% or 20%.

The carbon particle(s) may have a given nitrogen content. The nitrogen content (e.g., by weight) may be, for example, less than or equal to about 5%, 4%, 3.5%, 3%, 2.9%, 2.8%, 2.7%, 2.6%, 2.5%, 2.4%, 2.3%, 2.2%, 2.1%, 2%, 1.95%, 1.9%, 1.85%, 1.8%, 1.75%, 1.7%, 1.65%, 1.6%, 1.57%, 1.55%, 1.5%, 1.45%, 1.4%, 1.35%, 1.3%, 1.25%, 1.2%, 1.15%, 1.1%, 1.05%, 1%, 0.95%, 0.9%, 0.85%, 0.8%, 0.75%, 0.7%, 0.65%, 0.6%, 0.55%, 0.5%, 0.45%, 0.4%, 0.39%, 0.38%, 0.37%, 0.36%, 0.35%, 0.34%, 0.33%, 0.32%, 0.31%, 0.3%, 0.29%, 0.28%, 0.27%, 0.26%, 0.25%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.09%, 0.08%, 0.07%, 0.06%, 0.05%, 0.04%, 0.03%, 0.02%, 0.01%, 0.005% or 0.001%. Alternatively, or in addition, the nitrogen content (e.g., by weight) may be, for example, greater than or equal to about 0%, 0.001%, 0.005%, 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, 0.4%, 0.45%, 0.5%, 0.55%, 0.6%, 0.65%, 0.7%, 0.75%, 0.8%, 0.85%, 0.9%, 0.95%, 1%, 1.05%, 1.1%, 1.15%, 1.2%, 1.25%, 1.3%, 1.35%, 1.4%, 1.45%, 1.5%, 1.55%, 1.57%, 1.6%, 1.65%, 1.7%, 1.75%, 1.8%, 1.85%, 1.9%, 1.95%, 2%, 2.1%, 2.2%, 2.3%, 2.4%, 2.5%, 2.6%, 2.7%, 2.8%, 2.9%, 3%, 3.5%, 4% or 5%.

The carbon particle(s) may have a given carbon content. In some examples, the carbon content may be greater than or equal to about 99% carbon by weight. The carbon content (e.g., by weight) may be, for example, greater than or equal to about 50%, 75%, 90%, 91%, 92%, 93%, 94%, 95%, 95.1%, 95.2%, 95.3%, 95.4%, 95.5%, 95.6%, 95.7%, 95.8%, 95.9%, 96%, 96.1%, 96.2%, 96.3%, 96.4%, 96.5%, 96.6%, 96.7%, 96.8%, 96.9%, 97%, 97.1%, 97.2%, 97.3%, 97.4%, 97.5%, 97.6%, 97.7%, 97.8%, 97.9%, 98%, 98.1%, 98.2%, 98.3%, 98.4%, 98.5%, 98.6%, 98.7%, 98.9%, 99%, 99.1%, 99.2%, 99.3%, 99.4%, 99.5%, 99.6%, 99.7%, 99.8%, 99.9%, 99.99% or 99.999%. Alternatively, or in addition, the carbon content (e.g., by weight) may be, for example, less than or equal to about 100%, 99.999%, 99.99%, 99.9%, 99.8%, 99.7%, 99.6%, 99.5%, 99.4%, 99.3%, 99.2%, 99.1%, 99%, 98.9%, 98.8%, 98.7%, 98.6%, 98.5%, 98.4%, 98.3%, 98.2%, 98.1%, 98%, 97.9%, 97.8%, 97.7%, 97.6%, 97.5%, 97.4%, 97.3%, 97.2%, 97.1%, 97%, 96.9%, 96.8%, 96.7%, 96.6%, 96.5%, 96.4%, 96.3%, 96.2%, 96.1%, 96%, 95.9%, 95.8%, 95.7%, 95.6%, 95.5%, 95.4%, 95.3%, 95.2%, 95.1%, 95%, 94%, 93%, 92%, 91% or 90%.

The carbon particle(s) may have a given hydrogen content. The hydrogen content may be, for example, less than about 0.4%, or about 0.2% hydrogen or less by weight. The hydrogen content (e.g., by weight) may be, for example, less than or equal to about 5%, 4%, 3%, 2%, 1%, 0.95%, 0.9%, 0.85%, 0.8%, 0.75%, 0.7%, 0.65%, 0.6%, 0.55%, 0.5%, 0.45%, 0.4%, 0.39%, 0.38%, 0.37%, 0.36%, 0.35%, 0.34%, 0.33%, 0.32%, 0.31%, 0.3%, 0.29%, 0.28%, 0.27%, 0.26%, 0.25%, 0.24%, 0.23%, 0.22%, 0.21%, 0.2%, 0.19%, 0.18%, 0.17%, 0.16%, 0.15%, 0.14%, 0.13%, 0.12%, 0.11%, 0.1%, 0.09%, 0.08%, 0.07%, 0.06%, 0.05%, 0.04%, 0.03%, 0.02%, 0.01%, 0.005% or 0.001%. Alternatively, or in addition, the hydrogen content (e.g., by weight) may be, for example, greater than or equal to about 0%, 0.001%, 0.005%, 0.01%, 0.02%, 0.03%, 0.04%, 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, 0.2%, 0.21%, 0.22%, 0.23%, 0.24%, 0.25%, 0.26%, 0.27%, 0.28%, 0.29%, 0.3%, 0.31%, 0.32%, 0.33%, 0.34%, 0.35%, 0.36%, 0.37%, 0.38%, 0.39%, 0.4%, 0.45%, 0.5%, 0.55%, 0.6%, 0.65%, 0.7%, 0.75%, 0.8%, 0.85%, 0.9%, 0.95%, 1%, 2%, 3%, 4% or 5%.

The carbon particles may possess high conductivity (e.g., if high performance in batteries is desired). A high conductivity may correspond to a low resistivity (e.g., volume resistivity. Volume resistivity of the carbon particles may be measured by filling fine or "fluffy" powder into a cylinder-shaped reservoir made from a non-electrically conducting resin. The cylinder may be penetrated with 4 holes. Through these equally spaced holes, conductive copper bolts may be inserted. The powder may be compressed from the top of the device with a piston made from non-electrically conducting resin to pressures ranging from 2 MPa to 40 MPa. A constant current of 0.1 Amps may be applied to the outer bolts and the voltage drop across the sample between the inner bolts may be measured. From this voltage measurement, the volume resistivity may be calculated in ohm-centimeter (ohm-cm). The volume resistivity of the carbon particles may be, for example, less than or equal to about 5 ohm-cm, 4 ohm-cm, 3 ohm-cm, 2 ohm-cm, 1 ohm-cm, 0.5 ohm-cm, 0.4 ohm-cm, 0.3 ohm-cm, 0.25 ohm-cm, 0.24 ohm-cm, 0.23 ohm-cm, 0.22 ohm-cm, 0.21 ohm-cm, 0.20 ohm-cm, 0.19 ohm-cm, 0.18 ohm-cm, 0.17 ohm-cm, 0.16 ohm-cm, 0.15 ohm-cm, 0.14 ohm-cm, 0.13 ohm-cm, 0.12 ohm-cm, 0.11 ohm-cm, 0.10 ohm-cm, 0.09 ohm-cm, 0.08 ohm-cm, 0.07 ohm-cm, 0.06 ohm-cm, 0.05 ohm-cm, 0.01 ohm-cm or 0.005 ohm-cm. Alternatively, or in addition, the volume resistivity of the carbon particles may be, for example, greater than or equal to about 0.001 ohm-cm, 0.005 ohm-cm, 0.01 ohm-cm, 0.05 ohm-cm, 0.06 ohm-cm, 0.07 ohm-cm, 0.08 ohm-cm, 0.09 ohm-cm, 0.10 ohm-cm, 0.11 ohm-cm, 0.12 ohm-cm, 0.13 ohm-cm, 0.14 ohm-cm, 0.15 ohm-cm, 0.16 ohm-cm, 0.17 ohm-cm, 0.18 ohm-cm, 0.19 ohm-cm, 0.20 ohm-cm, 0.21 ohm-cm, 0.22 ohm-cm, 0.23 ohm-cm, 0.24 ohm-cm, 0.25 ohm-cm, 0.3 ohm-cm, 0.4 ohm-cm, 0.5 ohm-cm, 1 ohm-cm, 2 ohm-cm, 3 ohm-cm or 4 ohm-cm. The carbon particles may have such volume resistivities at, for example, about 2 megapascals (MPa), 5 MPa, 10 MPa, 15 MPa, 20 MPa, 25 MPa, 30 MPa, 35 MPa or 40 MPa (e.g., at 2 MPa). In some examples, the volume resistivity may be less than 0.3 ohm-cm at 2 MPa.

In some implementations, enhanced conductivity may be obtained through the use of doping with boron. Boron doping of the particles may implemented, for example, with boron precursor boric acid and/or diborane gas, as described in greater detail elsewhere herein. The boron concentration of the carbon particles described herein may be, for example, greater than or equal to about 0%, 0.001%, 0.005%, 0.01%, 0.05%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% or 10% (e.g., on a solids weight basis). Alternatively, or in addition, the boron concentration of the carbon particles described herein may be, for example, less than or equal to about 10%, 9.5%, 9%, 8.5%, 8%, 7.5%, 7%, 6.5%, 6%, 5.5%, 5%, 4.5%, 4%, 3.5%, 3%, 2.5%, 2%, 1.5%, 1%, 0.05%, 0.01% or 0.005% (e.g., on a solids weight basis). In some examples, the boron concentration may be between 0.05 and 7% on a solids weight basis.

Crystallinity of the carbon particle may be measured, for example, via X-ray crystal diffractometry (XRD). For example, Cu K alpha radiation may be used at a voltage of 40 kV (kilovolts) and a current of 44 mA (milliamps). The scan rate may be 1.3 degrees/minute from 2 theta equal 12 to 90 degrees. The 002 peak of graphite may be analyzed using the Scherrer equation to obtain $L_c$ (lattice constant (also "crystallinity" herein)) and d002 (the lattice spacing of the 002 peak of graphite) values. The average size of the graphite along the c-axis (the thickness of graphene sheets or the length of the c axis of the graphite domains within the carbon primary particle), $L_c$, may be calculated using the Scherrer equation, $$L_c = \frac{1.84 \lambda}{\beta_{002} \cos\theta_{002}},$$

where $\lambda$=0.154 nm, $\beta_{002}$ is the full width at half maximum (FWHM) of the (002) diffraction peak and $\theta_{002}$ is the Bragg angle of the (002) diffraction peak. The lattice spacing of the (002) plane, $d_{002}$ is calculated using the Bragg equation, $$d_{002} = \frac{\lambda}{2\sin\theta_{002}}.$$

Larger $L_c$ values may correspond to greater degree of crystallinity. Smaller lattice spacing (d002) values may correspond to higher crystallinity or a more graphite-like lattice structure. Larger lattice spacing (d002) of, for example, 0.36 nm or larger may be indicative of turbostratic carbon (e.g., which is common for carbon black samples produced via the furnace process). In some examples, the carbon particles (e.g., used as the CA) may possess crystallinity ($L_c$) as measured by XRD greater than 4 nm (e.g., as greater crystallinity may aid in high cycle rate charge/discharge). The $L_c$ may be, for example, greater than or equal to about 0.1 nm, 0.5 nm, 1 nm, 1.1 nm, 1.2 nm, 1.3 nm, 1.4 nm, 1.5 nm, 1.6 nm, 1.7 nm, 1.8 nm, 1.9 nm, 2 nm, 2.1 nm, 2.2 nm, 2.3 nm, 2.4 nm, 2.5 nm, 2.6 nm, 2.7 nm, 2.8 nm, 2.9 nm, 3 nm, 3.1 nm, 3.2 nm, 3.3 nm, 3.4 nm, 3.5 nm, 4 nm, 4.5 nm, 5 nm, 5.5 nm, 6 nm, 6.1 nm, 6.2 nm, 6.3 nm, 6.4 nm, 6.5 nm, 6.6 nm, 6.7 nm, 6.8 nm, 6.9 nm, 7 nm, 7.1 nm, 7.2 nm, 7.3 nm, 7.4 nm, 7.5 nm, 7.6 nm, 7.7 nm, 7.8 nm, 7.9 nm, 8 nm, 8.1 nm, 8.2 nm, 8.3 nm, 8.4 nm, 8.5 nm, 8.6 nm, 8.7 nm, 8.8 nm, 8.9 nm, 9 nm, 9.1 nm, 9.2 nm, 9.3 nm, 9.4 nm, 9.5 nm, 9.6 nm, 9.7 nm, 9.8 nm, 9.9 nm, 10 nm, 10.1 nm, 10.2 nm, 10.3 nm, 10.4 nm, 10.5 nm, 10.6 nm, 10.7 nm, 10.8 nm, 10.9 nm, 11 nm, 11.1 nm, 11.2 nm, 11.3 nm, 11.4 nm, 11.5 nm, 11.6 nm, 11.7 nm, 11.8 nm, 11.9 nm, 12 nm, 12.1 nm, 12.2 nm, 12.3 nm, 12.4 nm, 12.5 nm, 12.6 nm, 12.7 nm, 12.8 nm, 12.9 nm, 13 nm, 13.1 nm, 13.2 nm, 13.3 nm, 13.4 nm, 13.5 nm, 13.6 nm, 13.7 nm, 13.8 nm, 13.9 nm, 14 nm, 14.5 nm, 15 nm, 15.5 nm, 16 nm, 16.5 nm, 17 nm, 17.5 nm, 18 nm, 18.5 nm, 19 nm, 19.5 nm or 20 nm. Alternatively, or in addition, the $L_c$ may be, for example, less than or equal to about 20 nm, 19.5 nm, 19 nm, 18.5 nm, 18 nm, 17.5 nm, 17 nm, 16.5 nm, 16 nm, 15.5 nm, 15 nm, 14.5 nm, 14 nm, 13.9 nm, 13.8 nm, 13.7 nm, 13.6 nm, 13.5 nm, 13.4 nm, 13.3 nm, 13.2 nm, 13.1 nm, 13 nm, 12.9 nm, 12.8 nm, 12.7 nm, 12.6 nm, 12.5 nm, 12.4 nm, 12.3 nm, 12.2 nm, 12.1 nm, 12 nm, 11.9 nm, 11.8 nm, 11.7 nm, 11.6 nm, 11.5 nm, 11.4 nm, 11.3 nm, 11.2 nm, 11.1 nm, 11 nm, 10.9 nm, 10.8 nm, 10.7 nm, 10.6 nm, 10.5 nm, 10.4 nm, 10.3 nm, 10.2 nm, 10.1 nm, 10 nm, 9.9 nm, 9.8 nm, 9.7 nm, 9.6 nm, 9.5 nm, 9.4 nm, 9.3 nm, 9.2 nm, 9.1 nm, 9 nm, 8.9 nm, 8.8 nm, 8.7 nm, 8.6 nm, 8.5 nm, 8.4 nm, 8.3 nm, 8.2 nm, 8.1 nm, 8 nm, 7.9 nm, 7.8 nm, 7.7 nm, 7.6 nm, 7.5 nm, 7.4 nm, 7.3 nm, 7.2 nm, 7.1 nm, 7 nm, 6.9 nm, 6.8 nm, 6.7 nm, 6.6 nm, 6.5 nm, 6.4 nm, 6.3 nm, 6.2 nm, 6.1 nm, 6 nm, 5.5 nm, 5 nm, 4.5 nm, 4 nm, 3.5 nm, 3.4 n2.7 nm, m, 3.3 nm, 3.2 nm, 3.1 nm, 3 nm, 2.9 nm, 2.8 nm, 2.6 nm, 2.5 nm, 2.4 nm, 2.3 nm, 2.2 nm, 2.1 nm, 2 nm, 1.9 nm, 1.8 nm, 1.7 nm, 1.6 nm or 1.5 nm. The d002 may be, for example, less than or equal to about 0.5 nm, 0.49 nm, 0.48 nm, 0.47 nm, 0.46 nm, 0.45 nm, 0.44 nm, 0.43 nm, 0.42 nm, 0.41 nm, 0.4 nm, 0.395 nm, 0.39 nm, 0.385 nm, 0.38 nm, 0.375 nm, 0.37 nm, 0.369 nm, 0.368 nm, 0.367 nm, 0.366 nm, 0.365 nm, 0.364 nm, 0.363 nm, 0.362 nm, 0.361 nm, 0.360 nm, 0.359 nm, 0.358 nm, 0.357 nm, 0.356 nm, 0.355 nm, 0.354 nm, 0.353 nm, 0.352 nm, 0.351 nm, 0.350 nm, 0.349 nm, 0.348 nm, 0.347 nm, 0.346 nm, 0.345 nm, 0.344 nm, 0.343 nm, 0.342 nm, 0.341 nm, 0.340 nm, 0.339 nm, 0.338 nm, 0.337 nm, 0.336 nm, 0.335 nm, 0.334 nm, 0.333 nm or 0.332 nm. Alternatively, or in addition, the d002 may be, for example, greater than or equal to about 0.332 nm, 0.333 nm, 0.334 nm, 0.335 nm, 0.336 nm, 0.337 nm, 0.338 nm, 0.339 nm, 0.340 nm, 0.341 nm, 0.342 nm, 0.343 nm, 0.344 nm, 0.345 nm, 0.346 nm, 0.347 nm, 0.348 nm, 0.349 nm, 0.350 nm, 0.351 nm, 0.352 nm, 0.353 nm, 0.354 nm, 0.355 nm, 0.356 nm, 0.357 nm, 0.358 nm, 0.359 nm, 0.360 nm, 0.361 nm, 0.362 nm, 0.363 nm, 0.364 nm, 0.365 nm, 0.366 nm, 0.367 nm, 0.368 nm, 0.369 nm, 0.37 nm, 0.375 nm, 0.38 nm, 0.385 nm, 0.39 nm, 0.395 nm, 0.4 nm, 0.41 nm, 0.42 nm, 0.43 nm, 0.44 nm, 0.45 nm, 0.46 nm, 0.47 nm, 0.48 nm or 0.49 nm.

A carbon particle may have a given shape. The particle may have a given ellipsoid factor (also "ellipsoidal factor" herein). The ellipsoidal factor may be the length of the longest dimension of the ellipse divided by the width of the ellipse as defined by a line drawn at a 90 degree angle to the length. The ellipsoid factor for furnace black primary particles is typically between 1.0 and 1.3. In some examples, the particles described herein may have a more ellipsoidal shape, such that the ellipsoid factor is greater than 1.3. The ellipsoid factor may be, for example, greater than or equal to about 1, 1.05, 1.1, 1.15, 1.2, 1.25, 1.3, 1.35, 1.4, 1.45, 1.5, 1.55, 1.6, 1.65, 1.7, 1.75, 1.8, 1.85, 1.9, 1.95, 2, 2.1, 2.2, 2.3, 2.4, 2.5, 2.6, 2.7, 2.8, 2.9 or 3. Alternatively, or in addition, the ellipsoid factor may be, for example, less than or equal to about 3, 2.9, 2.8, 2.7, 2.6, 2.5, 2.4, 2.3, 2.2, 2.1, 2, 1.95, 1.9, 1.85, 1.8, 1.75, 1.7, 1.65, 1.6, 1.55, 1.5, 1.45, 1.4, 1.35, 1.3, 1.25, 1.2, 1.15, 1.1, 1.05 or 1. The particle may have a given anisotropy in 1-dimension (e.g., needle-like) and/or 2-dimensions (e.g., plate- or graphene-like). In some examples, the particle may be anisotropic in both 1-dimension (e.g., needle-like) and 2-dimensions (e.g., plate- or graphene-like).

The carbon particle(s) may have given size(s) or a given size distribution. The volume equivalent sphere diameter (e.g., obtained by determining volume of particle(s)/aggregate from TEM histograms) may be, for example, less than or equal to about 5 microns (μm), 4.5 μm, 4 μm, 3.5 μm, 3 μm, 2.5 μm, 2.4 μm, 2.3 μm, 2.2 μm, 2.1 μm, 2 μm, 1.9 μm, 1.8 μm, 1.7 μm, 1.6 μm, 1.5 μm, 1.4 μm, 1.3 μm, 1.2 μm, 1.1 μm, 1 μm, 0.95 μm, 0.9 μm, 0.85 μm, 0.8 μm, 0.75 μm, 0.7 μm, 0.65 μm, 0.6 μm, 0.55 μm, 0.5 μm, 0.45 μm, 0.4 μm, 0.35 μm, 0.3 μm, 0.25 μm, 0.2 μm, 0.15 μm, 0.1 μm, 90 nanometers (nm), 80 nm, 70 nm, 60 nm, 50 nm, 40 nm, 30 nm, 20 nm, 10 nm or 5 nm. Alternatively, or in addition, the volume equivalent sphere diameter (e.g., obtained by determining volume of particle(s)/aggregate from TEM histograms) may be, for example, greater than or equal to about 5 nm, 10 nm, 20 nm, 30 nm, 40 nm, 50 nm, 60 nm, 70 nm, 80 nm, 90 nm, 0.1 μm, 0.15 μm, 0.2 μm, 0.25 μm, 0.3 μm, 0.35 μm, 0.4 μm, 0.45 μm, 0.5 μm, 0.55 μm, 0.6 μm, 0.65 μm, 0.7 μm, 0.75 μm, 0.8 μm, 0.85 μm, 0.9 μm, 1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 3 μm, 3.5 μm, 4 μm, 4.5 μm or 5 μm. Particle size may be analyzed, for example, via dynamic light scattering (DLS). The size measure provided by DLS may be different than the size measure provided by TEM. The size measure by TEM may be the volume equivalent sphere diameter. The size measure by DLS may be a hydrodynamic diameter. DLS may be used to measure particle size based upon hydrodynamic radius, which may correspond to the radius carved out if the particle were rotating infinitely fast. Z average particle size may be the hydrodynamic diameter of the particle. The Z average particle size may be the maximum diameter of the aggregate (e.g., the particle aggregate) in three dimensions (the hydrodynamic diameter). DLS analysis may provide particle size distribution by intensity and/or by volume. For example, DLS may be used to provide a size by intensity measurement. The size by intensity may in some cases be lower than the size by volume. The size by volume may in some cases be based on a measurement of the size by intensity. The size (e.g., by intensity and/or by volume) may be, for example, greater than or equal to about 5 nm, 10 nm, 15 nm, 20 nm, 25 nm, 30 nm, 35 nm, 40 nm, 45 nm, 50 nm, 75 nm, 100 nm, 105 nm, 110 nm, 113 nm, 115 nm, 120 nm, 125 nm, 150 nm, 175 nm, 200 nm, 205 nm, 210 nm, 213 nm, 216 nm, 220 nm, 225 nm, 230 nm, 235 nm, 240 nm, 245 nm, 247 nm, 250 nm, 255 nm, 260 nm, 265 nm, 270 nm, 275 nm, 280 nm, 281 nm, 285 nm, 290 nm, 295 nm, 300 nm, 303 nm, 305 nm, 310 nm, 312 nm, 315 nm, 320 nm, 323 nm, 325 nm, 328 nm, 330 nm, 332 nm, 333 nm, 335 nm, 340 nm, 345 nm, 350 nm, 355 nm, 360 nm, 370 nm, 380 nm, 390 nm, 403 nm, 410 nm, 420 nm, 430 nm, 440 nm, 450 nm, 460 nm, 470 nm, 480 nm, 490 nm, 500 nm, 550 nm, 600 nm, 650 nm, 700 nm, 750 nm, 800 nm, 850 nm, 900 nm, 950 nm, 1000 nm, 1500 nm, 2000 nm, 2500 nm, 3000 nm, 3500 nm, 4000 nm, 4500 nm, 5000 nm, 5500 nm, 6000 nm, 6500 nm, 7000 nm, 7500 nm, 8000 nm, 8500 nm, 9000 nm, 9500 nm or 10 μm. Alternatively, or in addition, the size (e.g., by intensity and/or by volume) may be, for example, less than or equal to about 10 μm, 9500 nm, 9000 nm, 8500 nm, 8000 nm, 7500 nm, 7000 nm, 6500 nm, 6000 nm, 5500 nm, 5000 nm, 4500 nm, 4000 nm, 3500 nm, 3000 nm, 2500 nm, 2000 nm, 1500 nm, 1000 nm, 950 nm, 900 nm, 850 nm, 800 nm, 750 nm, 700 nm, 650 nm, 550 nm, 500 nm, 490 nm, 480 nm, 470 nm, 460 nm, 450 nm, 440 nm, 430 nm, 420 nm, 410 nm, 403 nm, 390 nm, 380 nm, 370 nm, 360 nm, 355 nm, 350 nm, 345 nm, 340 nm, 335 nm, 333 nm, 332 nm, 330 nm, 328 nm, 325 nm, 323 nm, 320 nm, 315 nm, 312 nm, 310 nm, 305 nm, 303 nm, 300 nm, 295 nm, 290 nm, 285 nm, 281 nm, 280 nm, 275 nm, 270 nm, 265 nm, 260 nm, 255 nm, 250 nm, 247 nm, 245 nm, 240 nm, 235 nm, 230 nm, 225 nm, 220 nm, 216 nm, 213 nm, 210 nm, 205 nm, 200 nm, 175 nm, 150 nm, 125 nm, 120 nm, 115 nm, 113 nm, 110 nm, 105 nm, 100 nm, 75 nm, 50 nm, 45 nm, 40 nm, 35 nm, 30 nm, 25 nm, 20 nm, 15 nm, 10 nm or 5 nm. The aforementioned particle sizes may include measured values and/or calculated values. The particles may have such sizes in combination with one or more poly dispersion indexes provided by the DLS analysis. The poly dispersion index may be, for example, greater than or equal to about 0, 0.005, 0.010, 0.025, 0.050, 0.075, 0.100, 0.120, 0.140, 0.160, 0.180, 0.200, 0.205, 0.211, 0.215, 0.221, 0.225, 0.230, 0.234, 0.240, 0.245, 0.250, 0.275, 0.3, 0.35, 0.4, 0.45 or 0.5. Alternatively, or in addition, the poly dispersion index may be, for example, less than or equal to about 0.5, 0.45, 0.4, 0.35, 0.3, 0.275, 0.250, 0.245, 0.240, 0.234, 0.230, 0.225, 0.221, 0.215, 0.211, 0.205, 0.200, 0.180, 0.160, 0.140, 0.120, 0.100, 0.075, 0.050, 0.025, 0.010 or 0.005.

A measured DLS size may be compared to a calculated DLS size. The calculated DLS size may be obtained by matching DBP and N2SA to Z average particle size as measured by a Malvern Zetasizer from Malvern Instruments. The Z average particle size may be the hydrodynamic diameter of the particle. The Z average particle size may be the maximum diameter of the aggregate (e.g., the particle aggregate) in three dimensions. The aggregate size by DLS may be predicted (calculated) in accordance with the equation $D_a = (2540 + 71 \langle DBP \rangle)/S$, where $D_a$ is the maximum diameter of the aggregate (also "maximum aggregate diameter" herein) in nanometers, S is STSA in $m^2/g$, and $\langle DBP \rangle$ is equal to the volume of dibutylphthalate in ml/100 g in accordance with standard test procedure ASTM D2414 (e.g., ASTM D2414-12). See, for example, A. I. Medalia et al., "Tinting Strength of Carbon Black," Journal of Colloid and Interface Science, Vol. 40, No. 2, August 1972, which is entirely incorporated herein by reference. Differences between the measured and calculated values may be expressed in terms of a DLS deviation ((measured−calculated)/measured). This calculation may be very close to the actual size measured by the Zetasizer for aciniform type carbon black particles and not very close for the first type of particle in accordance with the present disclosure (e.g., see Example 1). This may be because the first type of particle in accordance with the present disclosure possesses a very different morphology compared to aciniform type carbon black particles. DLS may be used to measure particle size based upon hydrodynamic radius, which may correspond to the radius carved out if the particle were rotating infinitely fast. Thus, the anisotropic particle of the first type described herein may appear to be much larger than predicted through the simple use of an equation used to fit fractal particles of typical aciniform structure carbon black. In contrast, there may be good agreement between measured and calculated values for aciniform type carbon black particles. The DLS deviation may be positive. The DLS deviation may be, for example, greater than or equal to about −15%, −10%, −8%, −6%, −5%, −4%, −3%, −2%, −1%, 0%, 0.5%, 1%, 1.5%, 2%, 2.5%, 3%, 3.5%, 4%, 4.5%, 5%, 6%, 7%, 8%, 9%, 10%, 11%, 12%, 13%, 14%, 15%, 16%, 17%, 18%, 19%, 20%, 25%, 30%, 35%, 40%, 45%, 50%, 55%, 60%, 61%, 62%, 63%, 64%, 65%, 66%, 67%, 68%, 69%, 70%, 75%, 80%, 85%, 90%, 95% or 99%. Alternatively, or in addition, the DLS deviation may be, for example, less than or equal to about 100%, 99%, 95%, 90%, 85%, 80%, 75%, 70%, 69%, 68%, 67%, 66%, 65%, 64%, 63%, 62%, 61%, 60%, 55%, 50%, 45%, 40%, 35%, 30%, 25%, 20%, 19%, 18%, 17%, 16%, 15%, 14%, 13%, 12%, 11%, 10%, 9%, 8%, 7%, 6%, 5%, 4.5%, 4%, 3.5%, 3%, 2.5%, 2%, 1.5%, 1% or 0.5%. The Z average particle size as measured by DLS may be, for example, greater than or equal to about 85%, 90%, 92%, 94%, 95%, 96%, 97%, 98% or 99% of the value based upon the equation $D_a=(2540+71<DBP>)/S$. The Z average particle size as measured by DLS may be greater than the value based upon the equation $D_a=(2540+71<DBP>)/S$. The Z average particle size as measured by DLS may be, for example, greater than or equal to about 0%, 1%, 2%, 3%, 4%, 5%, 10%, 11%, 12%, 13%, 14%, 15%, 16%, 17%, 18%, 19%, 20%, 25%, 30%, 35%, 40%, 45%, 50%, 60%, 70%, 80%, 90%, 100%, 125%, 150%, 160%, 170%, 180%, 190%, 194%, 195%, 200%, 203%, 205%, 210%, 220%, 230%, 240%, 250%, 300%, 350%, 400%, 450% or 500% greater than the value based upon the equation $D_a=(2540+71<DBP>)/S$. Alternatively, or in addition, the Z average particle size as measured by DLS may be, for example, less than or equal to about 500%, 450%, 400%, 350%, 300%, 250%, 240%, 230%, 220%, 210%, 205%, 203%, 200%, 195%, 194%, 190%, 180%, 170%, 160%, 150%, 125%, 100%, 90%, 80%, 70%, 60%, 50%, 45%, 40%, 35%, 30%, 25%, 20%, 19%, 18%, 17%, 16%, 15%, 14%, 13%, 12%, 11%, 10%, 5%, 4%, 3%, 2% or 1% greater than the value based upon the equation $D_a=(2540+71<DBP>)/S$. In some examples, the Z average particle size as measured by DLS may be at least 30% greater than the value based upon the equation $D_a=(2540+71<DBP>)/S$.

The different particle populations may be differentiated by performing transmission electron microscope (TEM) histograms and measuring the maximum dimension of the particle, then taking the area occupied by the particle and subtracting that area from the area of a circle of that same maximum dimension. The ratio between the area not occupied by the particle and the area of the circle may be referred to or termed the free space percentage (also "percent free space" and "percent occupied by free space" herein). In some examples, the percent occupied by free space may be greater than about 90% for the anisotropic particle of the first type described herein, but may be closer to about 40-50% (e.g., 40 to 50%) or 40-60% for (e.g., most) aciniform type carbon black particles. The free space percentage may be, for example, greater than or equal to about 5%, 10%, 15%, 25%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 70%, 75%, 80%, 85%, 86%, 87%, 88%, 89%, 90%, 91%, 92%, 93%, 94%, 95%, 96%, 97%, 98%, 99%, 99.5% or 99.9%. Alternatively, or in addition, the free space percentage may be, for example, less than or equal to about 100%, 99.9%, 99.5%, 99%, 98%, 97%, 96%, 95%, 94%, 93%, 92%, 91%, 90%, 89%, 88%, 87%, 86%, 85%, 80%, 75%, 70%, 65%, 64%, 63%, 62%, 61%, 60%, 59%, 58%, 57%, 56%, 55%, 54%, 53%, 52%, 51%, 50%, 49%, 48%, 47%, 46%, 45%, 44%, 43%, 42%, 41%, 40%, 25%, 15% or 10%.

A given portion (e.g., at least a portion) of the total number of particles may be of a given type and/or have a given property/characteristic or set of given properties/characteristics. For example, a given portion of the total number of particles may have a given free space percentage or a given range of free space percentages, a given shape or anisotropy, and/or other given properties/characteristics. The portion of the total number of particles with a given property/characteristic or set of given properties/characteristics (e.g., a given free space percentage or a given range of free space percentages) may be, for example, greater than or equal to about 0%, 0.01%, 0.05%, 0.1%, 0.5%, 1%, 2%, 5%, 10%, 15%, 20%, 25%, 30%, 35%, 40%, 45%, 50%, 55%, 60%, 65%, 70%, 75%, 80%, 85%, 90%, 95%, 99%, 99.5% or 99.9% (e.g., based on number count). Alternatively, or in addition, the portion of the total number of particles with a given property/characteristic or set of given properties/characteristics (e.g., a given free space percentage or a given range of free space percentages) may be, for example, less than or equal to about 100%, 99.9%, 99.5%, 99%, 95%, 90%, 85%, 80%, 75%, 70%, 65%, 60%, 55%, 50%, 45%, 40%, 35%, 30%, 25%, 20%, 15%, 10%, 5%, 2%, 1%, 0.5%, 0.1%, 0.05% or 0.01% (e.g., based on number count). In some examples, the percent free space of at least 5% of the total number of particles may be 90% or greater based on number count. In some examples, the percent free space of at least about 0.5%, 1%, 5%, 10%, 15%, 25%, 30%, 35%, 40%, 45%, 50%, 75%, 90% or 99% of the total number of particles may be greater than or equal to about 60%, 65% or 90% based on number count. In some examples, the percent free space of at least about 0.5%, 1%, 5%, 10%, 15%, 25%, 30%, 35%, 40%, 45%, 50%, 75%, 90% or 99% of the total number of particles may be less than about 60%, 54%, 53%, or 50% based on number count. In some examples, the percent free space of at most about 95%, 90%, 75%, 50%, 45%, 40%, 35%, 30%, 25%, 10%, 5%, 1% or 0.05% of the total number of particles may be less than about 90%, 85%, 60%, 54% or 50%, or between about 50% and 60%, based on number count.

The carbon particle(s) may have a given density. The density may be a true density. The true density may be determined, for example, by helium (He) pycnometry. The true density may be measured, for example in accordance with ASTM D7854 (e.g., ASTM D7854-16). In some examples, the carbon particle(s) described herein may have a true density of greater than or equal to (e.g., about) 2.1 g/cm$^3$. The true density for furnace black is typically 1.8-1.9 g/cm$^3$. The true density of the carbon particle(s) described herein may be, for example, greater than or equal to about 1.5 g/cm$^3$, 1.6 g/cm$^3$, 1.7 g/cm$^3$, 1.75 g/cm$^3$, 1.8 g/cm$^3$, 1.85 g/cm$^3$, 1.9 g/cm$^3$, 1.95 g/cm$^3$, 2 g/cm$^3$, 2.05 g/cm$^3$, 2.1 g/cm$^3$, 2.15 g/cm$^3$, 2.2 g/cm$^3$, 2.25 g/cm$^3$, 2.3 g/cm$^3$, 2.35 g/cm$^3$, 2.4 g/cm$^3$, 2.45 g/cm$^3$, 2.5 g/cm$^3$, 2.6 g/cm$^3$, 2.7 g/cm$^3$, 2.8 g/cm$^3$, 2.9 g/cm$^3$ or 3 g/cm$^3$. Alternatively, or in addition, the true density of the carbon particle(s) described herein may be, for example, less than or equal to about 3 g/cm$^3$, 2.9 g/cm$^3$, 2.8 g/cm$^3$, 2.7 g/cm$^3$, 2.6 g/cm$^3$, 2.5 g/cm$^3$, 2.45 g/cm$^3$, 2.4 g/cm$^3$, 2.35 g/cm$^3$, 2.3 g/cm$^3$, 2.25 g/cm$^3$, 2.2 g/cm$^3$, 2.15 g/cm$^3$, 2.1 g/cm$^3$, 2.05 g/cm$^3$, 2 g/cm$^3$, 1.95 g/cm$^3$, 1.9 g/cm$^3$, 1.85 g/cm$^3$, 1.8 g/cm$^3$, 1.75 g/cm$^3$, 1.7 g/cm$^3$, 1.6 g/cm$^3$ or 1.5 g/cm$^3$.

The carbon particle(s) may have a given surface area. Surface area may refer to, for example, nitrogen surface area (N2SA) (e.g., nitrogen-based Brunauer-Emmett-Teller (BET) surface area), statistical thickness surface area (STSA) and/or electron microscope surface area (EMSA). The N2SA (also "NSA" herein) and STSA may be measured via ASTM D6556 (e.g., ASTM D6556-10). The EMSA (the surface area predicted by electron microscopy) may be measured via ASTM D3849 (e.g., ASTM D3849-07). The surface areas described herein may refer to surface area excluding (internal) porosity (e.g., excluding pores that are internal to the primary particles, excluding porous surface area due to any internal pores). The surface area (e.g., N2SA, STSA and/or EMSA) may be, for example, greater than or equal to about 5 m²/g, 10 m²/g, 11 m²/g, 12 m²/g, 13 m²/g, 14 m²/g, 15 m²/g, 16 m²/g, 17 m²/g, 18 m²/g, 19 m²/g, 20 m²/g, 21 m²/g, 22 m²/g, 23 m²/g, 24 m²/g, 25 m²/g, 26 m²/g, 27 m²/g, 28 m²/g, 29 m²/g, 30 m²/g, 31 m²/g, 32 m²/g, 33 m²/g, 34 m²/g, 35 m²/g, 36 m²/g, 37 m²/g, 38 m²/g, 39 m²/g, 40 m²/g, 41 m²/g, 42 m²/g, 43 m²/g, 44 m²/g, 45 m²/g, 46 m²/g, 47 m²/g, 48 m²/g, 49 m²/g, 50 m²/g, 51 m²/g, 52 m²/g, 54 m²/g, 55 m²/g, 56 m²/g, 60 m²/g, 61 m²/g, 63 m²/g, 65 m²/g, 70 m²/g, 72 m²/g, 75 m²/g, 79 m²/g, 80 m²/g, 81 m²/g, 85 m²/g, 90 m²/g, 95 m²/g, 100 m²/g, 105 m²/g, 110 m²/g, 111 m²/g, 112 m²/g, 113 m²/g, 114 m²/g, 115 m²/g, 116 m²/g, 117 m²/g, 118 m²/g, 119 m²/g, 120 m²/g, 121 m²/g, 123 m²/g, 125 m²/g, 130 m²/g, 135 m²/g, 138 m²/g, 140 m²/g, 145 m²/g, 150 m²/g, 160 m²/g, 170 m²/g, 180 m²/g, 190 m²/g, 200 m²/g, 210 m²/g, 220 m²/g, 230 m²/g, 240 m²/g, 250 m²/g, 260 m²/g, 270 m²/g, 280 m²/g, 290 m²/g, 300 m²/g, 310 m²/g, 320 m²/g, 330 m²/g, 340 m²/g, 350 m²/g, 360 m²/g, 370 m²/g, 380 m²/g, 390 m²/g or 400 m²/g. Alternatively, or in addition, the surface area (e.g., N2SA, STSA and/or EMSA) may be, for example, less than or equal to about 400 m²/g, 390 m²/g, 380 m²/g, 370 m²/g, 360 m²/g, 350 m²/g, 340 m²/g, 330 m²/g, 320 m²/g, 310 m²/g, 300 m²/g, 290 m²/g, 280 m²/g, 270 m²/g, 260 m²/g, 250 m²/g, 240 m²/g, 230 m²/g, 220 m²/g, 210 m²/g, 200 m²/g, 190 m²/g, 180 m²/g, 170 m²/g, 160 m²/g, 150 m²/g, 145 m²/g, 140 m²/g, 138 m²/g, 135 m²/g, 130 m²/g, 125 m²/g, 123 m²/g, 121 m²/g, 120 m²/g, 119 m²/g, 118 m²/g, 117 m²/g, 116 m²/g, 115 m²/g, 114 m²/g, 113 m²/g, 112 m²/g, 111 m²/g, 110 m²/g, 105 m²/g, 100 m²/g, 95 m²/g, 90 m²/g, 85 m²/g, 81 m²/g, 80 m²/g, 79 m²/g, 75 m²/g, 72 m²/g, 70 m²/g, 65 m²/g, 63 m²/g, 61 m²/g, 60 m²/g, 56 m²/g, 55 m²/g, 54 m²/g, 52 m²/g, 51 m²/g, 50 m²/g, 49 m²/g, 48 m²/g, 47 m²/g, 46 m²/g, 45 m²/g, 44 m²/g, 43 m²/g, 42 m²/g, 41 m²/g, 40 m²/g, 39 m²/g, 38 m²/g, 37 m²/g, 36 m²/g, 35 m²/g, 34 m²/g, 33 m²/g, 32 m²/g, 31 m²/g, 30 m²/g, 29 m²/g, 28 m²/g, 27 m²/g, 26 m²/g, 25 m²/g, 24 m²/g, 23 m²/g, 22 m²/g, 21 m²/g, 20 m²/g, 19 m²/g, 18 m²/g, 17 m²/g, 16 m²/g, 15 m²/g, 14 m²/g, 13 m²/g, 12 m²/g, 11 m²/g, 10 m²/g or 5 m²/g. In some examples, the surface area (e.g., N2SA) may be from about 30 m²/g to about 400 m²/g, from about 30 m²/g to about 65 m²/g, from about 40 m²/g to about 150 m²/g, from about 40 m²/g to about 80 m²/g, from about 80 m²/g to about 150 m²/g, from about 40 m²/g to about 75 m²/g, from about 120 m²/g to about 150 m²/g, or from about 120 m²/g to about 160 m²/g. For example, the process(es) described herein may yield N2SA and/or STSA of 40-80 m²/g and/or 80-150 m²/g as measured by ASTM D6556 (e.g., the process(es) described herein may yield N2SA or STSA both in the range 80-150 m²/g and in the range 40-80 m²/g as measured by ASTM D6556). The STSA and N2SA may differ. The difference may be expressed in terms of an STSA/N2SA ratio. The STSA/N2SA ratio may be, for example, greater than or equal to about 0.4, 0.5, 0.6, 0.7, 0.75, 0.76, 0.77, 0.78, 0.79, 0.8, 0.81, 0.82, 0.83, 0.84, 0.85, 0.86, 0.87, 0.88, 0.89, 0.9, 0.91, 0.92, 0.93, 0.94, 0.95, 0.96, 0.97, 0.98, 0.99, 1, 1.01, 1.02, 1.03, 1.03, 1.05, 1.06, 1.07, 1.08, 1.09, 1.1, 1.11, 1.12, 1.13, 1.14, 1.15, 1.16, 1.17, 1.19, 1.20, 1.21, 1.22, 1.23, 1.24, 1.25, 1.26, 1.27, 1.28, 1.29, 1.3, 1.31, 1.32, 1.33, 1.34, 1.35, 1.37, 1.38, 1.39, 1.4, 1.45, 1.5, 1.6, 1.7, 1.8, 1.9 or 2. Alternatively, or in addition, the STSA/N2SA ratio may be, for example, less than or equal to about 2, 1.9, 1.8, 1.7, 1.6, 1.5, 1.45, 1.4, 1.39, 1.38, 1.37, 1.36, 1.35, 1.34, 1.33, 1.32, 1.31, 1.3, 1.29, 1.28, 1.27, 1.26, 1.25, 1.24, 1.23, 1.22, 1.21, 1.2, 1.19, 1.18, 1.17, 1.16, 1.15, 1.14, 1.13, 1.12, 1.11, 1.1, 1.09, 1.08, 1.07, 1.06, 1.05, 1.04, 1.03, 1.02, 1.01, 1, 0.99, 0.98, 0.97, 0.96, 0.95, 0.94, 0,93, 0.92, 0.91, 0.9, 0.89, 0.88, 0.87, 0.86, 0.85, 0.84, 0.83, 0.82, 0.81, 0.8, 0.79, 0.78, 0.77, 0.76, 0.75, 0.7, 0.6 or 0.5. In some examples, the STSA/N2SA ratio may be from 1.01 to 1.35, or from 1.01 to 1.4. In some examples, the surface area predicted by electron microscopy (e.g., for the first type of particle and/or the second type of particle in Examples 1-2) may be far off from a corresponding value measured by STSA (and/or N2SA). This difference may be expressed in terms of an STSA/EMSA (and/or N2SA/EMSA) ratio. The STSA/EMSA (and/or N2SA/EMSA) ratio may be, for example, greater than or equal to about 0.1, 0.5, 0.6, 0.7, 0.75, 0.8, 0.85, 0.88, 0.9, 0.91, 0.92, 0.93, 0.94, 0.95, 0.96, 0.97, 0.98, 0.99, 1, 1.01, 1.02, 1.03, 1.04, 1.05, 1.1, 1.2, 1.3, 1.33, 1.35, 1.4, 1.45, 1.5, 2, 2.5, 3, 3.05, 3.08, 3.1, 3.2, 3.3, 3.35, 3.4, 3.5, 3.55, 3.6, 3.63, 3.65, 3.7, 3.75, 3.8, 3.85, 3.9, 3.95, 3.97, 4, 4.05, 4.1, 4.15, 4.2, 4.3, 4.4, 4.5, 5, 5.5, 6, 6.5 or 7. Alternatively, or in addition, the STSA/EMSA (and/or N2SA/EMSA) ratio may be, for example, less than or equal to about 10, 9, 8, 7.5, 7, 6.5, 6, 5.5, 5, 4.5, 4.4, 4.3, 4.2, 4.15, 4.1, 4.05, 4, 3.97, 3.95, 3.9, 3.85, 3.8, 3.75, 3.7, 3.65, 3.63, 3.6, 3.55, 3.5, 3.4, 3.35, 3.3, 3.2, 3.1, 3.08, 3.05, 3, 2.5, 2, 1.5, 1.45, 1.4, 1.35, 1.33, 1.3, 1.2, 1.1, 1.05, 1.04, 1.03, 1.02, 1.01, 1, 0.99, 0.98, 0.97, 0.96, 0.95, 0.94, 0.93, 0.92, 0.91, 0.9, 0.88, 0.85, 0.8, 0.75, 0.7, 0.6 or 0.5. Aciniform type carbon black may have an STSA/EMSA ratio of 0.7 to 1.3. In some examples, the carbon particle(s) (e.g., the first type of particle and/or the second type of particle in Examples 1-2) may possess an STSA/EMSA of greater than or equal to about 1.3, 1.35, 1.4, 1.45, 1.5, 2, 3, 3.5, 3.6, 3.7, 3.8, 3.9, 4, 4.05, 4.1, 4.2, 4.3, 4.4, 4.5, 5, 5.5 or 6. The carbon particles may have such surface area ratios in combination with, for example, one or more DLS deviations, free space percentages, shapes, purities and/or other properties or characteristics described herein (e.g., as described in relation to Examples 1-2).

In some examples, the carbon particles may have an $L_c$ greater than 3.0 nm and an STSA/N2SA ratio of 1.01 to 1.35, or 1.01 to 1.4.

The carbon particles may have a given structure. The structure may be expressed in terms of dibutyl phthalate (DBP) absorption, which measures the relative structure of carbon particles by determining the amount of DBP a given mass of carbon particles can absorb before reaching a specified visco-rheologic target torque. In the case of carbon black, thermal blacks have the lowest DBP numbers (32-47 ml/100 g) of any carbon black, indicating very little particle aggregation or structure. The structure may be expressed in terms of compressed dibutyl phthalate (CDBP) absorption, which measures the relative structure of carbon particles by determining the amount of DBP a given mass of crushed carbon particles can absorb before reaching a specified visco-rheologic target torque. The term structure may be used interchangeably with the term DBP and/or CDBP (e.g., a high structure material possesses a high DBP value). The structures described herein may refer to structure after pelletization (e.g., post-pelletized DBP and/or CDBP). DBP absorption (also "DBP" herein) may be measured in accordance with ASTM D2414 (e.g., ASTM D2414-12). CDBP absorption (also "CDBP" herein) may be measured in accordance with ASTM D3493. In some examples, the structure of the carbon particles as measured by ASTM D2414 may be higher (greater) than 100 ml/100 grams. In some examples, the structure of the carbon particles may be between 100 ml/100 grams and 150 ml/100 grams. In some examples, the structure of the carbon particles may be between 100 ml/100 grams and 200 ml/100 grams. In some examples, the structure of the carbon particles may be between 100 ml/100 grams and 250 ml/100 grams. In some examples, the structure of the carbon particles may be higher (greater) than 150 ml/100 grams. The DBP and/or CDBP may be, for example, greater than or equal to about 1 milliliter per 100 grams (ml/100 g), 5 ml/100 g, 10 ml/100 g, 15 ml/100 g, 20 ml/100 g, 25 ml/100 g, 32 ml/100 g, 40 ml/100 g, 45 ml/100 g, 47 ml/100 g, 50 ml/100 g, 55 ml/100 g, 56 ml/100 g, 57 ml/100 g, 58 ml/100 g, 59 ml/100 g, 60 ml/100 g, 61 ml/100 g, 62 ml/100 g, 63 ml/100 g, 64 ml/100 g, 65 ml/100 g, 66 ml/100 g, 67 ml/100 g, 68 ml/100 g, 69 ml/100 g, 70 ml/100 g, 71 ml/100 g, 72 ml/100 g, 73 ml/100 g, 74 ml/100 g, 75 ml/100 g, 76 ml/100 g, 78 ml/100 g, 79 ml/100 g, 80 ml/100 g, 81 ml/100 g, 82 ml/100 g, 83 ml/100 g, 84 ml/100 g, 85 ml/100 g, 86 ml/100 g, 87 ml/100 g, 88 ml/100 g, 89 ml/100 g, 90 ml/100 g, 91 ml/100 g, 92 ml/100 g, 93 ml/100 g, 94 ml/100 g, 95 ml/100 g, 96 ml/100 g, 97 ml/100 g, 98 ml/100 g, 99 ml/100 g, 100 ml/100 g, 101 ml/100 g, 104 ml/100 g, 105 ml/100 g, 109 ml/100 g, 110 ml/100 g, 111 ml/100 g, 112 ml/100 g, 113 ml/100 g, 114 ml/100 g, 115 ml/100 g, 116 ml/100 g, 117 ml/100 g, 118 ml/100 g, 119 ml/100 g, 120 ml/100 g, 121 ml/100 g, 122 ml/100 g, 123 ml/100 g, 124 ml/100 g, 125 ml/100 g, 126 ml/100 g, 127 ml/100 g, 128 ml/100 g, 129 ml/100 g, 130 ml/100 g, 131 ml/100 g, 132 ml/100 g, 134 ml/100 g, 135 ml/100 g, 136 ml/100 g, 137 ml/100 g, 138 ml/100 g, 140 ml/100 g, 142 ml/100 g, 145 ml/100 g, 150 ml/100 g, 152 ml/100 g, 155 ml/100 g, 160 ml/100 g, 165 ml/100 g, 170 ml/100 g, 174 ml/100 g, 175 ml/100 g, 180 ml/100 g, 183 ml/100 g, 185 ml/100 g, 190 ml/100 g, 195 ml/100 g, 200 ml/100 g, 205 ml/100 g, 210 ml/100 g, 215 ml/100 g, 220 ml/100 g, 225 ml/100 g, 230 ml/100 g, 235 ml/100 g, 240 ml/100 g, 245 ml/100 g, 250 ml/100 g, 255 ml/100 g, 260 ml/100 g, 265 ml/100 g, 270 ml/100 g, 275 ml/100 g, 280 ml/100 g, 285 ml/100 g, 290 ml/100 g, 295 ml/100 g or 300 ml/100 g. Alternatively, or in addition, the DBP and/or CDBP may be, for example, less than or equal to about 300 ml/100 g, 295 ml/100 g, 290 ml/100 g, 285 ml/100 g, 280 ml/100 g, 275 ml/100 g, 270 ml/100 g, 265 ml/100 g, 260 ml/100 g, 255 ml/100 g, 245 ml/100 g, 240 ml/100 g, 235 ml/100 g, 230 ml/100 g, 225 ml/100 g, 220 ml/100 g, 215 ml/100 g, 210 ml/100 g, 205 ml/100 g, 200 ml/100 g, 195 ml/100 g, 190 ml/100 g, 185 ml/100 g, 183 ml/100 g, 180 ml/100 g, 175 ml/100 g, 174 ml/100 g, 170 ml/100 g, 165 ml/100 g, 160 ml/100 g, 155 ml/100 g, 152 ml/100 g, 150 ml/100 g, 145 ml/100 g, 142 ml/100 g, 140 ml/100 g, 138 ml/100 g, 137 ml/100 g, 136 ml/100 g, 135 ml/100 g, 134 ml/100 g, 132 ml/100 g, 131 ml/100 g, 130 ml/100 g, 129 ml/100 g, 128 ml/100 g, 127 ml/100 g, 126 ml/100 g, 125 ml/100 g, 124 ml/100 g, 123 ml/100 g, 122 ml/100 g, 121 ml/100 g, 120 ml/100 g, 119 ml/100 g, 118 ml/100 g, 117 ml/100 g, 116 ml/100 g, 115 ml/100 g, 114 ml/100 g, 113 ml/100 g, 112 ml/100 g, 111 ml/100 g, 110 ml/100 g, 109 ml/100 g, 105 ml/100 g, 104 ml/100 g, 101 ml/100 g, 100 ml/100 g, 99 ml/100 g, 98 ml/100 g, 97 ml/100 g, 96 ml/100 g, 95 ml/100 g, 94 ml/100 g, 93 ml/100 g, 92 ml/100 g, 91 ml/100 g, 90 ml/100 g, 89 ml/100 g, 88 ml/100 g, 87 ml/100 g, 86 ml/100 g, 85 ml/100 g, 84 ml/100 g, 83 ml/100 g, 82 ml/100 g, 81 ml/100 g, 80 ml/100 g, 79 ml/100 g, 78 ml/100 g, 76 ml/100 g, 75 ml/100 g, 74 ml/100 g, 73 ml/100 g, 72 ml/100 g, 71 ml/100 g, 70 ml/100 g, 69 ml/100 g, 68 ml/100 g, 67 ml/100 g, 66 ml/100 g, 65 ml/100 g, 64 ml/100 g, 63 ml/100 g, 62 ml/100 g, 61 ml/100 g, 60 ml/100 g, 59 ml/100 g, 58 ml/100 g, 57 ml/100 g, 56 ml/100 g, 55 ml/100 g, 50 ml/100 g, 47 ml/100 g, 45 ml/100 g, 40 ml/100 g or 32 ml/100 g. DBP and CDBP may differ (e.g., DBP may be greater than CDBP). In some instances, the difference between DBP and CDBP may be less for the carbon particle(s) of the present disclosure due to, for example, higher crystallinity as described in greater detail elsewhere herein (e.g., higher crystallinity may enable stronger carbon particle(s) that are more difficult to crush) and/or due to other factors. In some examples, the DBP may be between about 1% and 10%, 1% and 15%, 5% and 19%, 1% and 20%, 5%, and 30%, or 5% and 35% greater than the CDBP. The DBP value may be, for example, less than or equal to about 2, 1.9, 1.85, 1.8, 1.75, 1.7, 1.65, 1.6, 1.55, 1.5, 1.45, 1.4, 1.35, 1.3, 1.28, 1.26, 1.24, 1.22, 1.2, 1.19, 1.18, 1.16, 1.15, 1.14, 1.13, 1.12, 1.11, 1.1, 1.09, 1.08, 1.07, 1.06, 1.05, 1.04, 1.03, 1.02 or 1.01 times the CDBP value. Alternatively, or in addition, the DBP value may be, for example, greater than or equal to about 1, 1.01, 1.02, 1.03, 1.04, 1.05, 1.06, 1.07, 1.08, 1.09, 1.1, 1.11, 1.12, 1.13, 1.14, 1.15, 1.16, 1.17, 1.18, 1.19, 1.2, 1.22, 1.24, 1.26, 1.28, 1.3, 1.35, 1.40, 1.45, 1.5, 1.55, 1.6, 1.65, 1.7, 1.75, 1.8, 1.85, 1.9 or 2 times the CDBP value.

The carbon particles may have, for example, N2SA from about 30 $m^2/g$ to about 400 $m^2/g$, from about 30 $m^2/g$ to about 65 $m^2/g$, from about 40 $m^2/g$ to about 80 $m^2/g$, from about 80 $m^2/g$ to about 150 $m^2/g$, from about 40 $m^2/g$ to about 150 $m^2/g$, from about 40 $m^2/g$ to about 75 $m^2/g$, from about 120 $m^2/g$ to about 150 $m^2/g$, or from about 120 $m^2/g$ to about 160 $m^2/g$, and DBP greater than about 100 ml/100 g, from about 100 ml/100 g to about 150 ml/100 g, greater than about 150 ml/100 g, from about 100 ml/100 grams to about 200 ml/100 grams, or from about 100 ml/100 grams to about 250 ml/100 grams (e.g., N2SA from about 40 $m^2/g$ to about 75 $m^2/g$, and DBP from about 100 ml/100 grams to about 200 ml/100 grams; or N2SA from about 120 $m^2/g$ to about 150 $m^2/g$ or 160 $m^2/g$, and DBP from about 100 ml/100 grams to about 250 ml/100 grams). The carbon particles may have such properties in combination with one or more other properties described herein. For example, the carbon particles may have the aforementioned properties at one or more particle sizes, crystallinities and/or purities (e.g., in terms of low sulfur, low transition metals, low oxygen, low ash, low grit, or any combination thereof) described herein. In an example, the carbon particles may have the aforementioned properties at a suitable particle size (e.g., a suitable primary particle size, as described elsewhere herein), increased crystallinity compared to other carbon particles (e.g., other carbon nanoparticles), low metal contamination levels (e.g., as described elsewhere herein), low levels of elemental sulfur and oxygen (e.g., as described elsewhere herein), low levels (e.g., as described elsewhere herein) of large particle contamination (e.g., comprising only particles less than 30 microns in size), very low moisture content (e.g., <0.2% by weight), parts per million scale PAH levels (e.g., less than about 1 ppm), tote greater than about 99.8%, ash content of less than or equal to about 1% or less than about 0.02%, or any combination thereof.

In an example, carbon particles in accordance with the present disclosure may have N2SA of about 105 $m^2/g$, STSA of about 123 $m^2/g$, DBP of about 185 ml/100 g, ash less than about 0.05% (e.g., by weight), tote of about 97% and moisture of less than about 0.2% (e.g., by weight).

Carbon particles (e.g., carbon nanoparticles) produced in accordance with the present disclosure (e.g., in a plasma) may be compounded into rubber. The systems and methods (and processes) described herein may successfully generate quality carbon particles (e.g., carbon nanoparticles) that can reinforce elastomer compounds. Properties and rubber performance results (e.g., when compared to furnace-based carbon black) may be measured as described, for example, in commonly assigned, Int. Pat. Pub. No. WO 2017/048621 ("CARBON BLACK FROM NATURAL GAS"), which is entirely incorporated herein by reference. As described in greater detail elsewhere herein, the carbon particle(s) described herein may be more crystalline than other carbon particle(s). In some examples, the carbon particle(s) described herein may be more crystalline than other carbon particle(s), yet performance in rubber may show that surface activity is present. The surface chemistry may be compatible with that required for high performance in elastomer composites (e.g., specifically as filler material in tread composites). The carbon particles described herein may pelletize and/or disperse in polymer (e.g., rubber). Hydrophilic content of the carbon particle(s) of the present disclosure may be as described elsewhere herein. Such hydrophilic content of the carbon particle(s) may result in faster dispersion in polymer (e.g., elastomer) and/or less moisture in as produced carbon particle(s). In some examples of the processes described herein, the nature of the hydrogen environment of the process may lead to more hydrogen (e.g., higher hydrogen content) at the (particle) surface. Higher hydrogen content may be, for example, beneficial in tire tread abrasion resistance. The lack of surface oxygen groups may lead to a faster mix time and faster cure time in elastomer composites. At a lower oxygen level at the surface of carbon particle(s), the same amount of hydrogen may indicate greater surface activity for performance in tire tread and other elastomer filler applications.

Pellets of the carbon particles described herein may have a given fines content. The fines (e.g., 5' and/or 20') may be measured, for example, in accordance with ASTM D1508. The fines (e.g., 5' and/or 20') content (e.g., by weight) may be, for example, less than or equal to about 15%, 10%, 5%, 4.5%, 4%, 3.5%, 3%, 2.8%, 2.6%, 2.4%, 2.2%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, 0.05%, 0.01% or 0.005%. Alternatively, or in addition, the fines (e.g., 5' and/or 20') content (e.g., by weight) may be, for example, greater than or equal to about 0%, 0.005%, 0.01%, 0.05%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.2%, 2.4%, 2.6%, 2.8%, 3%, 3.5%, 4% or 5%.

Pellets and/or fluffy of the carbon particles described herein may have a given fines sieve residue (e.g., 325 mesh and/or 35 mesh). 325 mesh and 35 mesh sieve residues may be measured, for example, in accordance with ASTM D1514. The amount of sieve (e.g., 325 mesh and/or 35 mesh) residue may be, for example, less than or equal to about 0.5%, 0.2%, 0.1%, 900 ppm, 800 ppm, 700 ppm, 600 ppm, 500 ppm, 400 ppm, 300 ppm, 250 ppm, 200 ppm, 175 ppm, 150 ppm, 125 ppm, 100 ppm, 80 ppm, 75 ppm, 50 ppm, 25 ppm, 10 ppm, 5 ppm or 1 ppm (e.g., by weight). Alternatively, or in addition, the amount of sieve (e.g., 325 mesh and/or 35 mesh) residue may be, for example, greater than or equal to about 0 ppm, 1 ppm, 5 ppm, 10 ppm, 25 ppm, 50 ppm, 75 ppm, 80 ppm, 100 ppm, 125 ppm, 150 ppm, 175 ppm, 200 ppm, 250 ppm, 300 ppm, 400 ppm, 500 ppm, 600 ppm, 700 ppm, 800 ppm, 900 ppm or 0.1% (e.g., by weight).

The carbon particles may have given pellet properties. Upon pelletization, the carbon particles may have a given pellet hardness (e.g., individual and/or average). Individual and average pellet hardness may be measured, for example, in accordance with ASTM D5230. In some examples, individual and/or average pellet hardness may be less than or equal to about 90 gram-force (gf) or 50 gf. The pellet hardness (e.g., individual and/or average) may be, for example, less than or equal to about 300 gf, 250 gf, 200 gf, 180 gf, 160 gf, 140 gf, 120 gf, 100 gf, 95 gf, 90 gf, 85 gf, 80 gf, 75 gf, 70 gf, 65 gf, 60 gf, 55 gf, 51 gf, 50 gf, 48 gf, 45 gf, 40 gf, 35 gf, 30 gf, 25 gf, 24 gf, 23 gf, 22 gf, 21 gf, 20 gf, 19 gf, 18 gf, 17 gf, 16 gf, 15 gf, 14 gf, 13 gf, 12 gf, 11 gf, 10 gf, 5 gf or 1 gf. Alternatively, or in addition, the pellet hardness (e.g., individual and/or average) may be, for example, greater than or equal to about 0.05 gf, 1 gf, 5 gf, 10 gf, 11 gf, 12 gf, 13 gf, 14 gf, 15 gf, 16 gf, 17 gf, 18 gf, 19 gf, 20 gf, 21 gf, 22 gf, 23 gf, 24 gf, 25 gf, 30 gf, 35 gf, 40 gf, 45 gf, 48 gf, 50 gf, 51 gf, 55 gf, 60 gf, 65 gf, 70 gf, 75 gf, 80 gf, 85 gf, 90 gf, 95 gf, 100 gf, 120 gf, 140 gf, 160 gf, 180 gf, 200 gf, 250 gf or 300 gf.

The carbon particles described herein may charge and/or disperse with carbon surfactants. Zeta potential analysis may be used to quantify the charging and/or dispersion. With aqueous solutions and a cationic short polymer chain ammonium based surfactant, the carbon particles described herein may charge to a Zeta potential of, for example, greater than or equal to about 5 millivolt (mV), 10 mV, 15 mV, 20 mV, 25 mV, 30 mV, 31 mV, 32 mV, 33 mV, 34 mV, 35 mV, 36 mV, 37 mV, 38 mV, 39 mV, 40 mV, 45 mV or 50 mV. Alternatively, or in addition, the carbon particles described herein may charge to a Zeta potential of, for example, less than or equal to about 50 mV, 45 mV, 40 mV, 39 mV, 38 mV, 37 mV, 36 mV, 35 mV, 34 mV, 33 mV, 32 mV, 31 mV, 30 mV, 25 mV, 20 mV, 15 mV or 10 mV (with aqueous solutions and a cationic short polymer chain ammonium based surfactant). With aqueous solutions and anionic methacrylate short chain polymer surfactant, the carbon particles described herein may charge to a Zeta potential of, for example, greater than or equal to about −80 mV, −75 mV, −70 mV, −65 mV, −60 mV, −59 mV, −58 mV, −57 mV, −56 mV, −55 mV, −50 mV, −49 mV, −48 mV, −47 mV, −46 mV, −45 mV, −44 mV, −43 mV, −42 mV, −41 mV, −40 mV, −39 mV, −38 mV, −37 mV, −36 mV, −35 mV, −30 mV, −25 mV, −20 mV or −15 mV. Alternatively, or in addition, the carbon particles described herein may charge to a Zeta potential of, for example, less than or equal to about −15 mV, −20 mV, −25 mV, −30 mV, −35 mV, −36 mV, −37 mV, −38 mV, −39 mV, −40 mV, −41 mV, −42 mV, −43 mV, −44 mV, −45 mV, −46 mV, −47 mV, −48 mV, −49 mV, −50 mV, −55 mV, −56 mV, −57 mV, −58 mV, −59 mV, −60 mV, −65 mV or −70 mV (with aqueous solutions and anionic methacrylate short chain polymer surfactant).

The carbon particle(s) described herein may comprise "fullerene-like" moieties. For more information about fullerene-like moieties, see, for example, "The Impact of a Fullerene-Like Concept in Carbon Black Science," Carbon, 2002, pages 157-162, which is entirely incorporated herein by reference. The systems and methods (and processes) described herein may allow fullerene-like moieties (also "surface active sites" herein) to be manufactured in one step from a hydrocarbon precursor (e.g., as compared to treating already manufactured carbon black). A one-step process may be as described herein (e.g., in relation to FIGS. 7 and 8). Examples of such fullerene-like moieties are provided, for example, in commonly assigned, Int. Pat. Pub. No. WO 2017/048621 ("CARBON BLACK FROM NATURAL GAS"), which is entirely incorporated herein by reference.

The carbon particle(s) of the present disclosure may have any combination of properties or characteristics described herein. The carbon particle(s) described herein may have, for example, the following attributes: very minimal large particles (e.g., with levels measured by the water wash grit test ASTM D1514 with 325 mesh grit) greater than 20 microns in size (e.g., no particles larger than 20-40 microns); low ash as measured by ASTM D1506 (e.g., less than 0.02% ash); of the impurities in the carbon particle(s), less than 5 ppm may be present for Fe, less than 200 ppb may be present for Cr and Ni, and Co, Zn and Sn may each be below 10 ppb; tote test ASTM D1618 may be greater than 99.8%; total extractable polycyclic aromatic hydrocarbons as measured by the "Determination of PAH Content of Carbon Black CFR 178.3297" procedure available from the FDA (the "22 PAH" procedure) may not exceed 1.0 ppm; the sulfur amount in the carbon particle(s) as measured by Leco process technique (e.g., as described elsewhere herein) may not exceed 50 ppm; moisture content as measured by ASTM D1509 may not exceed 0.3% (e.g., for candidate CA for Li-ion batteries); high conductivity (e.g., if high performance in batteries is desired); crystallinity ($L_c$) as measured by XRD greater than 4 nm (e.g., as greater crystallinity may aid in high cycle rate charge/discharge); the process described herein may provide 80-150 $m^2/g$ and/or 40-80 $m^2/g$ N2SA or STSA as measured by ASTM D6556 (e.g., the process described herein may provide both such N2SA or STSA ranges) (e.g., the process described herein may provide high-range (e.g., 80-150 $m^2/g$) and/or mid-range (e.g., 40-80 $m^2/g$) N2SA or STSA as measured by ASTM D6556 (e.g., the process described herein may provide both such high-range and mid-range N2SA or STSA)); structure of the carbon particles as measured by ASTM D2414 may be higher than 100 ml/100 grams or 150 ml/100 grams; or any combination thereof.

The particles of the present disclosure may be conductive. The particles may be used as conductive additives (CAs) and/or fillers. The purpose of a conducting additive and/or filler may be to provide a conductive path to and/or within a material. Any description of conductive additives or conductive agents herein may equally apply to conductive fillers at least in some configurations, and vice versa. Any description of particles or carbon particles herein may equally apply to conductive additives, conductive agents or conductive fillers at least in some configurations, and vice versa.

The particles may be used in energy storage devices such as, for example, lithium-ion batteries. An energy storage device (e.g., a battery) may comprise a conductive additive (e.g., conducting agent). The conducting agent may provide a conductive path to and/or between electroactive materials. The energy storage device (e.g., a battery) may comprise a positive electrode and a negative electrode. The positive electrode (also "cathode" herein) may be a cathode upon discharge. The negative electrode (also "anode" herein) may be an anode upon discharge. The electroactive materials may be materials that are capable of accepting and releasing ions (e.g., $Li^+$ ions) in and out of the host material upon charge and discharge (e.g., of the battery).

Existing carbon black species may be taken from the following types of amorphous, carbonaceous, nanoparticle domain subtypes: furnace black (e.g., brand names KETJENBLACK, VULCAN, LITX, etc.), acetylene black (e.g., brand name DENKA BLACK) and thermal black. The processes of the present disclosure may be used to overcome various shortcomings of the aforementioned processes (e.g., as described in greater detail elsewhere herein). The processes described herein may provide products with suitable properties/characteristics (e.g., in terms of values of N2SA, STSA, particle size, porosity, structure, etc.; suitable/adequate for a given application, such as, for example, for a battery application; low contamination and/or impurities, such as, for example, with the surface and bulk of the particles without high amounts of sulfur, oxygen, transition metal and/or refractory furnace (e.g., e.g., silica, alumina) impurities in the final product; suitable conductivity; and/or other suitable properties/characteristics), at a cost advantage, or any combination thereof.

Other conductive additives (e.g., for use in batteries) may be graphenes, single-wall(ed) nanotubes (SWNTs), multi-wall(ed) nanotubes (MWNTs), vapor grown carbon fibers (VGCFs), amongst many others. Disadvantages and/or limitations of such conductive additives may include, for example: for graphenes, unsuitable impurity levels and/or improper size dimensions; for carbon nanotubes, impurity levels are a concern; and for VGCF, the longest dimension is typically 100 microns which is typically too large. In an example, carbon nanotubes and graphene are very different from a resource perspective when compared to carbon black and are very difficult to purify at scale. The purification techniques can require dissolution of the offending transition metals into strong acids. In addition to the additional resources required, the complexity involved in performing the purification can result in off-specification nanocarbon which carries the risk of catastrophic failure in batteries (e.g., a catastrophic failure may be caused by off-specification amounts of transition metals in the batteries). Such disadvantages and/or limitations may be overcome with improved conductive additives that have a carbon-based inherent resistance to redox reactions and properties that enable high performance batteries (e.g., high performance Li-ion batteries).

A conductive additive of the present disclosure may be, for example, a conductive additive for the electrodes of Li-ion batteries. The conductive additive may comprise carbon particles with a high conductivity and high purity (e.g., in terms of low sulfur, low transition metals and low oxygen). In some examples, the carbon particles described herein may have anisotropic advantages of nanotubes and graphene but may be inherently higher purity than any carbon black that can be purchased and also more pure than purified carbon nanotubes and/or graphene without the added risk of the purification process, as described elsewhere herein. The carbon nanoparticles described herein may be more crystalline than typical carbon blacks and/or graphene/nanotubes. This may help with high charge/discharge rates (e.g., high charge/discharge C rates).

The conductive additive may be or comprise a carbon particle (e.g., a carbon nanoparticle). A conductive additive of the present disclosure may be implemented in an energy storage device (e.g., a battery) in mobile electronics, grid storage, personal computers, tablets, electric and electric/hybrid automobile vehicles, etc. A conductive additive of the present disclosure may be implemented in electrode bodies of various compositions (e.g., as described in greater detail elsewhere herein). While such electrode bodies may be described herein primarily in the context of Li-ion batteries, the conductive additives of the present disclosure may be used in other types of electrode bodies, such as, for example, electrode bodies of lithium sulfur, nickel metal hydride (NiMH), lead acid, nickel cadmium (NiCd) and/or other battery chemistries. The conductive additives of the present disclosure may be included in electrode bodies of Li-ion batteries and/or other electrode bodies described herein. A Li-ion battery, as used herein, may refer to primary and/or secondary lithium-based batteries (e.g., any battery in which $Li^+$ ions are accepted at the cathode upon discharge and/or released from the cathode upon charge).

An electrode body may refer to a layer of material that has been deposited on a current collector (e.g., aluminum or copper) wherein the layer of material may comprise (or consist of), for example, greater than about 70% electroactive material. The electrode body may not include a conductive layer (CL) that may (e.g., sometimes) be applied to the current collector (e.g., to the aluminum or copper current collector). The electrode body may be, for example, greater than or equal to about 1 micron (µm), 5 µm, 10 µm, 20 µm, 30 µm, 40 µm, 50 µm, 75 µm or 100 µm thick. Alternatively, or in addition, the electrode body may be, for example, less than or equal to about 150 µm, 100 µm, 75 µm, 50 µm, 40 µm, 30 µm, 20 µm, 10 µm or 5 µm thick. In some examples, the electrode body may be at least 10 µm thick. In some examples, the electrode body may be at least 30 µm thick. An electrode body may be an anode or a cathode.

An anode (e.g., of a Li-ion battery) may comprise, for example, an electroactive material, a binder and/or a conductive additive (CA). As described elsewhere herein, the electroactive material may be a material that is capable of accepting and releasing ions (e.g., Li$^+$ ions) in and out of the host material upon charge and discharge. For example, an anode of a Li-ion battery may comprise graphite, $Li_4Ti_5O_{12}$, Si, Si/graphite, Sn and/or other such materials that may be capable of accepting and releasing Li$^+$ ions. The conductive additives of the present disclosure may be used with a variety of shapes of the electroactive material (e.g., nanowires, sheets, composites of silicon (Si) and/or other forms). In an example, the anode material is graphite. In some examples, the anode may comprise lithium metal.

A cathode (e.g., of a Li-ion battery) may comprise, for example, an electroactive material, a binder and/or a CA (e.g., an electroactive material, a conductive additive and a binder). The general crystal frameworks of the electroactive cathode materials may be layered, spinel and/or olivine. The electroactive cathode materials may include, for example, oxides, phosphates, silicates and/or orthosilicates of lithium (Li) and one or more metals, such as, for example, cobalt (Co), manganese (Mn), nickel (Ni), aluminum (Al), magnesium (Mg), titanium (Ti), vanadium (V), chromium (Cr), zirconium (Zr), gallium (Ga) and/or iron (Fe) (e.g., wherein each such metal may be present at a suitable proportion). Non-limiting examples of electroactive cathode materials may include $LiFePO_4$, $LiMnPO_4$, $LiCoPO_4$, $LiNiPO_4$, $LiNiO_2$, $LiMnO_2$, $LiCoO_2$, $LiAlO_2$, $LiMgO_2$, $LiTiO_2$, $LiVO_2$, $LiCrO_2$, $LiFeO_2$, $LiZrO_2$, $LiGaO_2$, $LiSiO_2$, $LiNi2O_4$, $LiMn_2O_4$, $LiCo_2O_4$, $LiAl_2O_4$, $LiMg_2O_4$, $LiTi_2O_4$, $LiV_2O_4$, $Li_2MnO_3$ and $LiMn_2O_3$. Additionally, or alternatively, variations of these materials may be used. For example, $Li(Ni_{0.33}Co_{0.33}Mn_{0.33})O_2$, $LiNi_{0.5}Mn_{1.5}O_4$, and $LiNi_{0.8}Co_{0.15}Al_{0.05}$ may be used as electroactive cathode materials. Variations of the compounds described herein may include, for example, replacing a given metal element with another metal element (e.g., replacing Mn with Al) and/or changing a proportion (e.g., by mole) of one or more metal elements in a compound. The electroactive cathode materials may include binary and/or ternary species (e.g., metal oxide compounds) of the metals and compounds thereof (e.g., metals/metal oxides) described herein (e.g., a compound comprising Ni, Co and Mn). In some examples, the electroactive cathode materials may include lithium nickel cobalt aluminum oxide ("NCA") (e.g., $LiNiCoAlO_2$), lithium cobalt oxide ("LCO") (e.g., $LiCoO_2$), lithium manganese oxide ("LMO") (e.g., $LiMn_2O_4$), lithium nickel manganese cobalt oxide ("NMC") (e.g., $LiNiMnCoO_2$, $LiN_i{}_xMn_yCo_zO_2$), lithium iron phosphate ("LFP") (e.g., $LiFePO_4$), LTO (e.g., $Li_4Ti_5O_{12}$), or any combination thereof. It may be advantageous to mix several different cathode materials (e.g., several of the aforementioned electroactive cathode materials) to maximize performance. Cathodes may (e.g., also) comprise one or more (e.g., multiple) electroactive materials, one or more (e.g., multiple) CAs, one or more (e.g., multiple binders), etc. In an example, multiple conductive additives are used.

Binders (e.g., used in the anode and cathode of Li-ion batteries) may include, but are not limited to, poly(vinyldifluoroethylene) (PVDF), poly(vinyldifluoroethylene-co-hexafluoropropylene) (PVDF-HFP), poly(tetrafluoroethylene) (PTFE), polyimides, and water-soluble binders such as poly(ethylene)oxide, polyvinyl-alcohol (PVA), cellulose, carboxymethylcellulose (CMC), starch, hydroxypropylcellulose, regenerated cellulose, polyvinyl pyrrolidone (PVP), and copolymers and mixtures thereof. Other possible binders may include polyethylene, polypropylene, ethylene-propylene-diene terpolymer (EPDM), sulfonated EPDM, styrene-butadiene rubber (SBR), and fluoro rubber and copolymers and mixtures thereof.

In a wet method of deposition, the binder may be dissolved into a wet solvent (e.g., N-methylpyrrolidone (NMP) or water) and then carbon particles may be dispersed into the NMP/binder solution. The last step may be dispersion of the electroactive material, which may be quite facile due to the comparatively large particle size and relatively weak van der Waals forces holding the electroactive material agglomerates together. In this way, a paste may be made of the components of the final electrode body. The paste may then be deposited onto a current collector that may or may not have a conductive layer (CL) pre-applied to the top of the current collector via doctor blade or some other application process. The paste may then be dried and the layer may be compressed or calendared to, for example, about 10-20% porosity.

In a dry method of deposition, the dry powder may be mixed and then pressed onto the current collector surface. The dry mix may be hot pressed. The dry material may have some amount of liquid present to aid in moldability and cohesiveness; however this amount may not be greater than about 30-40% (otherwise, it may be deemed to be the wet method described elsewhere herein).

As previously described, there may also be a conductive layer (CL) deposited onto the current collector. This conductive layer may comprise binder and conductive nanoparticle(s). The conductive layer may reduce contact resistance between electrode body and current collector. The conductive layer may (e.g., further) increase adhesion to the current collector. The goal may be to eliminate direct contact of electroactive material to the current collector, which may result in poor adhesion and high contact resistance. The conductive layer may comprise one binder (e.g., polymer) and one CA, multiple binders (e.g., polymers) and multiple CAs, or any combination thereof (e.g., one binder (e.g., polymer) and multiple CAs, or multiple binders (e.g., polymers) and one CA). In an example, one polymer and one CA are utilized. The CL may be less than about 5 microns thick. The CL may be less than about 3 microns thick. The CL may comprise about 20-80% CA and about 20-80% binder. The binder/CA additive may be closer to about 50/50 by mass.

The cathode may be made in a similar fashion as the anode. The cathode may be made in a similar fashion as the anode with the exception that the cathode may be deposited onto an aluminum current collector (e.g., instead of a copper current collector). Cathodes may be more likely to incorporate a conductive layer on the surface of the current collector, between the electrode body and the current collector.

Advantages of energy storage devices (e.g., batteries) comprising the carbon particles (e.g., conductive additive) described herein may include, but are not limited to, increased or enhanced cycle life (e.g., number of cycles), increased or enhanced calendar life (e.g., shelf life), increased or enhanced capacity during charge and/or discharge (e.g., at high charge and/or discharge rates), increased or enhanced capacity after 500 charge/discharge cycles, and/or other improved or enhanced characteristics (e.g., compared to energy storage devices comprising existing carbon particles, such as, for example, existing carbon black).

High N2SA carbon additive may be advantageous when high charge/discharge rates are required for battery performance. Maximum charge/discharge rates for mobile electronics may be, for example, about 1 C to 3 C. Applications such as electric cars may have rates at 5 C, and higher rates may be desired (e.g., due to the intense duty cycle requirements of the automotive application). The conductive additive may (e.g., greatly) aid in providing electrical conductivity; however, the conductive additive may impede lithium (Li) ion mobility if too much CA is added to the electrode. For this reason, two different carbon particle CAs may be added to electrode formulations depending on the application. For example, mid-range N2SA (e.g., as described elsewhere herein) and high-range N2SA (e.g., as described elsewhere herein) carbon particles may be added (e.g., depending on duty requirements of the battery). It may therefore be desirable for a process to make both of these classes of conductive additives. If the application does not require high N2SA, the mid-range N2SA product may be used rather than the high (e.g., high-range) N2SA CA. In such cases, the mid-range N2SA product may be used rather than the high N2SA CA, for example, due to an increased cost of the high N2SA CA, and/or in cases where the high N2SA CA may cause decreased cycle and/or calendar life due to increased parasitic reactions and/or electrolyte consumption at the increased surface of the high N2SA CA. In some configurations, a combination of CAs with different surface areas may be used. For example, a combination of a mid-range N2SA product and a high N2SA CA may be used. A combination of CAs may comprise two or more (e.g., 2, 3, 4, 5 or more CAs). An individual CA may be present (e.g., in a mixture of two or more CAs) at a level of, for example, greater than or equal to about 1 ppb, 2 ppb, 5 ppb, 15 ppb, 50 ppb, 100 ppb, 0.5 ppm, 1 ppm, 5 ppm, 50 ppm, 100 ppm, 500 ppm, 0.1%, 0.5%, 1%, 2%, 5%, 10%, 15%, 20%, 25%, 30%, 40%, 50%, 60%, 70%, 80%, 90%, 95%, 99%, 99.5% or 99.9%. Alternatively, or in addition, the individual CA may be present (e.g., in a mixture of two or more CAs) at a level of, for example, less than or equal to about 100%, 99.9%, 99.5%, 99%, 95%, 90%, 80%, 70%, 60%, 50%, 40%, 30%, 25%, 20%, 15%, 10%, 5%, 2%, 1%, 0.5%, 0.1%, 500 ppm, 100 ppm, 50 ppm, 5 ppm, 1 ppm, 0.5 ppm, 100 ppb, 50 ppb, 15 ppb, 5 ppb or 2 ppb.

Energy storage devices (e.g., batteries) comprising the conductive additives of the present disclosure may have improved characteristics/performance. The conductive additives described herein may improve cycle life (e.g., number of cycles), improve calendar life (e.g., shelf life), enable increased capacity during charge and/or discharge (e.g., at high charge and/or discharge rates), enable increased capacity after 500 charge/discharge cycles, or any combination thereof. The conductive additives described herein may improve such characteristics as, for example, improve cycle life (e.g., number of cycles), improve calendar life (e.g., shelf life), increase capacity during charge and/or discharge (e.g., at high charge and/or discharge rates) and/or increase capacity after 500 charge/discharge cycles by, for example, at least about 0.1%, 0.5%, 1%, 2%, 3%, 4%, 5%, 10%, 15%, 20%, 25%, 30%, 40%, 50%, 60%, 70%, 80%, 90%, 95%, 99%, 100%, 125%, 150%, 175%, 200%, 225%, 250%, 275%, 300%, 350%, 400%, 450% or 500% (each) compared to existing carbon particles (e.g., existing carbon black). Charge rates and/or discharge rates (e.g., high charge and/or discharge rates) may be, for example, as described elsewhere herein.

Resistance (e.g., of the electrode body) may be measured with a 4 point probe. The resistance may be a surface resistance (e.g., of the electrode body). The electrode body (e.g., cathode) comprising the conductive additive(s) of the present disclosure may have a resistance (e.g., surface resistance) of, for example, less than or equal to about $10^{10}$ ohm-cm, $10^9$ ohm-cm, $10^8$ ohm-cm, $10^7$ ohm-cm, $10^6$ ohm-cm or $10^5$ ohm-cm. Alternatively, or in addition, the electrode body (e.g., cathode) comprising the conductive additive(s) of the present disclosure may have a resistance (e.g., surface resistance) of, for example, greater than or equal to about $10^4$ ohm-cm, $10^5$ ohm-cm, $10^6$ ohm-cm or $10^7$ ohm-cm. The electrode body may have such resistances, for example, at about 2 MPa, 5 MPa, 10 MPa, 15 MPa, 20 MPa, 25 MPa, 30 MPa, 35 MPa or 40 MPa (e.g., at 5 MPa). In some examples, the electrode body (e.g., cathode) may have a resistance (e.g., surface resistance) at 5 MPa that is less than $10^7$ ohm-cm.

Coin cell measurements may be performed with coin cells constructed utilizing Li metal as the counterelectrode and $Li(Ni_{0.33}Co_{0.33}Mn_{0.33})O_2$ as the cathode electroactive material. Formulations consisting of NMP, PVDF (1 wt %), conductive additive (1 wt %), and $Li(Ni_{0.33}Co_{0.33}Mn_{0.33})O_2$ (98%) may be prepared as a paste via the wet method and deposited onto an aluminum current collector. Electrode body may be calendared to 15% porosity and 30 micron thickness. $LiPF_6$ may be used as electrolyte and the separator may be a typical porous fiberglass separator used in the industry. After cycling through at low C rates several times, charge and discharge tests may be performed. Charging may be performed at 0.5 C and discharging may be performed at either 3 C or 5 C. Capacity retention at the respective C rates may be measured for the different electrode body formulations. Capacity retention of electrode bodies comprising the conductive additive(s) of the present disclosure may be, for example, greater than or equal to about 1 millampere hours/gram (mAh/g), 5 mAh/g, 15 mAh/g, 25 mAh/g, 50 mAh/g, 75 mAh/g, 100 mAh/g, 105 mAh/g, 110 mAh/g, 115 mAh/g, 120 mAh/g, 125 mAh/g, 130 mAh/g, 135 mAh/g, 140 mAh/g, 145 mAh/g, 150 mAh/g, 175 mAh/g, 200 mAh/g, 225 mAh/g, 250 mAh/g, 275 mAh/g, 300 mAh/g, 325 mAh/g, 350 mAh/g, 375 mAh/g, 400 mAh/g, 425 mAh/g, 450 mAh/g, 475 mAh/g or 500 mAh/g. The electrode body may have such capacity retentions, for example, at a charge rate of about 0.1 C, 0.5 C, 1 C, 2 C, 3 C, 4 C, 5 C, 6 C, 7 C, 8 C, 9 C, 10 C, 11 C, 12 C, 13 C, 14 C, 15 C, 16 C, 17 C, 18 C, 19 C, 20 C, 21 C, 22 C, 23 C, 24 C, 25 C, 26 C, 27 C, 28 C, 29 C or 30 C (e.g., at 0.5 C). The electrode body may have such capacity retentions, for example, at a discharge rate about 0.1 C, 0.5 C, 1 C, 2 C, 3 C, 4 C, 5 C, 6 C, 7 C, 8 C, 9 C, 10 C, 11 C, 12 C, 13 C, 14 C, 15 C, 16 C, 17 C, 18 C, 19 C, 20 C, 21 C, 22 C, 23 C, 24 C, 25 C, 26 C, 27 C, 28 C, 29 C or 30 C (e.g., at 3 C and/or at 5 C).

An electrode body may comprise an electroactive material and a conductive additive. The conductive additive may have a lattice constant ($L_c$) greater than about 3.0 nm and a statistical thickness surface area/nitrogen surface area (STSA/N2SA) ratio from about 1.01 to about 1.4. The STSA/N2SA ratio may be from about 1.01 to about 1.35. The electrode body may further comprise a binder. The electrode body may be further assembled into a battery. The battery may be a lithium-ion, lithium sulfur, nickel metal hydride (NiMH), lead acid or nickel cadmium (NiCd) battery. The lithium-ion battery may be a primary or secondary battery. The electrode body may be at least about 10 microns thick. The electrode body may be at least about 30 microns thick. The conductive additive may have a statistical thickness surface area/electron microscope surface area (STSA/EMSA) ratio greater than or equal to about 1.3. The STSA/EMSA ratio may be greater than or equal to about 1.4. A Z average particle size of the conductive additive as measured by dynamic light scattering (DLS) may be at least about 30% greater than a value predicted based on the equation $D_a=(2540+71<DBP>)/S$, where $D_a$ is maximum aggregate diameter in nanometers, S is STSA in $m^2/g$, and $<DBP>$ is equal to the volume of dibutylphthalate in ml/100 g in accordance with standard test procedure ASTM D2414. A percent free space of at least about 5% of a total number of particles of the conductive additive may be about 90% or greater based on number count. The conductive additive may have a nitrogen surface area (N2SA) that is between about 30 $m^2/g$ and 400 $m^2/g$. The N2SA may be between about 40 $m^2/g$ and 80 $m^2/g$. The N2SA may be between about 80 $m^2/g$ and 150 $m^2/g$. The conductive additive may have a structure that is greater than about 100 ml/100 grams. Total extractable PAHs of the conductive additive may be less than about 1 ppm. The conductive additive may have a tote greater than about 99.8%. The conductive additive may have a total sulfur content of less than about 50 ppm. The conductive additive may have an oxygen content of less than or equal to about 0.4% oxygen by weight. The conductive additive may have a hydrogen content of less than about 0.4% hydrogen by weight. The conductive additive may have a carbon content of greater than or equal to about 99% carbon by weight. The conductive additive may have a total ash content of less than or equal to about 1%. The total ash content may be less than about 0.02%. Less than or equal to about 90% of the ash content may be metal impurities of Fe, Ni and/or Co. The conductive additive may comprise less than about 5 ppm Fe, less than about 200 ppb Cr, less than about 200 ppb Ni, less than about 10 ppb Co, less than about 10 ppb Zn, less than about 10 ppb Sn, or any combination thereof. The conductive additive may have a moisture content of less than or equal to about 0.3% by weight. The conductive additive may have an affinity to adsorb water from an 80% relative humidity atmosphere of less than about 0.5 ml (milliliter) of water per square meter of surface area of the conductive additive. The affinity to adsorb water from an 80% relative humidity atmosphere may be less than about 0.05 ml of water per square meter of surface area of the conductive additive. The conductive additive may have a water spreading pressure (WSP) between about 0 and about 8 $mJ/m^2$. The WSP may be less than about 5 $mJ/m^2$. The conductive additive may have a total surface acid group content of less than or equal to about 0.5 $\mu mol/m^2$. The conductive additive may comprise substantially no particles larger than about (i) 20 microns, (ii) 30 microns or (iii) 40 microns. The conductive additive may have a boron concentration that is between about 0.05% and 7% on a solids weight basis. The conductive additive may be made in a once-through process. The conductive additive may be prepared from a hydrocarbon. The hydrocarbon may be natural gas. The electrode body may have a resistance at 5 megapascals (MPa) that is less than about $10^7$ ohm-centimeters (ohm-cm). A volume resistivity of the conductive additive may be less than about 0.3 ohm-cm at 2 MPa. An energy storage device comprising the electrode body may have (i) enhanced cycle life, (ii) enhanced calendar life, (iii) enhanced capacity during charge and/or discharge and/or (iv) enhanced capacity after 500 charge/discharge cycles compared to an energy storage device comprising existing carbon particles. The cycle life, the calendar life, the capacity during charge and/or discharge and/or the capacity after 500 charge/discharge cycles may each be at least about 1% greater compared to the energy storage device comprising existing carbon particles.

A conductive layer may comprise a binder and a conductive additive. The conductive additive may have a lattice constant ($L_c$) greater than about 3.0 nm and a statistical thickness surface area/nitrogen surface area (STSA/N2SA) ratio from about 1.01 to about 1.4. The STSA/N2SA ratio may be from about 1.01 to about 1.35. The conductive additive may have a surface area/electron microscope surface area (STSA/EMSA) ratio greater than or equal to about 1.3. The STSA/EMSA ratio may be greater than or equal to about 1.4. A Z average particle size of the conductive additive as measured by dynamic light scattering (DLS) may be at least about 30% greater than a value predicted based on the equation $D_a=(2540+71<DBP>)/S$, where $D_a$ is maximum aggregate diameter in nanometers, S is STSA in $m^2/g$, and $<DBP>$ is equal to the volume of dibutylphthalate in ml/100 g in accordance with standard test procedure ASTM D2414. A percent free space of at least about 5% of a total number of particles of the conductive additive may be about 90% or greater based on number count. The conductive additive may have a nitrogen surface area (N2SA) that is between about 30 $m^2/g$ and 400 $m^2/g$. The N2SA may be between about 40 $m^2/g$ and 80 $m^2/g$. The N2SA may be between about 80 $m^2/g$ and 150 $m^2/g$. The conductive additive may have a structure that is greater than about 100 ml/100 grams. Total extractable PAHs of the conductive additive may be less than about 1 ppm. The conductive additive may have a tote greater than about 99.8%. The conductive additive may have a total sulfur content of less than about 50 ppm. The conductive additive may have an oxygen content of less than or equal to about 0.4% oxygen by weight. The conductive additive may have a hydrogen content of less than about 0.4% hydrogen by weight. The conductive additive may have a carbon content of greater than or equal to about 99% carbon by weight. The conductive additive may have a total ash content of less than or equal to about 1%. The total ash content may be less than about 0.02%. Less than or equal to about 90% of the ash content may be metal impurities of Fe, Ni and/or Co. The conductive additive may comprise less than about 5 ppm Fe, less than about 200 ppb Cr, less than about 200 ppb Ni, less than about 10 ppb Co, less than about 10 ppb Zn, less than about 10 ppb Sn, or any combination thereof. The conductive additive may have a moisture content of less than or equal to about 0.3% by weight. The conductive additive may have an affinity to adsorb water from an 80% relative humidity atmosphere of less than about 0.5 ml (milliliter) of water per square meter of surface area of the conductive additive. The affinity to adsorb water from an 80% relative humidity atmosphere may be less than about 0.05 ml of water per square meter of surface area of the conductive additive. The conductive additive may have a water spreading pressure (WSP) between about 0 and about 8 $mJ/m^2$. The WSP may be less than about 5 $mJ/m^2$. The conductive additive may have a total surface acid group content of less than or equal to about 0.5 $\mu mol/m^2$. The conductive additive may comprise substantially no particles larger than about (i) 20 microns, (ii) 30 microns or (iii) 40 microns. The conductive additive may have a boron concentration that is between about 0.05% and 7% on a solids weight basis. The conductive additive may be made in a once-through process. The conductive additive may be prepared from a hydrocarbon. The hydrocarbon may be natural gas. A volume resistivity of the conductive additive may be less than about 0.3 ohm-centimeter (ohm-cm) at 2 megapascals (MPa). An energy storage device comprising the conductive layer may have (i) enhanced cycle life, (ii) enhanced calendar life, (iii) enhanced capacity during charge and/or discharge and/or (iv) enhanced capacity after 500 charge/discharge cycles compared to an energy storage device comprising existing carbon particles. The cycle life, the calendar life, the capacity during charge and/or discharge and/or the capacity after 500 charge/discharge cycles may each be at least about 1% greater compared to the energy storage device comprising existing carbon particles. A battery comprising the conductive layer may be a lithium-ion, lithium sulfur, nickel metal hydride (NiMH), lead acid or nickel cadmium (NiCd) battery.

A conductive filler may comprise particles with a surface area/electron microscope surface area (STSA/EMSA) ratio greater than or equal to about 1.3. The STSA/EMSA ratio may be greater than or equal to about 1.4. The particles may be carbon particles. The particles may have a lattice constant ($L_c$) greater than about 3.0 nm and a statistical thickness surface area/nitrogen surface area (STSA/N2SA) ratio from about 1.01 to about 1.4. The STSA/N2SA ratio may be from about 1.01 to about 1.35. A Z average particle size of the particles as measured by dynamic light scattering (DLS) may be at least about 30% greater than a value predicted based on the equation $D_a=(2540+71<DBP>)/S$, where $D_a$ is maximum aggregate diameter in nanometers, S is STSA in $m^2/g$, and $<DBP>$ is equal to the volume of dibutylphthalate in ml/100 g in accordance with standard test procedure ASTM D2414. A percent free space of at least about 5% of a total number of particles of the conductive filler may be about 90% or greater based on number count. The particles may have a nitrogen surface area (N2SA) that is between about 30 $m^2/g$ and 400 $m^2/g$. The N2SA may be between about 40 $m^2/g$ and 80 $m^2/g$. The N2SA may be between about 80 $m^2/g$ and 150 $m^2/g$. The particles may have a structure that is greater than about 100 ml/100 grams. Total extractable PAHs of the particles may be less than about 1 ppm. The particles may have a tote greater than about 99.8%. The particles may have a total sulfur content of less than about 50 ppm. The particles may have an oxygen content of less than or equal to about 0.4% oxygen by weight. The particles may have a hydrogen content of less than about 0.4% hydrogen by weight. The particles may have a carbon content of greater than or equal to about 99% carbon by weight. The particles may have a total ash content of less than or equal to about 1%. The total ash content may be less than about 0.02%. Less than or equal to about 90% of the ash content may be metal impurities of Fe, Ni and/or Co. The conductive filler may comprise less than about 5 ppm Fe, less than about 200 ppb Cr, less than about 200 ppb Ni, less than about 10 ppb Co, less than about 10 ppb Zn, less than about 10 ppb Sn, or any combination thereof. The particles may have a moisture content of less than or equal to about 0.3% by weight. The particles may have an affinity to adsorb water from an 80% relative humidity atmosphere of less than about 0.5 ml (milliliter) of water per square meter of surface area of the particles. The affinity to adsorb water from an 80% relative humidity atmosphere may be less than about 0.05 ml of water per square meter of surface area of the particles. The particles may have a water spreading pressure (WSP) between about 0 and about 8 $mJ/m^2$. The WSP may be less than about 5 $mJ/m^2$. The particles may have a total surface acid group content of less than or equal to about 0.5 $\mu mol/m^2$. The conductive filler may comprise substantially no particles larger than about (i) 20 microns, (ii) 30 microns or (iii) 40 microns. The particles may have a boron concentration that is between about 0.05% and 7% on a solids weight basis. The particles may be made in a once-through process. The particles may be prepared from a hydrocarbon. The hydrocarbon may be natural gas. A volume resistivity of the particles may be less than about 0.3 ohm-centimeter (ohm-cm) at 2 megapascals (MPa). An elastomer may comprise the conductive filler. A polymer may comprise the conductive filler. A coating may comprise the conductive filler. An ink may comprise the conductive filler. A grease may comprise the conductive filler. An adhesive may comprise the conductive filler. A tape may comprise the conductive filler. An electromagnetic interference gasket or seal may comprise the conductive filler. A sealant may comprise the conductive filler.

A carbon particle may have a surface area/electron microscope surface area (STSA/EMSA) ratio greater than or equal to about 1.3 (e.g., as described in greater detail elsewhere herein). An electrode of an energy storage device may comprise the carbon particle. A plurality of the carbon particles may be provided (e.g., as described in greater detail elsewhere herein). An energy storage device comprising the plurality of the carbon particles may have (i) enhanced cycle life, (ii) enhanced calendar life, (iii) enhanced capacity during charge and/or discharge and/or (iv) enhanced capacity after 500 charge/discharge cycles compared to an energy storage device comprising existing carbon particles. The cycle life, the calendar life, the capacity during charge and/or discharge and/or the capacity after 500 charge/discharge cycles may each be at least about 1% greater compared to the energy storage device comprising existing carbon particles. A battery comprising the plurality of the carbon particles may be a lithium-ion, lithium sulfur, nickel metal hydride (NiMH), lead acid or nickel cadmium (NiCd) battery.

The systems (e.g., apparatuses) and methods of the present disclosure, and processes implemented with the aid of the systems and methods herein, may allow continuous production of carbon particles. The process may include converting a carbon-containing feedstock. The systems and methods described herein may enable continuous operation and production of high quality carbon particles. The carbon particles may be made (e.g., in a one-step process) by adding a hydrocarbon to a heated gas to produce the carbon particles (e.g., carbon nanoparticles). The hydrocarbon may be mixed with the hot gas to effect removal of hydrogen from the hydrocarbon. In some examples, the carbon particles (e.g., carbon nanoparticles) may be made by (e.g., in a one-step process comprising) adding the hydrocarbon to the heated gas to produce carbon particles (e.g., carbon nanoparticles) that have one or more properties as described in greater detail elsewhere herein. The systems and methods described herein may meet the power (e.g., sufficient unit power to their basic components), corrosion resistance (e.g., reduced or no decay of these components when exposed to, for example, hydrogen plasma), and continuous operation requirements to produce carbon particles.

The process may include heating a thermal transfer gas (e.g., a plasma gas) with electrical energy (e.g., from a DC or AC source). The thermal transfer gas may be heated by an electric arc. The thermal transfer gas may be heated by Joule heating (e.g., resistive heating, induction heating, or a combination thereof). The thermal transfer gas may be heated by Joule heating and by an electric arc (e.g., downstream of the Joule heating). The thermal transfer gas may be pre-heated prior to the heating (e.g., pre-heated by heat exchange). See, for example, commonly assigned, Int. Pat. Publication No. WO 2017/034980 ("HIGH TEMPERATURE HEAT INTEGRATION METHOD OF MAKING CARBON BLACK"), which is entirely incorporated herein by reference. The hydrocarbon feedstock may be pre-heated (e.g., from a temperature of about 25° C.) to a temperature from about 100° C. to about 800° C. before coming into contact with the (e.g., heated) thermal transfer gas (e.g., pre-heated by heat exchange, by Joule heating, or a combination thereof). The hydrocarbon feedstock may be diluted (e.g., as described elsewhere herein) prior to reaching temperatures where reactions may be initiated (e.g., before coming into contact with the heated thermal transfer gas, such as, for example, before, during and/or after injection, before, during and/or after pre-heating, or any combination thereof). Such dilution may be used to control surface area, morphology and/or structure of the carbon particles. The process may further include mixing injected feedstock with the heated thermal transfer gas (e.g., plasma gas) to achieve suitable reaction conditions. The reaction zone may not immediately come into contact with any contact surfaces. One or more additional material streams may be provided to the process (e.g., provided to a reactor through injection with or into the thermal transfer gas upstream of the reaction zone, injection with or into the feedstock steam, injection into a mixture of the thermal transfer gas and the feedstock, such as, for example, injection into the reaction zone, injection upstream, in the same plane or downstream of, or adjacent to, feedstock injection, etc.). The one or more additional material streams may comprise one or more suitable compounds (e.g., in a vaporized state; in a molten state; dissolved in water, an organic solvent (e.g., liquid feedstock, ethylene glycol, diethylene glycol, propylene glycol, diethyl ether or other similar ethers, or other suitable organic solvents) or a mixture thereof; etc.). For example, structure (e.g., DBP) may be at least in part controlled with the aid of a suitable ionic compound, such as, for example, an alkali metal salt (e.g., acetate, adipate, ascorbate, benzoate, bicarbonate, carbonate, citrate, dehydroacetate, erythorbate, ethyl para-hydroxybenzoate, formate, fumarate, gluconate, hydrogen acetate, hydroxide, lactate, malate, methyl para-hydroxybenzoate, orthophenyl phenol, propionate, propyl para-hydroxybenzoate, sorbate, succinate or tartrate salts of sodium, potassium, rubidium or caesium). Such compound(s) may be added at a suitable level with respect to (or in relation to) the feedstock and/or thermal transfer gas (e.g., the compound(s) may be added at a ratio or concentration between about 0 ppm and 2 ppm, 0 ppm and 5 ppm, 0 ppm and 10 ppm, 0 ppm and 20 ppm, 0 ppm and 50 ppm, 0 ppm and 100 ppm, 0 ppm and 200 ppm, 0 ppm and 500 ppm, 0 ppm and 1000 ppm, 0 ppm and 2000 ppm, 0 ppm and 5000 ppm, 0 ppm and 1%, 5 ppm and 50 ppm, 10 ppm and 100 ppm, 20 ppm and 100 ppm, 100 ppm and 200 ppm, 100 ppm and 500 ppm, 200 ppm and 500 ppm, 10 ppm and 2000 ppm, 100 ppm and 5000 ppm, 1000 and 2000 ppm, 2000 ppm and 5000 ppm, 2000 ppm and 1%, or 5000 ppm and 1% (e.g., of the cation) on a molar or mass basis with respect to, for example, the feedstock flow rate and/or the thermal gas flow rate, or with respect to the amount of carbon added with the feedstock). An additional material stream may be pre-heated. The products of reaction may be cooled, and the carbon particles or carbon-containing compounds may be separated from the other reaction products. The as-produced hydrogen may be recycled back into the reactor. See, for example, Int. Pat. Pub. No. WO 2017/034980 ("HIGH TEMPERATURE HEAT INTEGRATION METHOD OF MAKING CARBON BLACK"), which is entirely incorporated herein by reference.

The thermal transfer gas may in some instances be heated in an oxygen-free environment. The carbon particles may in some instances be produced (e.g., manufactured) in an oxygen-free atmosphere. An oxygen-free atmosphere may comprise, for example, less than about 5% oxygen by volume, less than about 3% oxygen (e.g., by volume), or less than about 1% oxygen (e.g., by volume). The carbon particles of the present disclosure may in some instances be manufactured (e.g., on a commercial scale) via a substantially oxygen-free process. A substantially oxygen-free process may comprise, for example, less than about 5% oxygen (by volume), or less than about 3% oxygen (e.g., by volume).

The thermal transfer gas may comprise at least about 60% hydrogen up to about 100% hydrogen (by volume) and may further comprise up to about 30% nitrogen, up to about 30% CO, up to about 30% $CH_4$, up to about 10% HCN, up to about 30% $C_2H_2$, and up to about 30% Ar. For example, the thermal transfer gas may be greater than about 60% hydrogen. Additionally, the thermal transfer gas may also comprise polycyclic aromatic hydrocarbons such as anthracene, naphthalene, coronene, pyrene, chrysene, fluorene, and the like. In addition, the thermal transfer gas may have benzene and toluene or similar monoaromatic hydrocarbon components present. For example, the thermal transfer gas may comprise greater than or equal to about 90% hydrogen, and about 0.2% nitrogen, about 1.0% CO, about 1.1% $CH_4$, about 0.1% HCN and about 0.1% $C_2H_2$. The thermal transfer gas may comprise greater than or equal to about 80% hydrogen and the remainder may comprise some mixture of the aforementioned gases, polycyclic aromatic hydrocarbons, monoaromatic hydrocarbons and other components. Thermal transfer gas such as oxygen, nitrogen, argon, helium, air, hydrogen, carbon monoxide, hydrocarbon (e.g., methane, ethane, unsaturated) etc. (used alone or in mixtures of two or more) may be used. The thermal transfer gas may comprise greater than or equal to about 50% hydrogen by volume. The thermal transfer gas may comprise, for example, oxygen, nitrogen, argon, helium, air, hydrogen, hydrocarbon (e.g. methane, ethane) etc. (used alone or in mixtures of two or more). The thermal transfer gas may comprise greater than about 70% $H_2$ by volume and may include at least one or more of the gases HCN, $CH_4$, $C_2H_4$, $C_2H_2$, CO, benzene or polyaromatic hydrocarbon (e.g., naphthalene and/or anthracene) at a level of at least about 1 ppm. The polyaromatic hydrocarbon may comprise, for example, naphthalene, anthracene and/or their derivatives. The polyaromatic hydrocarbon may comprise, for example, methyl naphthalene and/or methyl anthracene. The thermal transfer gas may comprise a given thermal transfer gas (e.g., among the aforementioned thermal transfer gases) at a concentration (e.g., in a mixture of thermal transfer gases) greater than or equal to about 1 ppm, 5 ppm, 10 ppm, 25 ppm, 50 ppm, 0.01%, 0.05%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.5%, 3%, 3.5%, 4%, 4.5%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 55%, 60%, 65%, 70%, 75%, 80%, 85%, 90%, 95% or 99% by weight, volume or mole. Alternatively, or in addition, the thermal transfer gas may comprise the given thermal transfer gas at a concentration (e.g., in a mixture of thermal transfer gases) less than or equal to about 100% 99%, 95%, 90%, 85%, 80%, 75%, 70%, 65%, 60%, 55%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4,5%, 4%, 3.5%, 3%, 2.5%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, 0.05%, 0.01%, 50 ppm, 25 ppm, 10 ppm, 5 ppm or 1 ppm by weight, volume or mole. The thermal transfer gas may comprise additional thermal transfer gases (e.g., in a mixture of thermal transfer gases) at similar or different concentrations. Such additional thermal transfer gases may be selected, for example, among the aforementioned thermal transfer gases not selected as the given thermal transfer gas. The given thermal transfer gas may itself comprise a mixture. The thermal transfer gas may have at least a subset of such compositions before, during and/or after heating.

The hydrocarbon feedstock may include any chemical with formula $C_nH_x$ or $C_nH_xO_y$, where n is an integer; x is between (i) 1 and 2n+2 or (ii) less than 1 for fuels such as coal, coal tar, pyrolysis fuel oils, and the like; and y is between 0 and n. The hydrocarbon feedstock may include, for example, simple hydrocarbons (e.g., methane, ethane, propane, butane, etc.), aromatic feedstocks (e.g., benzene, toluene, xylene, methyl naphthalene, pyrolysis fuel oil, coal tar, coal, heavy oil, oil, bio-oil, bio-diesel, other biologically derived hydrocarbons, and the like), unsaturated hydrocarbons (e.g., ethylene, acetylene, butadiene, styrene, and the like), oxygenated hydrocarbons (e.g., ethanol, methanol, propanol, phenol, ketones, ethers, esters, and the like), or any combination thereof. These examples are provided as non-limiting examples of acceptable hydrocarbon feedstocks which may further be combined and/or mixed with other components for manufacture. A hydrocarbon feedstock may refer to a feedstock in which the majority of the feedstock (e.g., more than about 50% by weight) is hydrocarbon in nature. The reactive hydrocarbon feedstock may comprise at least about 70% by weight methane, ethane, propane or mixtures thereof. The hydrocarbon feedstock may comprise or be natural gas. The hydrocarbon may comprise or be methane, ethane, propane or mixtures thereof. The hydrocarbon may comprise methane, ethane, propane, butane, acetylene, ethylene, carbon black oil, coal tar, crude coal tar, diesel oil, benzene and/or methyl naphthalene. The hydrocarbon may comprise (e.g., additional) polycyclic aromatic hydrocarbons. The hydrocarbon feedstock may comprise one or more simple hydrocarbons, one or more aromatic feedstocks, one or more unsaturated hydrocarbons, one or more oxygenated hydrocarbons, or any combination thereof. The hydrocarbon feedstock may comprise, for example, methane, ethane, propane, butane, pentane, natural gas, benzene, toluene, xylene, ethylbenzene, naphthalene, methyl naphthalene, dimethyl naphthalene, anthracene, methyl anthracene, other monocyclic or polycyclic aromatic hydrocarbons, carbon black oil, diesel oil, pyrolysis fuel oil, coal tar, crude coal tar, coal, heavy oil, oil, bio-oil, bio-diesel, other biologically derived hydrocarbons, ethylene, acetylene, propylene, butadiene, styrene, ethanol, methanol, propanol, phenol, one or more ketones, one or more ethers, one or more esters, one or more aldehydes, or any combination thereof. The feedstock may comprise one or more derivatives of feedstock compounds described herein, such as, for example, benzene and/or its derivative(s), naphthalene and/or its derivative(s), anthracene and/or its derivative(s), etc. The hydrocarbon feedstock (also "feedstock" herein) may comprise a given feedstock (e.g., among the aforementioned feedstocks) at a concentration (e.g., in a mixture of feedstocks) greater than or equal to about 1 ppm, 5 ppm, 10 ppm, 25 ppm, 50 ppm, 0.01%, 0.05%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.5%, 3%, 3.5%, 4%, 4.5%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 55%, 60%, 65%, 70%, 75%, 80%, 85%, 90%, 95% or 99% by weight, volume or mole. Alternatively, or in addition, the feedstock may comprise the given feedstock at a concentration (e.g., in a mixture of feedstocks) less than or equal to about 100% 99%, 95%, 90%, 85%, 80%, 75%, 70%, 65%, 60%, 55%, 50%, 49%, 48%, 47%, 46%, 45%, 44%, 43%, 42%, 41%, 40%, 39%, 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4,5%, 4%, 3.5%, 3%, 2.5%, 2%, 1.9%, 1.8%, 1.7%, 1.6%, 1.5%, 1.4%, 1.3%, 1.2%, 1.1%, 1%, 0.9%, 0.8%, 0.7%, 0.6%, 0.5%, 0.4%, 0.3%, 0.2%, 0.1%, 0.05%, 0.01%, 50 ppm, 25 ppm, 10 ppm, 5 ppm or 1 ppm by weight, volume or mole. The feedstock may comprise additional feedstocks (e.g., in a mixture of feedstocks) at similar or different concentrations. Such additional feedstocks may be selected, for example, among the aforementioned feedstocks not selected as the given feedstock. The given feedstock may itself comprise a mixture (e.g., such as natural gas).

The injected hydrocarbon may be cracked such that at least about 80% by moles of the hydrogen originally chemically attached through covalent bonds to the hydrocarbon may be homoatomically bonded as diatomic hydrogen. Homoatomically bonded may refer to the bond being between two atoms that are the same (e.g., as in diatomic hydrogen or $H_2$). C—H may be a heteroatomic bond. A hydrocarbon may go from heteroatomically bonded C—H to homoatomically bonded H—H and C—C. While the $H_2$ from the plasma may still be present, this may just refer to the $H_2$ from the $CH_4$ or other hydrocarbon feedstock.

A system (e.g., an enclosed particle generating system) of the present disclosure may comprise a thermal generation section. In some implementations, the thermal generation section may be a plasma generating section containing one or more sets of plasma generating electrodes. The thermal generation section may be connected to a reactor section containing hydrocarbon injectors. In some implementations, the hydrocarbon injectors may be, for example, either at the point of maximum reactor size reduction or further downstream from the plasma generating electrodes. The term reactor, as used herein, may refer to an apparatus (e.g., a larger apparatus comprising a reactor section), or to the reactor section only. The reactor may be configured (e.g., as described elsewhere herein, such as, for example, in relation to FIG. 3) to allow the flow (e.g., at least a portion of the flow or the total flow before, during and/or after injection; at least a portion of or all of the flow during thermal generation, injection and/or reaction; at least a portion or all of the flow of the thermal transfer gas; etc.) in at least a portion of the reactor (e.g., in one or more portions described in relation to FIGS. 3, 4, 5 and 6, such as, for example, in one or more portions configured to implement thermal generation, injection and/or reaction, such as, for example, in a constant diameter region/section, converging region/section, diverging region/section, insert or other additional component, throat, narrowing, or any combination thereof) to be axial (e.g., substantially axial), radial (e.g., substantially radial), or a combination thereof. The system may (e.g., additionally) comprise, for example, one or more of a heat exchanger connected to the reactor, a filter connected to the heat exchanger, a degas apparatus connected to the filter, a pelletizer connected to the degas apparatus, a binder mixing tank connected to the pelletizer, and a dryer connected to the pelletizer. For example, one or more heat exchangers, filters, degas chambers and/or back end equipment (e.g., one or more of a pelletizer, a binder mixing tank connected to the pelletizer, and/or a dryer connected to the pelletizer) may be used. As described elsewhere herein, a "reactor" may refer to an apparatus (e.g., a larger apparatus comprising a reactor section), or to the reactor section only.

The systems described herein may comprise plasma generators. The plasma generators may utilize a gas or gaseous mixture (e.g., at least 50% by volume gaseous). The plasma generators may utilize a gas or gaseous mixture (e.g., at least 50% by volume gaseous) where the gas is reactive and corrosive in the plasma state. The plasma gas may be, for example, at least 50% by volume hydrogen. The systems described herein may comprise plasma generators energized by a DC or AC source. The hydrogen gas mixture may be supplied directly into a zone in which an electric discharge produced by a DC or AC source is sustained. The plasma may have a composition as described elsewhere herein (e.g., in relation to composition of the thermal transfer gas). The plasma may be generated using arc heating. The plasma may be generated using inductive heating.

The system (e.g., the enclosed particle generating system) may be configured to implement a method of making carbon particles. The method may comprise thermal generation and injection of hydrocarbon. The method may comprise, for example, generating a plasma (e.g., comprising at least about 60% by volume hydrogen) with plasma generating electrodes (e.g., in the reactor), and injecting hydrocarbon (e.g., as described elsewhere herein) to form the carbon particles. In some implementations, the method may comprise generating a plasma (e.g., comprising at least about 60% by volume hydrogen) with plasma generating electrodes (e.g., in the reactor), reducing the interior dimension of the reactor (e.g., as described elsewhere herein), and injecting hydrocarbon (e.g., as described elsewhere herein) to form the carbon particles. The hydrocarbon may be subjected to at least about 1,000° C. but no more than about 3,500° C. in the reactor (e.g., by the heat generated from the plasma). The plasma temperature may be adjusted to tailor the size of primary particles.

The electrodes (e.g., their surfaces exposed to the electric arc (also "arc-spots" herein)) may be in the most intense heating environment. Destruction of the electrodes at their surface may lead to erosion which may reduce the service life of the electrodes. The electrode erosion may be heaviest in plasma generators operating in the presence of chemically active elements such as hydrogen or oxygen. The life of the electrodes may be elongated by, for example, minimizing the thermal effect of the electric arc on the electrodes and/or through adequate protection of the electrode surface against the erosive medium. An electromagnetic field may be applied to reduce the effects of the arc spots by moving the arc spots rapidly over the electrode surface, whereby the mean thermal flux may be reduced in density to the areas of contact between the electrodes and electric arc. The magnetic field may push the plasma outside of the confines of the immediate space between the two electrodes. This means that the erosive medium (e.g., superheated $H_2$ and hydrogen radicals) may be largely separated from the electrode itself. A rotating arc discharge created through the application of a magnetic field to the electrodes may be used (e.g., additionally). The magnetic field may be, for example, from about 20 millitesla (mT) to about 100 mT (e.g., measured at the tip of the torch, radially (around the circumference of the torch) and/or axially (along the axis of the electrodes) at the annulus of the electrodes). The electrode erosion may be controlled through distribution of the current of the main arc discharge among several discharges, whereby the thermal effect on each one of the parallel-connected electrodes of the electrode assembly, for example the anode, may be mitigated. See, for example, U.S. Pat. No. 2,951,143 ("ARC TORCH") and U.S. Pat. No. 3,344,051 ("METHOD FOR THE PRODUCTION OF CARBON BLACK IN A HIGH INTENSITY ARC"), each of which is entirely incorporated herein by reference. The plasma may be generated using AC electrodes. A plurality (e.g., 3 or more) of AC electrodes may be used (e.g., with the advantage of more efficient energy consumption as well as reduced heat load at the electrode surface).

The electrodes may be consumed at a given rate. For example, more than about 70 tons of carbon particles may be produced per cubic meter of electrode consumed. A ratio of the surface areas of inner and outer electrode may stay constant during plasma generation (e.g., during degradation). In some implementations, the electrodes may be concentrically arranged. The electrodes used to generate the plasma may in some cases become part of the product nanoparticle (e.g., graphite electrodes may become fullerene nanoparticles in the process). The decomposition of the electrodes may be limited as described in greater detail elsewhere herein.

Downstream of the thermal generation (e.g., plasma generation), the thermal activation chamber (e.g., plasma chamber) may in some cases narrow or converge to a conical or square/slot edge and then may optionally straighten before diverging into the reactor. A throat may separate the thermal activation section (e.g., thermal activation chamber) and the reactor section, and/or accelerate the thermal transfer gas so that more intense mixing can take place in a smaller region. The throat may be defined as the narrowest section between the thermal activation section and the reactor section. The length of the throat may be several meters or as small as about 0.5 to about 2 millimeters. The narrowest point of the throat may be defined as the narrowest diameter of the throat. Any cross-section that is within about 10% of the narrowest cross-section may be deemed to be within the scope of the throat. One diameter may be defined as the diameter of the throat at the narrowest point of the throat. Hydrocarbon injection points into the reactor may be positioned, for example, from about 5 diameters upstream of the throat to about 5 diameters downstream of the throat. In some examples, the injection may occur within about +/−2 diameters or about +/−1 diameter of the throat. An injection point of hydrocarbon feedstock may be, for example, downstream of the narrowest point of the throat and toward the onset of the divergence into the reactor. The throat may be a nozzle. The thermal transfer gas (e.g., plasma gas) may be accelerated through the nozzle. A diameter of the nozzle may narrow in the direction (of flow) of the thermal transfer gas (e.g., plasma gas). The desired amount of narrowing (e.g., the diameter of the throat) may be determined based on, for example, recirculation of hydrocarbons and solid carbon particles back into the plasma chamber, optimal mixing, view factor, or any combination thereof. The reduction may be determined based on a balance between minimal recirculation, maximal mixing and increased view factor. The interior dimension of the reactor section may be reduced (e.g., the diameter of the process may be reduced at the throat) by, for example, greater than or equal to about (e.g., at least about) 10%, 20%, 30% or 40% downstream from the thermal generator (e.g., from the plasma generating electrodes). Different carbon particles may require a fine tuning of this parameter in order to target surface area, structure and/or surface chemistry properties, while at the same time minimizing unreacted polycyclic aromatic hydrocarbons (PAHs) and minimizing large particle contamination (e.g., grit) in the product.

The thermal transfer gas (e.g., plasma gas) may be guided into the reactor area. Feedstock may be injected in the reactor area such that under the prevailing conditions generated by aerodynamic and electromagnetic forces, intense rapid mixing between the plasma gas and feedstock may occur and/or such that limited or substantially no recirculation (e.g., no significant recirculation) of feedstock into the thermal activation chamber (e.g., plasma chamber) may take place. The injection of the hydrocarbon may be controlled such that the area in space where reaction occurs does not come into contact with any surfaces.

The systems and methods described herein may include heating hydrocarbons rapidly to form carbon particles (e.g., carbon nanoparticles). For example, the hydrocarbons may be heated rapidly to form carbon particles (e.g., carbon nanoparticles) and hydrogen. Hydrogen may in some cases refer to majority hydrogen. For example, some portion of this hydrogen may also contain methane (e.g., unspent methane) and/or various other hydrocarbons (e.g., ethane, propane, ethylene, acetylene, benzene, toluene, polycyclic aromatic hydrocarbons (PAH) such as naphthalene, etc.).

Once the feedstock has been injected, at least some of the heat transfer to bring the two gases to an equilibrium (e.g., thermal equilibrium) may occur within less than or equal to about 2 seconds. Sufficient heat may be transferred to the feedstock to form high quality carbon particles. In an example, from about 30% to about 80%, or from about 40% to about 70% of the heat contained in the heated thermal transfer gas may be transferred to the hydrocarbon feedstock within about 2 seconds of initial exposure to the thermal transfer gas. In another example, more than about 60% of the heat contained in the heated thermal transfer gas may be transferred to the hydrocarbon feedstock within about 2 seconds of initial exposure to the thermal transfer gas. In another example, more than about 50% of the contained energy within the thermal transfer gas (e.g., hydrogen) may be transferred to the hydrocarbon effluent stream within the first 500 milliseconds (starting at the point at which the hydrocarbon is injected). For example, at least about 50% of the heat generated by the plasma as measured in Joules may be transferred to the hydrocarbon in about 500 milliseconds or less. The heat may be transferred via radiative, conductive, thermal gas transfer or any other mechanism. In yet another example, the entire reaction to form carbon particles may be finished within several milliseconds after injection of hydrocarbon feedstock material.

Intermediate products of carbon particle reactions may have a tendency to stick to any surface they come into contact with. The intermediate product before carbon particle formation may be prevented from coming into contact with any surface while maintaining the survival of interior components (e.g., the thermal activation chamber liner, the throat material, the injector materials as well as the reactor itself). The mixing may be controlled in a way that maintains the integrity of the reactor while also attaining the rapid mixing. For example, the mixing may be controlled in a way that improves (e.g., maximizes) the survivability of components, improves (e.g., maximizes) mixing, and/or decreases (e.g., minimizes) coking. In some implementations, the mixing may include mixing of relatively cold hydrocarbon of significant density with exceedingly hot hydrogen with very low density. The two effluent streams may in some instances have different densities, temperatures, velocities, as well as viscosities. Rapid mixing of these effluent streams may achieve a sufficient amount of cracked hydrocarbon.

Feedstock injection may occur in a suitable region (e.g., as described in greater detail elsewhere herein, such as, for example, in relation to FIGS. 3, 4, 5 and 6). For example, the feedstock may be injected (e.g., in a plane) at a location away from the wall of the reactor vessel (e.g., centrally), from the wall of the reactor vessel, through the electrodes, or any combination thereof. Hydrocarbon injection may include one or more injectors (e.g., 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100 or more injectors). Injectors may comprise tips, slots, nozzles with a variety of shapes including, for example, circular or slit shapes. In some implementations, the injector openings may be configured/utilized such that the majority of the hydrogen is trapped within a curtain of hydrocarbon feedstock. The total diameter (e.g., sum of diameters) of such injector openings may be, for example, as described elsewhere herein (e.g., in relation to nozzles). A plurality of injector openings may be located in the same axial plane. The flow of thermal transfer gas may be axial (e.g., substantially axial), radial (e.g., substantially radial), or a combination thereof. The feedstock may be injected (e.g., through one or more openings) into the aforementioned flow of the thermal transfer gas in the same flow direction as the thermal transfer gas, in a flow direction perpendicular to the thermal transfer gas, or a combination thereof (e.g., the feedstock may be injected in an axial (e.g., substantially axial) direction, a radial (e.g., substantially radial) direction, or a combination thereof). The injectors may be oriented with respect to the thermal gas flow tangentially/axially, radially, or a combination thereof. As described in greater detail elsewhere herein, off-axis injection may be used. The off-axis injection may be at an off-axis angle of greater than or equal to about 0.1, 0.5, 1, 2, 5, 10, 15, 20, 25, 30, 35, 40, 45, 50, 55, 60, 65, 70, 75, 80, 85, 89 or 89.5 degrees. Alternatively, or in addition, the off-axis angle may be less than or equal to about 89.9, 89.5, 89, 85, 80, 75, 70, 65, 60, 55, 50, 45, 40, 35, 30, 25, 20, 15, 10, 5, 2, 1 or 0.5 degrees. The off-axis angle may be, for example, from about 5 degrees to about 85 degrees. Tangential flow may be introduced (e.g., additionally) to further intensify mixing between the two effluent streams.

Figure 4:
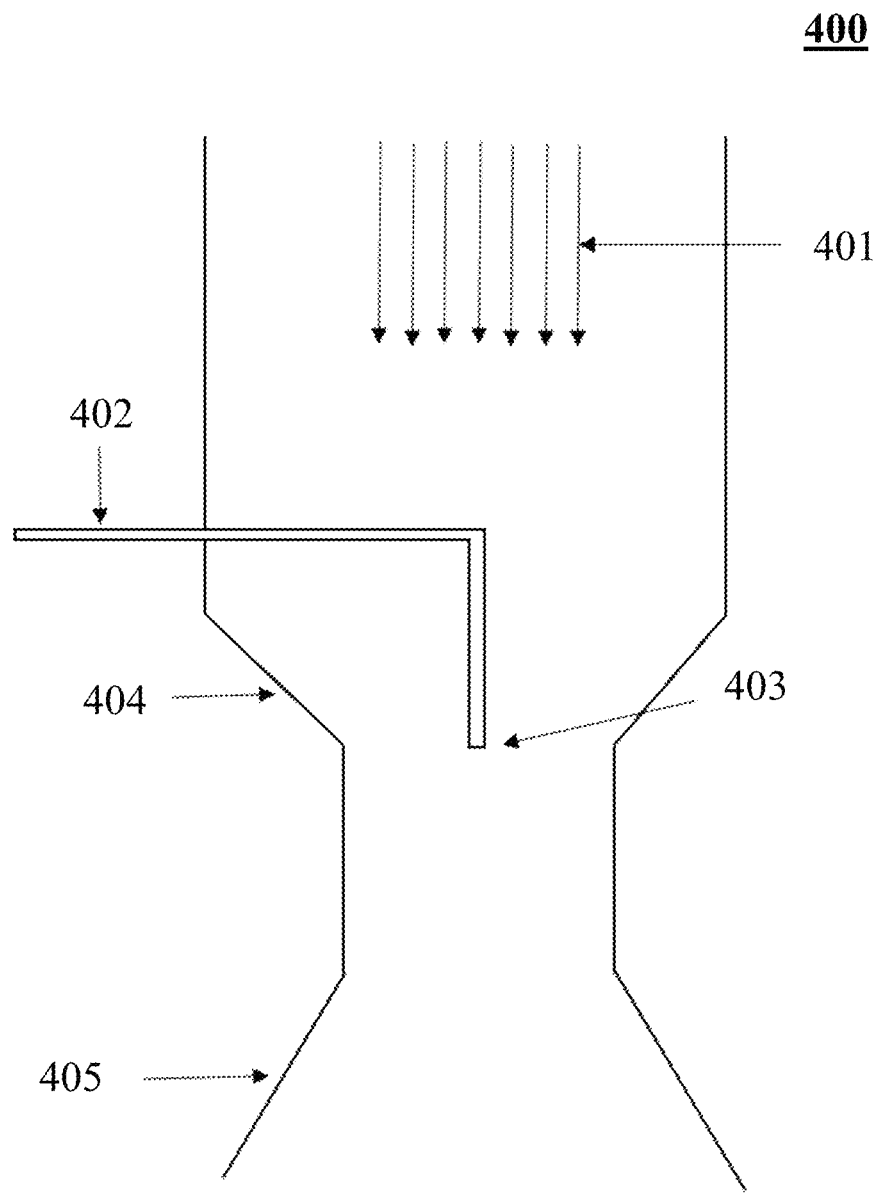
FIG. 4 shows a schematic representation of another example of a reactor/apparatus configured to implement a process of the present disclosure.

Mixing of hydrocarbon feedstock (e.g., at the throat or just downstream of the throat) may be achieved through the use of multiple injectors that are tangentially oriented to the thermal gas (e.g., plasma) flow. In some implementations, four circular nozzles of a suitable diameter (e.g., with a total diameter of the nozzles of less than about 5% of the circumference of the cross-sectional plane where the injectors are co-located) may be used. In some implementations, greater than or equal to 6 nozzles, or alternatively shaped nozzles (e.g. slit-shaped), of a suitable diameter (e.g., with a sum of the diameters of the nozzles of more than about 5% of the circumference of the cross-sectional plane where the injectors are co-located) may be used. The nozzles (e.g., in the increased nozzle count/adjusted nozzle shape configuration) may be utilized such that the majority of the hydrogen is trapped within a curtain of hydrocarbon feedstock. The hydrocarbon may be injected axially with the thermal gas (e.g., plasma) flow (also "axial hydrocarbon injection" herein). The hydrocarbon may be injected radially. The flow may comprise both axial and radial components ("off-axis" flow). Off-axis injection may be at an off-axis angle of, for example, from about 5 degrees to about 85 degrees. Additionally, tangential flow may be introduced to further intensify mixing between the two effluent streams. In this context, diameter may refer to the largest dimension of an irregular or regular shaped nozzle (e.g., if the shape is a star, the diameter is measured between the two tips of the star that give the largest internal dimension). The feedstock may be injected axially at a substantially central location in the reactor using, for example, an injector that may enter from the side of the reactor (e.g., upstream (before), in (e.g., in the middle of) or downstream (after) a narrowing; anywhere on a plane at or near a throat (e.g., below a converging region) or further downstream of the throat (e.g., in a diverging region of the reactor); etc.), with or without an axial turn as shown in FIG. 4, and may inject hydrocarbons axially downstream from a central injector tip comprising one opening or a plurality of openings (e.g., through one opening or a plurality of openings in the injection plane). Injection of hydrocarbon feedstock may occur radially outwards from a centrally located injector or radially inwards from the wall of the reactor vessel.

The injector(s) may be cooled via a cooling liquid (e.g., water). The injector(s) may be cooled by, for example, water or a non-oxidizing liquid (e.g., mineral oil, ethylene glycol, propylene glycol, synthetic organic fluids such as, for example, DOWTHERM™ materials, etc.). See, for example, commonly assigned, co-pending Int. Pat. Pub. No. WO 2015/116800 ("PLASMA GAS THROAT ASSEMBLY AND METHOD"), which is entirely incorporated herein by reference. The injector(s) may be fabricated from suitable materials such as, for example, copper, stainless steel, graphite and/or other similar materials (e.g., alloys) with high melting points and good corrosion resistance (e.g., to hydrogen free radical environment).

Figure 3:
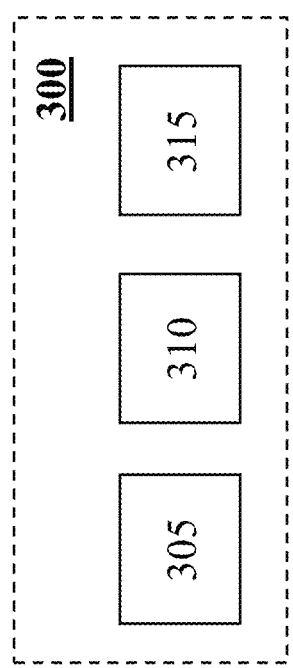
FIG. 3 shows a schematic representation of an example of a reactor/apparatus configured to implement a process of the present disclosure.

FIG. 3 shows a reactor apparatus (also "apparatus" herein) 300 in accordance with the present disclosure. The apparatus may be configured to enable, for example, thermal generation (e.g., heating) 305, injection 310 and reaction 315. For example, the apparatus may comprise one or more constant diameter regions/sections, one or more converging regions/sections, one or more diverging regions/sections, one or more inserts or other additional components, or any combination thereof. Such regions/sections, and/or inserts or other additional components, may be combined in various ways to implement the thermal generation (e.g., heating) 305, injection 310 and reaction 315. Such implementations may include, but are not limited to, configurations as described in relation to the schematic representations in FIGS. 4, 5 and 6. For example, a region/section where thermal generation 305 is implemented may or may not be separated by a throat from a reaction region/section where reaction 315 is implemented, injection 310 may or may not be downstream from the thermal generation 305, etc.

The thermal transfer gas may be provided to the system (e.g., to a reactor apparatus) at a rate of, for example, greater than or equal to about 1 normal cubic meter/hour ($Nm^3/hr$), 2 $Nm^3/hr$, 5 $Nm^3/hr$, 10 $Nm^3/hr$, 25 $Nm^3/hr$, 50 $Nm^3/hr$, 75 $Nm^3/hr$, 100 $Nm^3/hr$, 150 $Nm^3/hr$, 200 $Nm^3/hr$, 250 $Nm^3/hr$, 300 $Nm^3/hr$, 350 $Nm^3/hr$, 400 $Nm^3/hr$, 450 $Nm^3/hr$, 500 $Nm^3/hr$, 550 $Nm^3/hr$, 600 $Nm^3/hr$, 650 $Nm^3/hr$, 700 $Nm^3/hr$, 750 $Nm^3/hr$, 800 $Nm^3/hr$, 850 $Nm^3/hr$, 900 $Nm^3/hr$, 950 $Nm^3/hr$, 1,000 $Nm^3/hr$, 2,000 $Nm^3/hr$, 3,000 $Nm^3/hr$, 4,000 $Nm^3/hr$, 5,000 $Nm^3/hr$, 6,000 $Nm^3/hr$, 7,000 $Nm^3/hr$, 8,000 $Nm^3/hr$, 9,000 $Nm^3/hr$, 10,000 $Nm^3/hr$, 12,000 $Nm^3/hr$, 14,000 $Nm^3/hr$, 16,000 $Nm^3/hr$, 18,000 $Nm^3/hr$, 20,000 $Nm^3/hr$, 30,000 $Nm^3/hr$, 40,000 $Nm^3/hr$, 50,000 $Nm^3/hr$, 60,000 $Nm^3/hr$, 70,000 $Nm^3/hr$, 80,000 $Nm^3/hr$, 90,000 $Nm^3/hr$ or 100,000 $Nm^3/hr$. Alternatively, or in addition, the thermal transfer gas may be provided to the system (e.g., to the reactor apparatus) at a rate of, for example, less than or equal to about 100,000 $Nm^3/hr$, 90,000 $Nm^3/hr$, 80,000 $Nm^3/hr$, 70,000 $Nm^3/hr$, 60,000 $Nm^3/hr$, 50,000 $Nm^3/hr$, 40,000 $Nm^3/hr$, 30,000 $Nm^3/hr$, 20,000 $Nm^3/hr$, 18,000 $Nm^3/hr$, 16,000 $Nm^3/hr$, 14,000 $Nm^3/hr$, 12,000 $Nm^3/hr$, 10,000 $Nm^3/hr$, 9,000 $Nm^3/hr$, 8,000 $Nm^3/hr$, 7,000 $Nm^3/hr$, 6,000 $Nm^3/hr$, 5,000 $Nm^3/hr$, 4,000 $Nm^3/hr$, 3,000 $Nm^3/hr$, 2,000 $Nm^3/hr$, 1,000 $Nm^3/hr$, 950 $Nm^3/hr$, 900 $Nm^3/hr$, 850 $Nm^3/hr$, 800 $Nm^3/hr$, 750 $Nm^3/hr$, 700 $Nm^3/hr$, 650 $Nm^3/hr$, 600 $Nm^3/hr$, 550 $Nm^3/hr$, 500 $Nm^3/hr$, 450 $Nm^3/hr$, 400 $Nm^3/hr$, 350 $Nm^3/hr$, 300 $Nm^3/hr$, 250 $Nm^3/hr$, 200 $Nm^3/hr$, 150 $Nm^3/hr$, 100 $Nm^3/hr$, 75 $Nm^3/hr$, 50 $Nm^3/hr$, 25 $Nm^3/hr$, 10 $Nm^3/hr$, 5 $Nm^3/hr$ or 2 $Nm^3/hr$. The thermal transfer gas may be split into one or more flow paths. At least a portion of the thermal transfer gas may be used to dilute the feedstock prior to the feedstock reaching temperatures where reactions may be initiated (e.g., pre-dilution), as described in greater detail elsewhere herein. The thermal transfer gas may be provided to the system (e.g., to the reactor apparatus) at such rates in combination with one or more feedstock flow rates described herein. The thermal transfer gas (or portions thereof) may be heated at such flow rates (or portions thereof) to one or more temperatures described herein.

The feedstock (e.g., hydrocarbon) may be provided to the system (e.g., to a reactor apparatus) at a rate of, for example, greater than or equal to about 50 grams per hour (g/hr), 100 g/hr, 250 g/hr, 500 g/hr, 750 g/hr, 1 kilogram per hour (kg/hr), 2 kg/hr, 5 kg/hr, 10 kg/hr, 15 kg/hr, 20 kg/hr, 25 kg/hr, 30 kg/hr, 35 kg/hr, 40 kg/hr, 45 kg/hr, 50 kg/hr, 55 kg/hr, 60 kg/hr, 65 kg/hr, 70 kg/hr, 75 kg/hr, 80 kg/hr, 85 kg/hr, 90 kg/hr, 95 kg/hr, 100 kg/hr, 150 kg/hr, 200 kg/hr, 250 kg/hr, 300 kg/hr, 350 kg/hr, 400 kg/hr, 450 kg/hr, 500 kg/hr, 600 kg/hr, 700 kg/hr, 800 kg/hr, 900 kg/hr, 1,000 kg/hr, 1,100 kg/hr, 1,200 kg/hr, 1,300 kg/hr, 1,400 kg/hr, 1,500 kg/hr, 1,600 kg/hr, 1,700 kg/hr, 1,800 kg/hr, 1,900 kg/hr, 2,000 kg/hr, 2,100 kg/hr, 2,200 kg/hr, 2,300 kg/hr, 2,400 kg/hr, 2,500 kg/hr, 3,000 kg/hr, 3,500 kg/hr, 4,000 kg/hr, 4,500 kg/hr, 5,000 kg/hr, 6,000 kg/hr, 7,000 kg/hr, 8,000 kg/hr, 9,000 kg/hr or 10,000 kg/hr. Alternatively, or in addition, the feedstock (e.g., hydrocarbon) may be provided to the system (e.g., to the reactor apparatus) at a rate of, for example, less than or equal to about 10,000 kg/hr, 9,000 kg/hr, 8,000 kg/hr, 7,000 kg/hr, 6,000 kg/hr, 5,000 kg/hr, 4,500 kg/hr, 4,000 kg/hr, 3,500 kg/hr, 3,000 kg/hr, 2,500 kg/hr, 2,400 kg/hr, 2,300 kg/hr, 2,200 kg/hr, 2,100 kg/hr, 2,000 kg/hr, 1,900 kg/hr, 1,800 kg/hr, 1,700 kg/hr, 1,600 kg/hr, 1,500 kg/hr, 1,400 kg/hr, 1,300 kg/hr, 1,200 kg/hr, 1,100 kg/hr, 1,000 kg/hr, 900 kg/hr, 800 kg/hr, 700 kg/hr, 600 kg/hr, 500 kg/hr, 450 kg/hr, 400 kg/hr, 350 kg/hr, 300 kg/hr, 250 kg/hr, 200 kg/hr, 150 kg/hr, 100 kg/hr, 95 kg/hr, 90 kg/hr, 85 kg/hr, 80 kg/hr, 75 kg/hr, 70 kg/hr, 65 kg/hr, 60 kg/hr, 55 kg/hr, 50 kg/hr, 45 kg/hr, 40 kg/hr, 35 kg/hr, 30 kg/hr, 25 kg/hr, 20 kg/hr, 15 kg/hr, 10 kg/hr, 5 kg/hr, 2 kg/hr, 1 kg/hr, 750 g/hr, 500 g/hr, 250 g/hr or 100 g/hr.

The thermal transfer gas may be heated to and/or the feedstock may be subjected to a temperature of greater than or equal to about 1,000° C., 1,100° C., 1,200° C., 1,300° C., 1,400° C., 1,500° C., 1,600° C., 1,700° C., 1,800° C., 1,900° C., 2,000° C., 2050° C., 2,100° C., 2,150° C., 2,200° C., 2,250° C., 2,300° C., 2,350° C., 2,400° C., 2,450° C., 2,500° C., 2,550° C., 2,600° C., 2,650° C., 2,700° C., 2,750° C., 2,800° C., 2,850° C., 2,900° C., 2,950° C., 3,000° C., 3,050° C., 3,100° C., 3,150° C., 3,200° C., 3,250° C., 3,300° C., 3,350° C., 3,400° C. or 3,450° C. Alternatively, or in addition, the thermal transfer gas may be heated to and/or the feedstock may be subjected to a temperature of less than or equal to about 3,500° C., 3,450° C., 3,400° C., 3,350° C., 3,300° C., 3,250° C., 3,200° C., 3,150° C., 3,100° C., 3,050° C., 3,000° C., 2,950° C., 2,900° C., 2,850° C., 2,800° C., 2,750° C., 2,700° C., 2,650° C., 2,600° C., 2,550° C., 2,500° C., 2,450° C., 2,400° C., 2,350° C., 2,300° C., 2,250° C., 2,200° C., 2,150° C., 2,100° C., 2050° C., 2,000° C., 1,900° C., 1,800° C., 1,700° C., 1,600° C., 1,500° C., 1,400° C., 1,300° C., 1,200° C. or 1,100° C. The thermal transfer gas may be heated to such temperatures by a thermal generator (e.g., a plasma generator). The thermal transfer gas may be electrically heated to such temperatures by the thermal generator (e.g., the thermal generator may be driven by electrical energy). Such thermal generators may have suitable powers. The thermal generators may be configured to operate continuously at such powers for, for example, several hundred or several thousand hours in a corrosive environment.

Thermal generators may operate at suitable powers. The power may be, for example, greater than or equal to about 0.5 kilowatt (kW), 1 kW, 1.5 kW, 2 kW, 5 kW, 10 kW, 25 kW, 50 kW, 75 kW, 100 kW, 150 kW, 200 kW, 250 kW, 300 kW, 350 kW, 400 kW, 450 kW, 500 kW, 550 kW, 600 kW, 650 kW, 700 kW, 750 kW, 800 kW, 850 kW, 900 kW, 950 kW, 1 megawatt (MW), 1.05 MW, 1.1 MW, 1.15 MW, 1.2 MW, 1.25 MW, 1.3 MW, 1.35 MW, 1.4 MW, 1.45 MW, 1.5 MW, 1.6 MW, 1.7 MW, 1.8 MW, 1.9 MW, 2 MW, 2.5 MW, 3 MW, 3.5 MW, 4 MW, 4.5 MW, 5 MW, 5.5 MW, 6 MW, 6.5 MW, 7 MW, 7.5 MW, 8 MW, 8.5 MW, 9 MW, 9.5 MW, 10 MW, 10.5 MW, 11 MW, 11.5 MW, 12 MW, 12.5 MW, 13 MW, 13.5 MW, 14 MW, 14.5 MW, 15 MW, 16 MW, 17 MW, 18 MW, 19 MW, 20 MW, 25 MW, 30 MW, 35 MW, 40 MW, 45 MW, 50 MW, 55 MW, 60 MW, 65 MW, 70 MW, 75 MW, 80 MW, 85 MW, 90 MW, 95 MW or 100 MW. Alternatively, or in addition, the power may be, for example, less than or equal to about 100 MW, 95 MW, 90 MW, 85 MW, 80 MW, 75 MW, 70 MW, 65 MW, 60 MW, 55 MW, 50 MW, 45 MW, 40 MW, 35 MW, 30 MW, 25 MW, 20 MW, 19 MW, 18 MW, 17 MW, 16 MW, 15 MW, 14.5 MW, 14 MW, 13.5 MW, 13 MW, 12.5 MW, 12 MW, 11.5 MW, 11 MW, 10.5 MW, 10 MW, 9.5 MW, 9 MW, 8.5 MW, 8 MW, 7.5 MW, 7 MW, 6.5 MW, 6 MW, 5.5 MW, 5 MW, 4.5 MW, 4 MW, 3.5 MW, 3 MW, 2.5 MW, 2 MW, 1.9 MW, 1.8 MW, 1.7 MW, 1.6 MW, 1.5 MW, 1.45 MW, 1.4 MW, 1.35 MW, 1.3 MW, 1.25 MW, 1.2 MW, 1.15 MW, 1.1 MW, 1.05 MW, 1 MW, 950 kW, 900 kW, 850 kW, 800 kW, 750 kW, 700 kW, 650 kW, 600 kW, 550 kW, 500 kW, 450 kW, 400 kW, 350 kW, 300 kW, 250 kW, 200 kW, 150 kW, 100 kW, 75 kW, 50 kW, 25 kW, 10 kW, 5 kW, 2 kW, 1.5 kW or 1 kW.

Carbon particles may be generated at a yield (e.g., yield of carbon particles based upon feedstock conversion rate, based on total hydrocarbon injected, on a weight percent carbon basis, or as measured by moles of product carbon vs. moles of reactant carbon) of, for example, greater than or equal to about 1%, 5%, 10%, 25%, 50%, 55%, 60%, 65%, 70%, 75%, 80%, 85%, 90%, 91%, 92%, 93%, 94%, 95%, 96%, 97%, 98%, 99%, 99.5% or 99.9%. Alternatively, or in addition, the carbon particles may be generated at a yield (e.g., yield of carbon particles based upon feedstock conversion rate, based on total hydrocarbon injected, on a weight percent carbon basis, or as measured by moles of product carbon vs. moles of reactant carbon) of, for example, less than or equal to about 100%, 99.9%, 99.5%, 99%, 98%, 97%, 96%, 95%, 94%, 93%, 92%, 91%, 90%, 85%, 80%, 75%, 70%, 65%, 60%, 55%, 50%, 25% or 5%.

Figure 5:
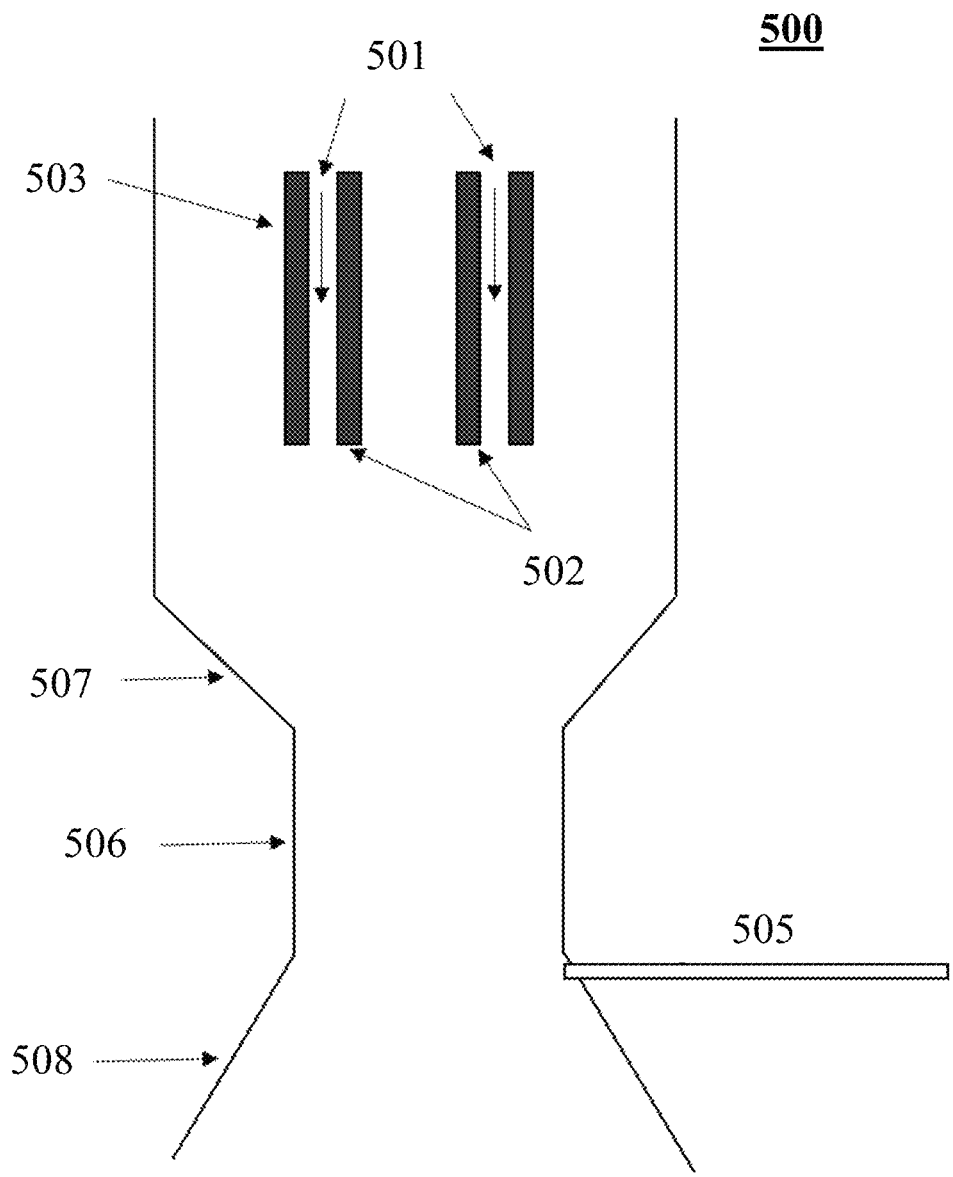
FIG. 5 shows a schematic representation of another example of a reactor/apparatus configured to implement a process of the present disclosure.
Figure 6:
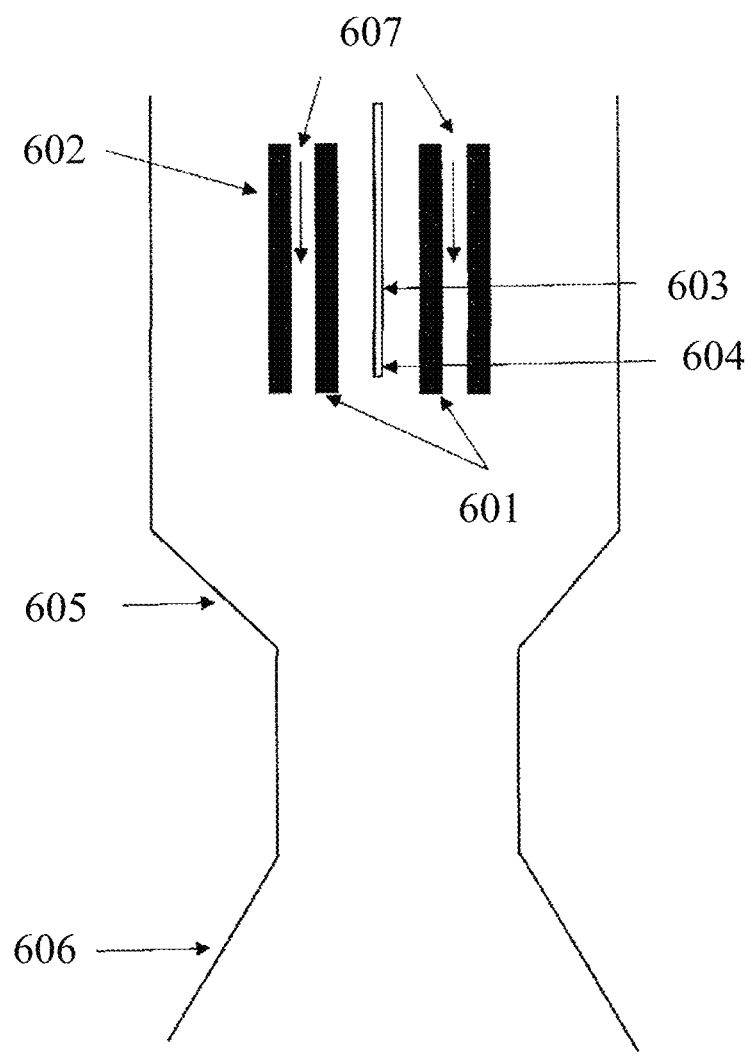
FIG. 6 shows a schematic representation of another example of a reactor/apparatus configured to implement a process of the present disclosure.

FIG. 4 shows a cross-section of an example of (a part of) a reactor 400. In this example, hot thermal transfer gas 401 may be generated in an upper portion of the reactor through the use of three or more AC electrodes, through the use of concentric DC electrodes (e.g., as shown in FIGS. 5 and 6), or through the use of a resistive or inductive heater. The hot thermal transfer gas may comprise, for example, at least about 50% hydrogen by volume that may be at least about 2,400° C. A hydrocarbon injector 402 may be cooled (e.g., water-cooled). The hydrocarbon injector 402 may enter from the side of the reactor (e.g., as shown, or at a suitable location as described elsewhere herein), and may then optionally turn into an axial position with respect to the thermal transfer gas (hot gas) flow. A hydrocarbon injector tip 403 may comprise or be one opening or a plurality of openings (e.g., that may inject hydrocarbons in clockwise or counter-clockwise flow patterns (e.g., to optimize mixing)). The reactor may comprise converging region(s) 404. The converging region(s) 404 may lead to a narrowing of the reactor. The converging region(s) 404 may lead to a narrowing of the reactor and then and then diverging region(s) 405 downstream of the converging region(s). See, for example, commonly assigned, co-pending Int. Pat. Pub. Nos. WO 2017/044594 ("CIRCULAR FEW LAYER GRAPHENE") and WO 2017/048621 ("CARBON BLACK FROM NATURAL GAS"), each of which is entirely incorporated herein by reference.

FIG. 5 shows a schematic representation of another example of an apparatus 500. A thermal transfer gas (e.g., plasma gas) 501 such as, for example, oxygen, nitrogen, argon, helium, air, hydrogen, carbon monoxide, hydrocarbon (e.g. methane, ethane, unsaturated) etc. (used alone or in mixtures of two or more) may be injected into an annulus created by two electrodes that are positioned in an upper chamber in a concentric fashion. Plasma forming electrodes may comprise an inner electrode 502 and an outer electrode 503. A sufficiently large voltage may be applied between the two electrodes. The electrodes may comprise or be made of copper, tungsten, graphite, molybdenum, silver etc. The thus-formed plasma may enter into a reaction zone where it may react/interact with a hydrocarbon feedstock that is fed at hydrocarbon injector(s) 505 to generate a carbon particle product. The walls of the vessel (e.g., comprising or constructed of refractory, graphite, cooled etc.) may withstand the plasma forming temperatures. The hydrocarbon injector(s) 505 may be located anywhere on a plane at or near a throat 506 below a converging region 507 or further downstream of the throat in a diverging region 508 of the reactor. Hydrocarbon injector tips may be arranged, for example, concentrically around the injection plane. There may be at least 6 injectors and up to 18 tips of this sort, or a slot, or a continuous slot, as non-limiting examples.

FIG. 6 shows a schematic representation of another example of an apparatus 600. FIG. 6 shows a two-dimensional cutout of a reactor comprising inner and outer electrodes, 601 and 602, respectively, that consist of concentric rings of electrically conductive material (e.g., graphite). Thermal transfer gas (e.g., plasma gas) 607 may flow through the annulus between the two electrodes where an arc may then excite the gas into the plasma state. The arc may be controlled through the use of a magnetic field which moves the arc in a circular fashion rapidly around the electrode tips. In this example, the hydrocarbon may be injected at a hydrocarbon injector 603 (e.g., at a hydrocarbon injector tip 604) through the center of the concentric electrodes via the hydrocarbon injector 603. In some examples, the hydrocarbon injector 603 may be, for example, water-cooled. The hydrocarbon injector tip may be placed to a point above the bottom plane of the electrodes, or it can be below the plane, or in the same plane (e.g., at the same height as the plane). In some implementations (e.g., optionally), the apparatus may comprise converging region(s) 605 leading to a narrowing of the reactor and then diverging region(s) 606 downstream of the converging region(s).

While the examples of reactors shown in FIGS. 4, 5 and 6 each have a vertical orientation with downward flow, an upward flow or a horizontal reactor orientation may also be used.

Thermal generators (e.g., plasma generators), thermal generation sections (e.g., plasma generating sections), thermal activation sections (e.g., thermal activation chambers such as, for example, plasma chambers), throat and/or injection zones of the present disclosure (or portions thereof) may comprise or be made of, for example, copper, tungsten, graphite, molybdenum, rhenium, boron nitride, nickel, chromium, iron, silver, or alloys thereof.

Systems of the present disclosure may comprise reactor apparatuses. The reactor apparatuses may be as described elsewhere herein (e.g., in relation to FIGS. 3, 4, 5 and 6). Some modifications and/or adjustments to the systems and methods described herein may be necessary to realize some of the particle properties and/or combinations of properties described herein.

A system of the present disclosure may be configured to implement an enclosed process. Such an enclosed particle generating system may include, for example, an enclosed particle generating reactor. The enclosed process may include a thermal generator (e.g., a plasma generator), a reaction chamber, a main filter, and a degas chamber. The enclosed process may include, for example, a thermal generator (e.g., a plasma generator), a reaction chamber, a throat and/or other region (e.g., as described in relation to FIG. 3), a main filter, and a degas chamber. These components may be substantially free of oxygen and other atmospheric gases. The process (or portions thereof) may allow only a given atmosphere. For example, oxygen may be excluded or dosed at a controlled amount of, for example, less than about 5% by volume in the enclosed process. The system (the process) may include one or more of a thermal generator (e.g., a plasma generator), a thermal activation chamber (e.g., a plasma chamber), a throat and/or other region (e.g., as described in relation to FIG. 3), a furnace or reactor, a heat exchanger (e.g., connected to the reactor), a main filter (e.g., connected to the heat exchanger), a degas (e.g., product inerting) apparatus (e.g., chamber) (e.g., connected to the filter), and a back end. The back end may include one or more of a pelletizer (e.g., connected to the degas apparatus), a binder mixing (e.g., binder and water) tank (e.g., connected to the pelletizer), and a dryer (e.g., connected to the pelletizer). As non-limiting examples of other components, a conveying process, a process filter, cyclone, classifier and/or hammer mill may be added (e.g., optionally). Further examples of back end components may be as provided elsewhere herein. See also, for example, U.S. Pat. No. 3,981,659 ("APPARATUS FOR DRYING CARBON BLACK PELLETS"), U.S. Pat. No. 3,309,780 ("PROCESS AND APPARATUS FOR DRYING WET PARTICULATE SOLIDS") and U.S. Pat. No. 3,307,923 ("PROCESS AND APPARATUS FOR MAKING CARBON BLACK"), each of which is entirely incorporated herein by reference.

Figure 7:
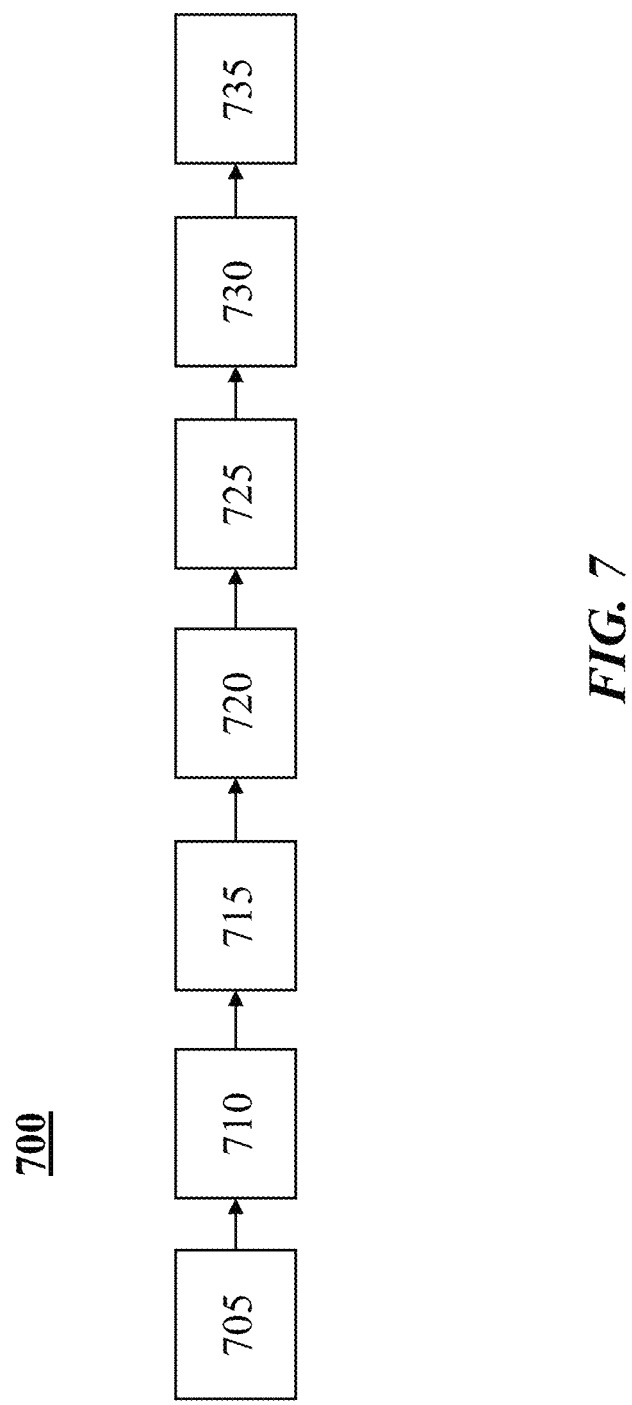
FIG. 7 shows a schematic representation of an example of a system configured to implement a process of the present disclosure.

FIG. 7 shows an example of a system 700 configured to implement a process of the present disclosure. The system may comprise a thermal activation chamber (e.g., a plasma chamber) 705, a throat and/or other region 710, a reactor 715, a heat exchanger 720, a filter 725, a degas 730, a back end 735, or combinations thereof.

Figure 8:
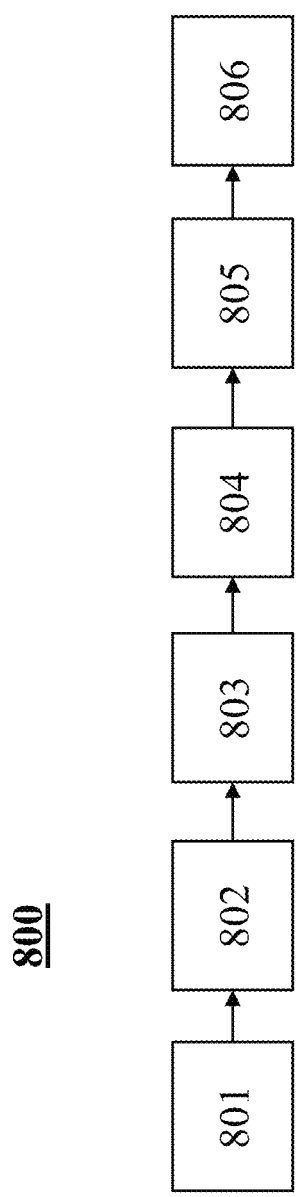
FIG. 8 shows a schematic representation of an example of a process of the present disclosure.

FIG. 8 shows an example of a flow chart of a process 800. The process may begin through addition of hydrocarbon to hot gas (e.g., heat+hydrocarbon) 801 (e.g., as described, for example, in relation to the examples of methods of combining the hot gas and the hydrocarbon (e.g., hydrocarbon precursor) in FIGS. 3, 4, 5 and 6). The process may include one or more of the steps of heating the gas (e.g., thermal transfer gas), adding the hydrocarbon to the hot gas (e.g., 801), passing through a reactor 802, and using one or more of a heat exchanger 803, filter 804, degas (e.g., degas chamber) 805 and back end 806. The hot gas may be a stream of hot gas at an average temperature of over about 2,200° C. The hot gas may have a composition as described elsewhere herein (e.g., the hot gas may comprise greater than 50% hydrogen by volume). In some implementations, the process(es) described herein may be substantially free of atmospheric oxygen (also "substantially oxygen-free" herein). The process may include heating a gas (e.g., comprising 50% or greater by volume hydrogen) and then adding this hot gas to a hydrocarbon at 801. Heat may (e.g., also) be provided through latent radiant heat from the wall of the reactor. This may occur through heating of the walls via externally provided energy or through the heating of the walls from the hot gas. The heat may be transferred from the hot gas to the hydrocarbon feedstock. This may occur immediately upon addition of the hydrocarbon feedstock to the hot gas in the reactor or the reaction zone 802. The hydrocarbon may begin to crack and decompose before being fully converted into carbon particles. The degas (e.g., degas unit) 805 may be, for example, as described in commonly assigned, co-pending Int. Pat. Pub. No. WO 2016/126599 ("CARBON BLACK GENERATING SYSTEM"), which is entirely incorporated herein by reference. The back end 806 may include, for example, one or more of a pelletizer, a binder mixing tank (e.g., connected to the pelletizer), and a dryer (e.g., connected to the pelletizer).

In some examples, the systems/processes described herein may comprise a filter at the front end of the reactor or system (e.g., at the reactor). The front end filter may remove, for example, sulfur impurities from one or more of the material streams entering the reactor. Such sulfur impurities may comprise, for example, hydrogen sulfide, carbonyl sulfide, sulfur in mercaptans, iron sulfide and/or other sulfur compounds. The filter may remove such impurities using, for example, amine scrubbing and/or other techniques. The filter may remove sulfur impurities from a feedstock stream. The filter may be coupled, for example, to a feedstock injector (e.g., to an inlet of a reactor feedstock injector). The filter may remove, for example, at least about 1%, 2%, 5%, 10%, 15%, 20%, 25%, 30%, 35%, 40%, 45%, 50%, 55%, 60%, 65%, 70%, 75%, 80%, 85%, 90%, 95%, 99%, 99.9% or 100% of the sulfur content (e.g., by mass) present in the material stream (e.g., feedstock stream) prior to the filter. In addition, the filter may in some cases remove at most about 99.9%, 99%, 95%, 90%, 85%, 80%, 75%, 70%, 65%, 60%, 55%, 50%, 45%, 40%, 35%, 30%, 25%, 20%, 15%, 10% or 5% of the sulfur content (e.g., by mass) present in the feedstock stream prior to the filter. After passing through the filter, the material stream (e.g., feedstock) may comprise, for example, less than or equal to about 5%, 2%, 1%, 0.75%, 0.5%, 0.4%, 0.3%, 0.2%, 0.1%, 0.09%, 0.08%, 0.07%, 0.06%, 0.05%, 0.04%, 0.03%, 0.02%, 0.01%, 50 ppm, 45 ppm, 40 ppm, 35 ppm, 30 ppm, 25 ppm, 20 ppm, 15 ppm, 10 ppm, 5 ppm, 1 ppm, 0.5 ppm or 0.1 ppm sulfur (e.g., by weight). Alternatively, or in addition, after passing through the filter, the material stream (e.g., feedstock) may comprise, for example, greater than or equal to about 0 ppm, 0.1 ppm, 0.5 ppm, 1 ppm, 5 ppm, 10 ppm, 15 ppm, 20 ppm, 25 ppm, 30 ppm, 35 ppm, 40 ppm, 45 ppm, 50 ppm, 0.01%, 0.02%, 0.03%, 0.04%, 0.05%, 0.06%, 0.07%, 0.08%, 0.09%, 0.1%, 0.2%, 0.3%, 0.4%, 0.5%, 0.75%, 1% or 2% sulfur (e.g., by weight). The systems/processes described herein may be used to produce particles with elemental sulfur contents as described elsewhere herein.

The reaction products may be cooled after manufacture. A quench may be used to cool the reaction products. For example, a quench comprising a majority of hydrogen gas may be used. The quench may be injected in the reactor portion of the process. A heat exchanger may be used to cool the process gases. In the heat exchanger, the process gases may be exposed to a large amount of surface area and thus allowed to cool, while the product stream may be simultaneously transported through the process. The heat exchanger in the reactor in the processes of the present disclosure may be more efficient than, for example, in the furnace process (e.g., due to the elevated temperatures in the processes described herein). The heat exchanger (e.g., heat exchanger 720) may be configured, for example, as described in Int. Pat. Pub. Nos. WO 2016/126599 ("CARBON BLACK GENERATING SYSTEM") and WO 2017/034980 ("HIGH TEMPERATURE HEAT INTEGRATION METHOD OF MAKING CARBON BLACK"), each of which is entirely incorporated herein by reference.

The carbon particles may be produced in an admixture of/with an effluent stream of hot gas which exits the reactor into contact with a heat exchanger. The heat exchanger may reduce the thermal energy of the effluent stream of gases and carbon particles by greater than about 5000 kilojoules/kilogram (kJ/kg) of carbon particles. The effluent stream of gases and carbon particles may be (e.g., subsequently) passed through a filter which allows more than 50% of the gas to pass through, capturing substantially all of the carbon particles on the filter. At least about 98% by weight of the carbon particles may be captured on the filter.

The carbon particles may be produced in an admixture of an effluent stream of hot gas containing combustible gas which exits the reactor into contact with a heat exchanger. The effluent stream of hot gas containing combustible gas may be (e.g., subsequently) passed through a filter, capturing substantially all of the carbon particles on the filter. The gas may (e.g., subsequently) pass through a degas apparatus where the amount of combustible gas is reduced to less than about 10% by volume. The combustible gas may comprise or be hydrogen.

The carbon particles may be produced in an admixture of an effluent stream of hot gas containing combustible gas which exits the reactor into contact with a heat exchanger. The admixture may be (e.g., subsequently) passed through a filter, capturing substantially all of the carbon particles on the filter. The carbon particles with residual gas may (e.g., subsequently) pass through a degas apparatus where the amount of combustible gas is reduced to less than about 10% by volume. The carbon particles may be (e.g., subsequently) mixed with water with a binder and then formed into pellets, followed by removal of the majority of the water in a dryer.

Hydrogen and/or other combustible gases may be separated (e.g., in the degas 730) from the pores and/or interstitial spaces of a carbon particle and/or carbon particle agglomerate production stream (e.g., formed in a plasma torch reactor system, or other system for making carbon particles that results in the gases made in forming the carbon particles containing more than about 40% combustible gases). Such processes may produce carbon that may be filtered or otherwise separated from the bulk of the tail gas, leaving the pores and/or interstitial spaces of the particles and/or agglomerates full of combustible gases (e.g., presenting a significant safety hazard to downstream atmospheric equipment). Such combustible gases may be removed from the pores and/or interstitial spaces of the carbon particles and/or agglomerates (e.g., to protect the downstream equipment that processes the carbon in air or air mixtures).

A one-step process may contain the reactants and products up until a degas step has been completed to remove the combustible gas(es) (e.g., hydrogen) produced from the cracking of the hydrocarbon feedstock (e.g., methane). Hydrogen, a highly combustible gas, may be separated from the as-produced carbon particles (e.g., carbon nanoparticles) in order to manipulate the carbon nanoparticles. A degas may be considered to be complete, for example, if the hydrogen level has been reduced to less than, for example, 20 percent by volume.

The carbon particles and/or agglomerates produced may contain a high concentration of combustible gases in its pores and/or interstitial spaces, which may be subsequently removed by replacement with, for example, inert gas (e.g., thereby rendering the carbon particles safe to process in downstream equipment). The inert gas may be, for example, nitrogen, a noble gas, steam or carbon dioxide. The inert gas may be a mixture of two or more of noble gases, nitrogen, steam, and/or carbon dioxide. Removing the combustible gases (e.g., hydrogen) from the carbon particles, particularly the small amount that remains in the pores and/or interstitial spaces and structure of the carbon particles and/or agglomerates after it has been bulk separated in a cyclone, bag house or other primary separation device, may be challenging. The concentration of combustible gases may be greater than about 30% by volume on a dry basis.

The combustible gases may be removed from the pores and/or interstitial spaces of the particles and/or particle agglomerates by, for example, varying the pressure or temperature, or discharging the carbon particles produced into an upward flowing stream of inert gas. The carbon particles produced may be discharged into an upward flowing stream of inert gas causing the combustible gases (e.g., hydrogen) contained in the pores and/or interstitial spaces (e.g., of the particle and/or agglomerate) to diffuse into the inert gas. The combustible gases (e.g., hydrogen) entrapped within the pores and/or interstitial spaces of carbon particles and/or carbon particle agglomerates (e.g., produced in a plasma torch system and/or other high intensity system for making carbon particles) may be recovered by counter-current flow of inert gas (e.g., nitrogen). In some examples, the counter-current configuration may set up an upward flowing inert gas that the carbon particles fall(s) through. When discharging the carbon particles from the main unit filter (e.g., the filter 725), the carbon particles may be sent into an upward flowing stream of inert gas. As the carbon particles fall(s) down through the inert gas, the hydrogen may diffuse out of the pores and/or interstitial spaces of the particle and/or agglomerate into the inert gas. The buoyancy of the hydrogen and other combustible gases may assist with this process. In some examples, the counter-current configuration may result in the least use of inert gas (e.g., nitrogen), the highest concentration of combustible gases in the evolved gas stream from the process and the process being completed continuously. Changes in absolute pressure may be used to replace the combustible gases with inert gas. The combustible gas(es) (e.g., hydrogen) may be removed by pressure swing with nitrogen or another inert gas so that each change in pressure (e.g., from multiple atmospheres down to a lower pressure or even a vacuum) may displace at least a portion of the combustible gas(es) with an inert gas. Pressure swing degassing may require a pressure vessel to contain the change in pressure necessary for the use of a pressure swing. Pressure swing degassing may require a pressure vessel if the pressure swing uses a vacuum instead of or supplemental to the pressure swing. While discontinuous, such pressure swings may take place over a short period of time and so result in inertion of the product in a relatively short period of time. The inert gas used to vary the pressure or provide the upward flowing inert gas may be, for example, nitrogen, a noble gas (helium, neon, argon, krypton, xenon etc.), or any combination thereof. The combustible gases may be removed by changes in temperature (e.g., temperature swings). Temperature swings may (e.g., also) effectively displace the pore and/or interstitial combustible gases, but may take longer than pressure swings or counter-current methods. The combustible gas(es) (e.g., hydrogen) may be removed by just leaving the product in filters overnight so that the combustible gas(es) (e.g., hydrogen) diffuse(s) out over time. The combustible gas(es) may be removed by flowing gas through a mass of particles, or through fluidized particles (e.g., fluidized carbon particles, such as, for example, a fluid bed of carbon particles). The combustible gas(es) may be removed by dilution with an inert gas (e.g., argon). Inertion may refer to the removal of combustible gases to a safe level (e.g., where an explosion cannot take place). Inertion may refer to creating an inert environment. In some examples, removing the combustible gas(es) may refer to reducing the combustible gas(es) (e.g., to an acceptable volume percentage).

The back end of the reactor (e.g., the back end 735) may comprise a pelletizer, a dryer and/or a bagger as non-limiting example(s) of components. More components or fewer components may be added or removed. For instance, examples of a pelletizer may be found in U.S. Pat. Pub. No. 2012/0292794 ("PROCESS FOR THE PREPARATION OF CARBON BLACK PELLETS"), which is entirely incorporated herein by reference. For the pelletizer, water, binder and carbon particles may be added together in a pin type pelletizer, processed through the pelletizer, and then dried. The binder:carbon particle ratio may be less than about 0.1:1 and the water:carbon particle ratio may be within the range from about 0.1:1 to about 3:1. The binder may be, for example, as described elsewhere herein (e.g., ash free binder). The carbon particles may also pass through classifiers, hammer mills and/or other size reduction equipment (e.g., so as to reduce the proportion of grit in the product). In an example, energy flow may be about 3500 kJ/kg for carbon particles requiring about 1.2 kg water/kg carbon particles (e.g., 120 DBP). Lower DBP carbon particles may use less water to make acceptable quality pellets and so may need less heat. The pelletizing medium (e.g., water) may be heated (e.g., so that the carbon goes in to the dryer at a higher temperature). Alternatively, the process may use a dry pelletisation process in which a rotating drum densifies the product. For some uses, unpelletized carbon particles, so called fluffy carbon particles, or pelletized carbon particles that have been ground back to a fluffy state, may also be acceptable.

The pelletizer may use an oil pelletization process. An example of the oil pelletization process may be found in U.S. Pat. No. 8,323,793 ("PELLETIZATION OF PYROLYZED RUBBER PRODUCTS"), which is entirely incorporated herein by reference. Oil pelletization may advantageously be used to produce the low ash/low grit carbon particles described in greater detail elsewhere herein. Oil pelletization may not add any ash to the carbon particles. A binder oil (e.g., at least one of a highly aromatic oil, a naphthenic oil, and a paraffinic oil) and carbon particles may be added to together in the pelletizer. The binder oil may be added into a mixer (e.g., in an amount of up to about 15 percent by weight binder oil) with the carbon particles to form pelletized carbon particles. Alternatively, distilled water and ash free binder, such as sugar, may be used to produce the low ash/low grit carbon particles described in greater detail elsewhere herein. Pelletization with distilled water and ash free binder, such as sugar, may not add any ash to the carbon particles. Other examples of ash free binder may include, but are not limited to, polyethylene glycol, and/or polyoxyethylene (e.g., polymers of ethylene oxide such as, for example, TWEEN® 80 and/or TWEEN® 20 materials).

The dryer may be, for example, an indirect (e.g., indirect fired or otherwise heated, such as, for example, by heat exchange with one or more fluids of the system in lieu of combustion) rotary dryer. The dryer may use one or more of air, process gas and purge gas to heat the (e.g., pelletized) carbon particles. In some examples, only purge gas may be used. In some examples, air, with or without purge gas, may be used. In some examples, process gas, with or without purge gas, may be used. In some examples, air and process gas, with or without purge gas, may be used. The dryer may be configured for co-current or counter-current operation (e.g., with a purge gas).

The dryer may be, for example, an indirect fired rotary dryer with co-current purge gas (direct gas addition to the dryer). The purge gas may be provided to the dryer in co-current with hot air. The wet carbon particles may be dried without being exposed to the full oxygen content of the hot air (e.g., since such exposure may result in a fire). Providing the purge gas and hot air to the dryer in co-current may limit the maximum temperature of the exterior of the carbon particles, which may otherwise get too hot while the interior is wet. Counter-current operation of the dryer may in some cases be more energy and capacity efficient. Adding air to the barrel may make the dryer more thermally efficient and may also result in higher capacity. However, if dryer barrel velocity gets too high, it may sweep the pellets out of the dryer and so result in high recycle to the purge filter, and back to the pelletizer (e.g., thereby reducing efficiency and capacity). It may also add too much oxygen to the surface of the carbon particles. The addition of spent (e.g., cooler) air to the dryer barrel may be limited (e.g., so as to provide limited oxidation in a substantially steam atmosphere). After giving up heat to the dryer, the air may still contain a lot of energy. In some examples, the air may be at a temperature of the order of about 350° C. This gas may get directed, for example, to a boiler (e.g., for energy efficiency purposes). As described elsewhere herein, process gas (e.g., from the degas unit) may be used to dry the particles (e.g., in combination with air and/or purge gas). For example, the process gas may be used to dry the particles in lieu of the hot air (e.g., in co-current with purge gas) or in combination with the hot air.

The carbon particles may be dried to a temperature from about 150° C. to about 400° C. In some examples, the carbon particles may be dried to at least about 250° C. (e.g., to ensure the center is dry). The atmosphere in the dryer may be controlled. The atmosphere in the dryer may be controlled, for example, to affect oxidation at the surface of the carbon particles or to maintain the pristine "dead" surface of the carbon particles. The "dead" surface may be characterized as not having a substantial amount of water uptake when exposed to a range of relative humidity (RH) conditions (e.g., from about 0% to about 80% RH). As described in greater detail elsewhere herein, carbon particles from the processes of the present disclosure may be pristine as made (e.g., surface functional groups may not form, and the material may have a "dead" surface) and may contain, for example, less than about 0.2% by weight oxygen (e.g., there may be no surface oxygen functional groups in the final product). An oxidizing (e.g., not oxygen-free) atmosphere may comprise, for example, greater than about 5% or 10% oxygen by volume. For a small amount of oxidation the atmosphere may be controlled, for example, from about 1% to about 10% oxygen by volume. Therefore, the carbon particles of the present disclosure may have added capability and tailorability compared to process(es) in which the particles as made are not pristine (e.g., compared to furnace black, which, while it can be further oxidized in this step, it cannot be made more pristine in the dryer, as the temperatures required to remove the native oxygen from the surface of carbon black are greater than 700° C.). Alternatively, or in addition, the systems and methods described herein may be adapted to control and/or modify (e.g., impart a degree and/or density of functionalization onto carbon particles) the surface chemistry (e.g., surface composition, WSP, amount or density of surface functional groups, etc.) of the carbon particles as described, for example, in commonly assigned, co-pending Int. Pat. Pub. No. WO 2017/027385 ("METHOD OF MAKING CARBON BLACK"), which is entirely incorporated herein by reference.

In some examples, the process(es) described herein may be advantaged over competitive technologies because the material may be finished once it exits the reactor (e.g., final product may be made after exiting the reactor) and is pelletized and dried. No further steps may be required. The carbon particles may not require a post treatment in a high temperature furnace (e.g., in contrast to typical furnace black). For example, the carbon particles may not require a post treatment in a high temperature furnace to be converted into a high quality battery black (e.g., in contrast to typical furnace black). In this regard, a process of the present disclosure may be "once-through process" (also "one-step process" herein). For example, the carbon particle(s) may be made in a once-through process.

In some examples (e.g., in Examples 1-2), carbon particles of the present disclosure may be synthesized through the use of a plasma torch that heats hydrogen thermal transfer gas. The temperature of the heated thermal transfer gas may be as described elsewhere herein. The thermal transfer gas may then be mixed with natural gas. Flow rates of the thermal transfer gas and natural gas feedstock may be as described elsewhere herein. The resultant N2SA, structure and morphology may be controlled through the careful manipulation of flow rates, plasma and reaction temperatures and various other key factors (e.g., as described elsewhere herein).

Boron doping (e.g., see Example 2) may be implemented, for example, by injecting boric acid and/or other boron precursors (e.g., diborane, trimethyl borane and the like) close to a hydrocarbon injection region. The boron precursor may be injected at, before and/or after injection. The boron precursor may be co-injected (e.g., with the feedstock). The boron precursor may be injected just downstream of injection. The boron precursor may be injected, for example, within about 200 cm of a hydrocarbon injection region (e.g., so that the boron may be incorporated into the carbon crystal lattice).

Boron (e.g., a total amount of boron) may be provided (e.g., added) to the system (e.g., to a reactor apparatus) at a rate of, for example, greater than or equal to about 0.005 g/hr, 0.01 g/hr, 0.015 g/hr, 0.02 g/hr, 0.03 g/hr, 0.04 g/hr, 0.05 g/hr, 0.06 g/hr, 0.07 g/hr, 0.08 g/hr, 0.09 g/hr, 0.1 g/hr, 0.2 g/hr, 0.5 g/hr, 1 g/hr, 2 g/hr, 5 g/hr, 10 g/hr, 20 g/h, 30 g/hr, 40 g/hr, 50 g/hr, 75 g/hr, 100 g/hr, 150 g/hr, 200 g/hr, 250 g/hr, 300 g/hr, 350 g/hr, 400 g/hr, 450 g/hr, 500 g/hr, 550 g/hr, 600 g/hr, 650 g/hr, 700 g/hr, 750 g/hr, 800 g/hr, 850 g/hr, 900 g/hr, 1 kg/hr, 2 kg/hr, 5 kg/hr, 10 kg/hr, 15 kg/hr, 20 kg/hr, 25 kg/hr, 50 kg/hr, 75 kg/hr, 100 kg/hr, 150 kg/hr, 200 kg/hr, 250 kg/hr, 300 kg/hr, 350 kg/hr, 400 kg/hr, 450 kg/hr, 500 kg/hr, 550 kg/hr, 600 kg/hr, 650 kg/hr, 700 kg/hr, 750 kg/hr, 800 kg/hr, 850 kg/hr, 900 kg/hr, 950 kg/hr or 1,000 kg/hr. Alternatively, or in addition, the boron (e.g., a total amount of boron) may be provided (e.g., added) to the system (e.g., to the reactor apparatus) at a rate of, for example, less than or equal to about 1,000 kg/hr, 950 kg/hr, 900 kg/hr, 850 kg/hr, 800 kg/hr, 750 kg/hr, 700 kg/hr, 650 kg/hr, 600 kg/hr, 550 kg/hr, 500 kg/hr, 450 kg/hr, 400 kg/hr, 350 kg/hr, 300 kg/hr, 250 kg/hr, 200 kg/hr, 150 kg/hr, 100 kg/hr, 75 kg/hr, 50 kg/hr, 25 kg/hr, 20 kg/hr, 15 kg/hr, 10 kg/hr, 5 kg/hr, 2 kg/hr, 1 kg/hr, 900 g/hr, 850 g/hr, 800 g/hr, 750 g/hr, 700 g/hr, 650 g/hr, 600 g/hr, 550 g/hr, 500 g/hr, 450 g/hr, 400 g/hr, 350 g/hr, 300 g/hr, 250 g/hr, 200 g/hr, 150 g/hr, 100 g/hr, 75 g/hr, 50 g/hr, 40 g/hr, 30 g/hr, 20 g/h, 10 g/hr, 5 g/hr, 2 g/hr, 1 g/hr, 0.5 g/hr, 0.2 g/hr, 0.1 g/hr, 0.09 g/hr, 0.08 g/hr, 0.07 g/hr, 0.06 g/hr, 0.05 g/hr, 0.04 g/hr, 0.03 g/hr, 0.02 g/hr, 0.015 g/hr or 0.01 g/hr. The boron may be provided to the system (e.g., to the reactor apparatus) at such rates in combination with one or more feedstock flow rates and thermal transfer gas flow rates described elsewhere herein. Boron may be added to achieve (e.g., at one or more yields described elsewhere herein) a total amount of boron of, for example, greater than or equal to about 0.01%, 0.02%, 0.05%, 0.1%, 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% or 10% of the total carbon particles produced on a solids (e.g., weight) basis. Alternatively, or in addition, the boron may be added to achieve (e.g., at one or more yields described elsewhere herein) a total amount of boron of, for example, less than or equal to about 10%, 9.5%, 9%, 8.5%, 8%, 7.5%, 7%, 6.5%, 6%, 5.5%, 5%, 4.5%, 4%, 3.5%, 3%, 2.5%, 2%, 1.5%, 1%, 0.5%, 0.1%, 0.05% or 0.02% of the total carbon particles produced on a solids (e.g., weight) basis. In some examples, the boron concentration may be between about 0.05% and 7% on a solids weight basis. For example, the total amount of boron added may be 1% of the total carbon particles produced on a solids basis.

Boron may be provided (e.g., added) to the system (e.g., to a reactor apparatus) in gaseous, liquid and/or solid form. Boron precursors may include boric acid, diborane and trimethyl borane as non-limiting examples. Alternatively, or in addition, a solid feed system may be used.

In an example, boron precursor boric acid may be added. A solution of 5% boric acid in ethylene glycol (EG) or water may be prepared. This solution may be injected into an oncoming hot mixture of $H_2$ (and/or other thermal transfer gas(es) or any components thereof, as described elsewhere herein) and natural gas.

In an example, diborane gas may be added. The diborane gas may be injected into a hot mixture of $H_2$ (and/or other thermal transfer gas(es) or any components thereof, as described elsewhere herein) and natural gas.

EXAMPLES

Example 1

In this example, a first type of particle is produced by a process of the present disclosure.

FIG. 1 shows a TEM of examples of the first type of particle. This is an anisotropic particle, the likes of which have not been prepared before. At least a portion of the particles are anisotropic in both 1-dimension (e.g., needle-like) and 2-dimensions (e.g., plate- or graphene-like). This particle possesses very little resemblance to either carbon black, carbon nanotubes, graphenes or VGCF. The dimensions are much smaller than the closest relative, the VGCF. This difference may be quantified, for example, through dynamic light scattering (DLS) and TEM histogram, as described elsewhere herein.

Figure 2:
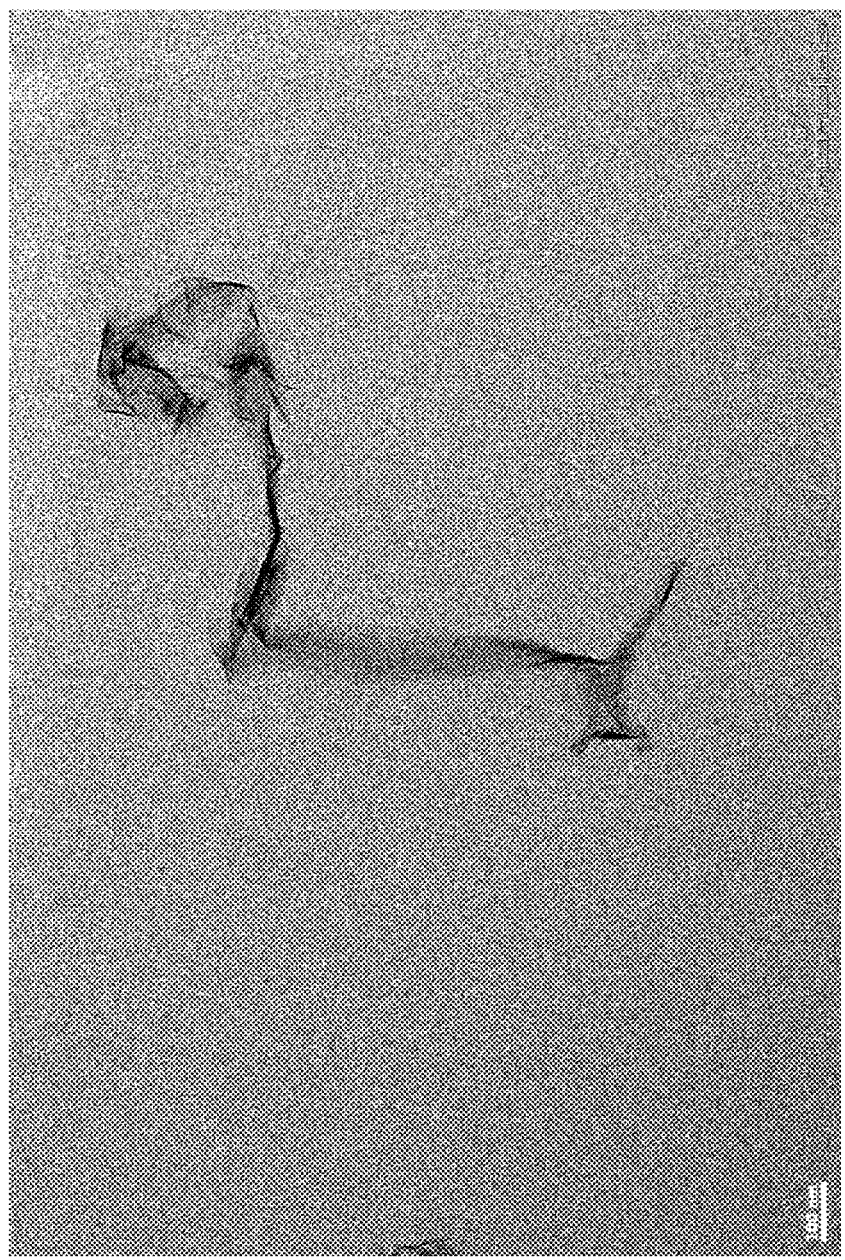
FIG. 2 shows a TEM image close-up of an example of a particle made in accordance with a process of the present disclosure.

FIG. 2 shows a TEM close-up of an example of the first type of particle.

A sample of the first type of particle has N2SA of 114 $m^2/g$, STSA of 135 $m^2/g$, STSAN2SA of 1.18, structure of 174 ml/100 g, measured DLS particle size of 333 nm, calculated DLS particle size of 110 nm, DLS deviation of 67.0%, percent free space of 90%, EMSA of 34 $m^2/g$, STSA/EMSA of 3.97, $L_c$ of 16 nm, d002 of 0.343 nm, and volume resistivity at 2 MPa of 0.07 ohm-cm. Coin cell capacity retention in this example is 140 mAh/g at 3 C, and 135 mAh/g at 5 C.

Example 2

In this example, a second type of particle is produced by a process of the present disclosure. The second type of particle is the same as the first type of particle, except with the addition of diborane. Boron doping is implemented as described in greater detail elsewhere herein.

A sample of the second type of particle has N2SA of 117 $m^2/g$, STSA of 138 $m^2/g$, STSAN2SA of 1.18, structure of 183 ml/100 g, measured DLS particle size of 332 nm, calculated DLS particle size of 113 nm, DLS deviation of 66.0%, percent free space of 92%, EMSA of 38 $m^2/g$, STSA/EMSA of 3.63, $L_c$ of 16 nm, d002 of 0.344 nm, and volume resistivity at 2 MPa of 0.05 ohm-cm. Coin cell capacity retention in this example is 140 mAh/g at 3 C, and 140 mAh/g at 5 C.

Comparative Example 1

A sample of acetylene black has N2SA of 45 $m^2/g$, STSA of 44 $m^2/g$, STSA/N2SA of 0.98, structure of 152 ml/100 g, measured DLS particle size of 312 nm, calculated DLS particle size of 303 nm, DLS deviation of 2.9%, percent free space of 56%, EMSA of 48 $m^2/g$, STSA/EMSA of 0.92, $L_c$ of 2.5 nm, d002 of 0.356 nm, and volume resistivity at 2 MPa of 0.11 ohm-cm. Coin cell capacity retention in this example is 125 mAh/g at 3 C, and 120 mAh/g at 5 C.

Comparative Example 2

A sample of furnace black has N2SA of 72 $m^2/g$, STSA of 56 $m^2/g$, STSA/N2SA of 0.78, structure of 165 ml/100 g, measured DLS particle size of 240 nm, calculated DLS particle size of 255 nm, DLS deviation of −6.3%, percent free space of 54%, EMSA of 54 $m^2/g$, STSA/EMSA of 1.04, $L_c$ of 2 nm, d002 of 0.358 nm, and volume resistivity at 2 MPa of 0.12 ohm-cm. Coin cell capacity retention in this example is 125 mAh/g at 3 C, and 115 mAh/g at 5 C.

Systems and methods of the present disclosure may be combined with or modified by other systems and/or methods, such as chemical processing and heating methods, chemical processing systems, reactors and plasma torches described in U.S. Pat. Pub. No. US 2015/0210856 and Int. Pat. Pub. No. WO 2015/116807 ("SYSTEM FOR HIGH TEMPERATURE CHEMICAL PROCESSING"), U.S. Pat. Pub. No. US 2015/0211378 ("INTEGRATION OF PLASMA AND HYDROGEN PROCESS WITH COMBINED CYCLE POWER PLANT, SIMPLE CYCLE POWER PLANT AND STEAM REFORMERS"), Int. Pat. Pub. No. WO 2015/116797 ("INTEGRATION OF PLASMA AND HYDROGEN PROCESS WITH COMBINED CYCLE POWER PLANT AND STEAM REFORMERS"), U.S. Pat. Pub. No. US 2015/0210857 and Int. Pat. Pub. No. WO 2015/116798 ("USE OF FEEDSTOCK IN CARBON BLACK PLASMA PROCESS"), U.S. Pat. Pub. No. US 2015/0210858 and Int. Pat. Pub. No. WO 2015/116800 ("PLASMA GAS THROAT ASSEMBLY AND METHOD"), U.S. Pat. Pub. No. US 2015/0218383 and Int. Pat. Pub. No. WO 2015/116811 ("PLASMA REACTOR"), U.S. Pat. Pub. No. US2015/0223314 and Int. Pat. Pub. No. WO 2015/116943 ("PLASMA TORCH DESIGN"), Int. Pat. Pub. No. WO 2016/126598 ("CARBON BLACK COMBUSTABLE GAS SEPARATION"), Int. Pat. Pub. No. WO 2016/126599 ("CARBON BLACK GENERATING SYSTEM"), Int. Pat. Pub. No. WO 2016/126600 ("REGENERATIVE COOLING METHOD AND APPARATUS"), U.S. Pat. Pub. No. US 2017/0034898 and Int. Pat. Pub. No. WO 2017/019683 ("DC PLASMA TORCH ELECTRICAL POWER DESIGN METHOD AND APPARATUS"), U.S. Pat. Pub. No. US 2017/0037253 and Int. Pat. Pub. No. WO 2017/027385 ("METHOD OF MAKING CARBON BLACK"), U.S. Pat. Pub. No. US 2017/0058128 and Int. Pat. Pub. No. WO 2017/034980 ("HIGH TEMPERATURE HEAT INTEGRATION METHOD OF MAKING CARBON BLACK"), U.S. Pat. Pub. No. US 2017/0066923 and Int. Pat. Pub. No. WO 2017/044594 ("CIRCULAR FEW LAYER GRAPHENE"), U.S. Pat. Pub. No. US20170073522 and Int. Pat. Pub. No. WO 2017/048621 ("CARBON BLACK FROM NATURAL GAS"), U.S. Pat. No. 1,339,225 ("PROCESS OF MANUFACTURING GASEOUS FUEL"), U.S. Pat. No. 7,462,343 ("MICRO-DOMAIN GRAPHITIC MATERIALS AND METHOD FOR PRODUCING THE SAME"), U.S. Pat. No. 6,068,827 ("DECOMPOSITION OF HYDROCARBON TO CARBON BLACK"), U.S. Pat. No. 7,452,514 ("DEVICE AND METHOD FOR CONVERTING CARBON CONTAINING FEEDSTOCK INTO CARBON CONTAINING MATERIALS, HAVING A DEFINED NANOSTRUCTURE"), U.S. Pat. No. 2,062,358 ("CARBON BLACK MANUFACTURE"), U.S. Pat. No. 4,199,545 ("FLUID-WALL REACTOR FOR HIGH TEMPERATURE CHEMICAL REACTION PROCESSES"), U.S. Pat. No. 5,206,880 ("FURNACE HAVING TUBES FOR CRACKING HYDROCARBONS"), U.S. Pat. No. 4,864,096 ("TRANSFER ARC TORCH AND REACTOR VESSEL"), U.S. Pat. No. 8,443,741 ("WASTE TREATMENT PROCESS AND APPARATUS"), U.S. Pat. No. 3,344,051 ("METHOD FOR THE PRODUCTION OF CARBON BLACK IN A HIGH INTENSITY ARC"), U.S. Pat. No.

2,951,143 ("ARC TORCH"), U.S. Pat. No. 5,989,512 ("METHOD AND DEVICE FOR THE PYROLYTIC DECOMPOSITION OF HYDROCARBONS"), U.S. Pat. No. 3,981,659 ("APPARATUS FOR DRYING CARBON BLACK PELLETS"), U.S. Pat. No. 3,309,780 ("PROCESS AND APPARATUS FOR DRYING WET PARTICULATE SOLIDS"), U.S. Pat. No. 3,307,923 ("PROCESS AND APPARATUS FOR MAKING CARBON BLACK"), U.S. Pat. No. 8,501,148 ("COATING COMPOSITION INCORPORATING A LOW STRUCTURE CARBON BLACK AND DEVICES FORMED THEREWITH"), PCT Pat. Pub. No. WO 2013/185219 ("PROCESSES FOR PRODUCING CARBON BLACK"), U.S. Pat. No. 8,486,364 ("PRODUCTION OF GRAPHENIC CARBON PARTICLES UTILIZING METHANE PRECURSOR MATERIAL"), Chinese Pat. Pub. No. CN103160149 ("CARBON BLACK REACTION FURNACE AND CARBON BLACK PRODUCTION METHOD"), U.S. Pat. Pub. No. 2012/0292794 ("PROCESS FOR THE PREPARATION OF CARBON BLACK PELLETS"), U.S. Pat. Pub. No. 2005/0230240 ("METHOD AND APPARATUS FOR CARBON ALLOTROPES SYNTHESIS"), UK Pat. Pub. No. GB1400266 ("METHOD OF PRODUCING CARBON BLACK BY PYROLYSIS OF HYDROCARBON STOCK MATERIALS IN PLASMA"), U.S. Pat. No. 8,771,386 ("IN-SITU GASIFICATION OF SOOT CONTAINED IN EXOTHERMICALLY GENERATED SYNGAS STREAM"), and U.S. Pat. No. 8,323,793 ("PELLETIZATION OF PYROLYZED RUBBER PRODUCTS"), each of which is entirely incorporated herein by reference.

Thus, the scope of the invention shall include all modifications and variations that may fall within the scope of the attached claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A carbon particle with (i) a statistical thickness surface area (m$^2$/g)/electron microscope surface area (m$^2$/g) (STSA/EMSA) ratio greater than or equal to about 1.3, (ii) a lattice constant ($L_c$) greater than about 3.0 nanometers (nm), and (iii) an STSA (m$^2$/g)/nitrogen surface area (m$^2$/g) (STSA/N2SA) ratio that is between about 1.01 and about 1.4, wherein the carbon particle comprises carbon black.

2. The carbon particle of claim 1, wherein a Z average particle size of the carbon particle as measured by dynamic light scattering (DLS) is at least about 30% greater than a value predicted based on the equation $D_a=(2540+71<DBP>)/S$, where $D_a$ is maximum aggregate diameter in nanometers (nm), S is STSA in m$^2$/g, and <DBP> is equal to the volume of dibutyl phthalate in milliliters per 100 grams (mL/100 g) in accordance with standard test procedure ASTM D2414.

3. The carbon particle of claim 1, wherein the carbon particle has an N2SA that is between about 30 m$^2$/g and about 400 m$^2$/g.

4. The carbon particle of claim 1, wherein (i) a total content of extractable polycyclic aromatic hydrocarbons (PAHs) of the carbon particle is less than about 1 part per million (ppm), or (ii) the carbon particle has a transmittance of toluene extract (TOTE) greater than about 99.8%.

5. The carbon particle of claim 1, wherein the carbon particle has (i) a total sulfur content of less than about 50 ppm, (ii) an oxygen content of less than or equal to about 0.4% oxygen by weight, (iii) a hydrogen content of less than about 0.4% hydrogen by weight, or (iv) a boron concentration that is between about 0.05% and 7% on a solids weight basis.

6. The carbon particle of claim 1, wherein the carbon particle has (i) a moisture content of less than or equal to about 0.3% by weight, (ii) an affinity to adsorb water from an 80% relative humidity atmosphere of less than about 0.5 milliliters (mL) of water per square meter (m$^2$) of surface area of the carbon particle, or (iii) a water spreading pressure (WSP) between about 0 and about 8 millijoules per square meter (mJ/m$^2$).

7. The carbon particle of claim 1, wherein the carbon particle has a total surface acid group content of less than or equal to about 0.5 micromoles per square meter (μmol/m$^2$).

8. A plurality of carbon particles comprising the carbon particle of claim 1, wherein structure of carbon particles of the plurality of carbon particles is greater than about 100 mL/100 grams.

9. A plurality of carbon particles comprising the carbon particle of claim 1, wherein the plurality of carbon particles has a total ash content of less than or equal to about 1%, and wherein less than or equal to about 90% of the total ash content comprises metal impurities of Fe, Ni or Co, or any combination thereof.

10. A plurality of carbon particles comprising the carbon particle of claim 1, wherein the plurality of carbon particles comprises less than about 5 ppm Fe, less than about 200 parts per billion (ppb) Cr, less than about 200 ppb Ni, less than about 10 ppb Co, less than about 10 ppb Zn, less than about 10 ppb Sn, or any combination thereof.

11. A plurality of carbon particles comprising the carbon particle of claim 1, wherein the plurality of carbon particles comprises substantially no particles larger than about 40 micrometers (μm).

12. A plurality of carbon particles comprising the carbon particle of claim 1, wherein a volume resistivity of the plurality of carbon particles is less than about 0.3 ohm-centimeter (ohm-cm) at 2 megapascals (MPa).

13. An energy storage device comprising the carbon particle of claim 1, wherein the energy storage device is a battery.

14. A polymer comprising the carbon particle of claim 1.

15. A coating comprising the carbon particle of claim 1.

16. An ink comprising the carbon particle of claim 1.

17. A tire comprising a rubber that comprises the carbon particle of claim 1.

18. A paint comprising the carbon particle of claim 1.

19. An elastomer composite comprising the carbon particle of claim 1.

* * * * *